US012754049B2

(12) United States Patent
Eldridge et al.

(10) Patent No.: US 12,754,049 B2
(45) Date of Patent: Oct. 6, 2026

(54) APPARATUS WITH OPTICAL FEATURE CHANGING VISUAL STATE

(71) Applicant: Medici Therapeutics, Inc., Boston, MA (US)

(72) Inventors: Benjamin Eldridge, Danville, CA (US); Babak Sanaii, San Francisco, CA (US); Igor Khandros, Orinda, CA (US); Jason Cosman, Livermore, CA (US)

(73) Assignee: Medici Therapeuticals, Inc., Boston, MA (US)

( * ) Notice: Subject to any disclaimer, the term of this patent is extended or adjusted under 35 U.S.C. 154(b) by 254 days.

(21) Appl. No.: 18/276,168

(22) PCT Filed: Feb. 7, 2022

(86) PCT No.: PCT/US2022/015460
§ 371 (c)(1),
(2) Date: Aug. 7, 2023

(87) PCT Pub. No.: WO2022/170174
PCT Pub. Date: Aug. 11, 2022

(65) Prior Publication Data

US 2024/0142281 A1 May 2, 2024

Related U.S. Application Data

(60) Provisional application No. 63/146,942, filed on Feb. 8, 2021.

(51) Int. Cl.
*G01F 1/38* (2006.01)
*G05D 7/06* (2006.01)

(52) U.S. Cl.
CPC ............. *G01F 1/38* (2013.01); *G05D 7/0617* (2013.01)

(58) Field of Classification Search
CPC ........ G01F 1/38; G05D 7/0617; G01L 9/0076
See application file for complete search history.

(56) References Cited

U.S. PATENT DOCUMENTS 4,678,904 A 7/1987 Saaski et al.
6,820,490 B2 11/2004 Mittelstein et al.
(Continued)

FOREIGN PATENT DOCUMENTS

WO 2019/036812 A1 2/2019

OTHER PUBLICATIONS

"A micromachined pressurerflow-sensor" by Oosterbroek et al. (Year: 1999).*
(Continued)

*Primary Examiner* — Xin Y Zhong
(74) *Attorney, Agent, or Firm* — Greenberg Traurig, LLP

(57) ABSTRACT

An apparatus includes a sensing region. A flexible membrane positioned in the sensing region defines a plane, a radial center, and a central axis extending perpendicularly relative to the plane at the radial center. The membrane deforms along the central axis and along a lateral dimension using at least a property of fluid (e.g., pressure or density) in the sensing region. The lateral dimension is transverse to the central axis. An optical feature changes a visual state in response to deformation of the membrane along the lateral dimension. A camera is positioned to view the optical feature and capture images of the optical feature.

17 Claims, 36 Drawing Sheets

(56) References Cited

U.S. PATENT DOCUMENTS

| | | | | |
|---|---|---|---|---|
| 7,379,629 | B1 | 5/2008 | Burns | |
| 7,704,212 | B2 | 4/2010 | Wekell | |
| 2003/0159518 | A1 | 8/2003 | Sawatari et al. | |
| 2012/0065596 | A1* | 3/2012 | Haueter | A61M 5/16854 604/246 |
| 2013/0044001 | A1 | 2/2013 | Wiegel | |
| 2016/0138988 | A1 | 5/2016 | Hansmann et al. | |
| 2020/0113457 | A1 | 4/2020 | Eberle et al. | |
| 2021/0129141 | A1* | 5/2021 | Sadabadi | G01F 1/383 |

OTHER PUBLICATIONS

International Search Report and Written Opinion dated Jul. 12, 2022, for International Application No. PCT/US2022/015460, 22 pages.

Oosterbroek, R. E., et al. "A micromachined pressure/flow-sensor." *Sensors and Actuators A: Physical* 77.3 (1999): 167-177.

European First Office Action dated Jul. 23, 2024, for Application No. 22706171.0, 8 pages.

* cited by examiner

APPARATUS WITH OPTICAL FEATURE CHANGING VISUAL STATE

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Some currently available technologies for manufacturing and formulating polynucleotide therapeutics (e.g., mRNA therapeutics, etc.) may expose the products to contamination and degradation. Some available centralized production may be too costly, too slow, or susceptible to contamination for use in therapeutic formulations possibly including multiple polynucleotide species.

SUMMARY

Development of scalable polynucleotide manufacturing, production of single patient dosages, elimination of touchpoints to limit contamination, input and process tracking for meeting clinical manufacturing requirements, and use in point-of-care operations may advance the use of these therapeutic modalities. Microfluidic instrumentation and processes may provide advantages in achieving these goals. It may be desirable to measure fluid pressure within a microfluidic system. Described herein are devices, systems, and methods for measuring fluid pressure within a microfluidic system, to overcome the pre-existing challenges and achieve the benefits as described herein. Such microfluidic systems may be used for the manufacture and formulation of biomolecule-containing products, such as therapeutics for individualized care.

An implementation relates to an apparatus that includes a fluid input, a fluid output, a sensing region, a flexible membrane, and an optical feature. The sensing region is to receive fluid via the fluid input. The flexible membrane is positioned in the sensing region. The flexible membrane defines a plane, a radial center, and a central axis extending perpendicularly relative to the plane at the radial center of the flexible membrane. The flexible membrane is to deform along the central axis using at least a property of fluid in the sensing region. The flexible membrane is further to deform along a lateral dimension using at least the property of fluid in the sensing region. The lateral dimension is transverse to the central axis. The apparatus further includes an optical feature. The optical feature is to change a visual state in response to deformation of the flexible membrane along the lateral dimension.

In some implementations of an apparatus, such as that described in the preceding paragraph of this summary, the fluid input, the fluid output, and sensing region together define a fluid path. The fluid path is to allow fluid to flow in from the fluid input, through the sensing region, and out through the fluid output.

In some implementations of an apparatus, such as any of those described in any of the preceding paragraphs of this summary, the flexible membrane is to deform along the central axis using at least a pressure of fluid in the sensing region. The flexible membrane is further to deform along the lateral dimension using at least the pressure of fluid in the sensing region.

In some implementations of an apparatus, such as any of those described in any of the preceding paragraphs of this summary, the flexible membrane is to deform along the central axis using at least a density of fluid in the sensing region. The flexible membrane is further to deform along the lateral dimension using at least the density of fluid in the sensing region.

In some implementations of an apparatus, such as any of those described in any of the preceding paragraphs of this summary, the apparatus further includes a bead. The bead is to bear against the flexible membrane and thereby deform the membrane using at least the density of fluid in the sensing region.

In some implementations of an apparatus, such as any of those described in any of the preceding paragraphs of this summary, the apparatus further includes a camera that is positioned to view the optical feature and thereby capture images of the optical feature.

In some implementations of an apparatus, such as any of those described in any of the preceding paragraphs of this summary, the apparatus further includes a processor that is to process images captured by the camera. The processor is further to determine the property of fluid in the sensing region using at least deformation of the first flexible membrane along the lateral dimension as indicated in one or more of the images captured by the camera.

In some implementations of an apparatus, such as any of those described in any of the preceding paragraphs of this summary, the optical feature includes a textured region of the flexible membrane.

In some implementations of an apparatus, such as any of those described in any of the preceding paragraphs of this summary, the optical feature includes a diffractive element on the flexible membrane.

In some implementations of an apparatus, such as any of those described in any of the preceding paragraphs of this summary, the optical feature includes a stochastic pattern on the flexible membrane.

In some implementations of an apparatus, such as any of those described in any of the preceding paragraphs of this summary, the optical feature includes a first optical pattern on the flexible membrane. The first optical pattern is to provide varying optical interference with a second optical pattern using at least a degree of deformation of the flexible membrane along the lateral dimension. The second optical pattern is fixed relative to the sensing region.

In some implementations of an apparatus, such as any of those described in any of the preceding paragraphs of this summary, the apparatus further includes a rigid optically transmissive member. The flexible membrane is to engage the rigid optically transmissive member as the flexible membrane deforms. A region of the flexible membrane engages the rigid optically transmissive member defining the optical feature.

In some implementations of an apparatus, such as any of those described in any of the preceding paragraphs of this summary, the optical feature includes a reflective feature on the flexible membrane. The apparatus further includes a light source oriented to project light toward the reflective feature, the reflective feature to reflect the light projected from the light source. The apparatus further includes at least one sensor to track light from the light source as reflected by the reflective feature.

In some implementations of an apparatus, such as any of those described in any of the preceding paragraphs of this summary, the apparatus further includes a first plate and a second plate. The flexible membrane is interposed between the first plate and the second plate.

Another implementation relates to an apparatus that includes a fluid processing assembly, at least one camera, and a processor. The fluid processing assembly includes a fluid input, a fluid output, a sensing region, a flexible membrane, and an optical feature. The sensing region is to receive fluid via the fluid input. The flexible membrane is positioned in the sensing region. The flexible membrane defines a plane, a radial center, and a central axis extending perpendicularly relative to the plane at the radial center of the flexible membrane. The flexible membrane is to deform along the central axis using at least a property of fluid in the sensing region. The flexible membrane is further to deform along a lateral dimension using at least the property of fluid in the sensing region. The lateral dimension is transverse to the central axis. The optical feature is to change a visual state in response to deformation of the flexible membrane along the lateral dimension. The at least one camera is positioned to view the optical feature and thereby capture images of the optical feature. The processor is to determine the property of fluid in the fluid path using at least deformation of the flexible membrane along the lateral dimension as indicated in one or more images captured by the camera.

In some implementations of an apparatus, such as that described in the preceding paragraph of this summary, the property of fluid includes a pressure of fluid.

In some implementations of an apparatus, such as any of those described in any of the preceding paragraphs of this summary, the property of fluid includes a density of fluid.

Another implementation relates to a method that includes observing, via at least one camera, deformation of a flexible membrane. The flexible membrane is positioned along a fluid path. The flexible membrane defines a plane, a radial center, and a central axis extending perpendicularly relative to the plane at the radial center of the flexible membrane. The flexible membrane deforms along the central axis using at least a property of fluid in the fluid path. The flexible membrane further deforms along a lateral dimension using at least the property of fluid in the fluid path. The lateral dimension is transverse to the central axis. The observing includes capturing images of an optical feature via the camera. The optical feature changes a visual state as the flexible membrane deforms along the lateral dimension. The method further includes determining, using a processor, the property of fluid in the fluid path using at least the observed change in visual state of the optical feature as captured in the images from the at least one camera.

In some implementations of a method, such as that described in the preceding paragraph of this summary, the property of fluid includes a pressure of fluid.

In some implementations of a method, such as any of those described in any of the preceding paragraphs of this summary, the property of fluid includes a density of fluid.

Another implementation relates to an apparatus that includes a fluid input port, a fluid output port, a fluid channel, a first flexible membrane, and a first optical feature. The fluid input port, the fluid output port, and the fluid channel together define a fluid path. The fluid path is to allow fluid to flow in from the fluid input port, through the fluid channel, and out through the fluid output port. The first flexible membrane is positioned at a first location on the fluid path. The first flexible membrane defines a plane, a radial center, and a central axis extending perpendicularly relative to the plane at the radial center of the first flexible membrane. The first flexible membrane is to deform along the central axis using at least the pressure of fluid in the fluid path at the first location. The first flexible membrane is further to deform along a lateral dimension using at least a pressure of fluid in the fluid path at the first location. The lateral dimension is transverse to the central axis. The first optical feature is to change a visual state in response to deformation of the first flexible membrane along the lateral dimension.

In some implementations of an apparatus, such as that described in the preceding paragraph of this summary, the apparatus further includes a camera, the camera is positioned to view the first optical feature and thereby capture images of the first optical feature.

In some implementations of an apparatus, such as any of those described in any of the preceding paragraphs of this summary, the apparatus further includes a processor. The processor is to process images captured by the camera. The processor is further to determine a pressure of fluid in the fluid path at the first location using at least deformation of the first flexible membrane along the lateral dimension as indicated in one or more of the images captured by the camera.

In some implementations of an apparatus, such as any of those described in any of the preceding paragraphs of this summary, the first optical feature includes a textured region of the first flexible membrane.

In some implementations of an apparatus, such as any of those described in any of the preceding paragraphs of this summary, the first optical feature includes a diffractive element on the first flexible membrane.

In some implementations of an apparatus, such as any of those described in any of the preceding paragraphs of this summary, the first optical feature includes a stochastic pattern on the first flexible membrane.

In some implementations of an apparatus, such as any of those described in any of the preceding paragraphs of this summary, the first optical feature includes a first optical pattern on the first flexible membrane. The first optical pattern is to provide varying optical interference with a second optical pattern using at least a degree of deformation of the first flexible membrane along the lateral dimension. The second optical pattern is fixed relative to the fluid path.

In some implementations of an apparatus, such as any of those described in any of the preceding paragraphs of this summary, the apparatus further includes a rigid optically transmissive member. The first flexible membrane is to engage the rigid optically transmissive member as the first flexible membrane deforms. A region of the first flexible membrane engages the rigid optically transmissive member defining the first optical feature.

In some implementations of an apparatus, such as any of those described in any of the preceding paragraphs of this summary, the first optical feature includes a reflective feature on the first flexible membrane. The apparatus further includes a light source oriented to project light toward the reflective feature. The reflective feature is to reflect the light projected from the light source. The apparatus further includes at least one sensor to track light from the light source as reflected by the reflective feature.

In some implementations of an apparatus, such as any of those described in any of the preceding paragraphs of this summary, the apparatus further includes a second flexible membrane and a second optical feature. The a second flexible membrane is positioned at a second location on the fluid path. The second flexible membrane defines a plane, a radial center, and a central axis extending perpendicularly relative to the plane at the radial center of the second flexible membrane. The second flexible membrane is to deform along the central axis of the second flexible membrane using at least a pressure of fluid in the fluid path at the second location. The second flexible membrane is further to deform along a lateral dimension using at least the pressure of fluid in the fluid path at the second location. The lateral dimension is transverse to the central axis of the second flexible membrane. The second optical feature is to change a visual state in response to deformation of the second flexible membrane along the lateral dimension.

In some implementations of an apparatus, such as that described in the preceding paragraph of this summary, the first location on the fluid path is positioned between the fluid input port and the fluid channel.

In some implementations of an apparatus, such as any of those described in any of the preceding paragraphs of this summary, the second location on the fluid path is positioned between the fluid channel and the fluid output port.

In some implementations of an apparatus, such as any of those described in any of the preceding paragraphs of this summary, the apparatus further includes at least one camera. The at least one camera is positioned to view the first optical feature and thereby capture images of the first optical feature. The at least one camera is further positioned to view the second optical feature and thereby capture images of the second optical feature.

In some implementations of an apparatus, such as any of those described in any of the preceding paragraphs of this summary, the at least one camera includes a single camera that is positioned to simultaneously view the first and second optical features and thereby simultaneously capture images of the first and second optical features.

In some implementations of an apparatus, such as any of those described in any of the preceding paragraphs of this summary, the apparatus further includes a processor to process images captured by the at least one camera. The processor is further to determine a flow rate of fluid in the fluid path using at least deformation of the first flexible membrane along at least the lateral region of the first flexible membrane, and using at least deformation of the second flexible membrane along at least the lateral region of the second flexible membrane, as indicated in one or more images of the captured by the at least one camera.

In some implementations of an apparatus, such as any of those described in any of the preceding paragraphs of this summary, the processor is further to communicate one or more control signals to change the flow rate of fluid in the fluid path using at least the determined flow rate.

In some implementations of an apparatus, such as any of those described in any of the preceding paragraphs of this summary, the apparatus further includes a first plate and a second plate. The fluid input port passes through the first plate. The fluid output port passes through the first plate. The first plate and the second plate cooperate to define the fluid channel. The first flexible membrane is interposed between the first plate and the second plate.

Another implementation relates to an apparatus that includes a fluid processing assembly, at least one camera, and a processor. The fluid processing assembly includes a fluid input port, a fluid output port, a fluid channel, a flexible membrane, and an optical feature. The fluid input port, the fluid output port, and the fluid channel together define a fluid path. The fluid path is to allow fluid to flow in from the fluid input port, through the fluid channel, and out through the fluid output port. The flexible membrane defines a plane, a radial center, and a central axis extending perpendicularly relative to the plane at the radial center of the flexible membrane. The flexible membrane is to deform along the central axis using at least a pressure of fluid in the fluid path. The flexible membrane is further to deform along a lateral dimension using at least the pressure of fluid in the fluid path. The lateral dimension is transverse to the central axis. The optical feature is to change a visual state in response to deformation of the flexible membrane along the lateral dimension. The at least one camera is positioned to view the optical feature and thereby capture images of the optical feature. The processor is to determine the pressure of fluid in the fluid path using at least deformation of the flexible membrane along the lateral dimension as indicated in one or more images captured by the camera.

Another implementation relates to a method that includes observing, via at least one camera, deformation of a flexible membrane. The flexible membrane is positioned along a fluid path. The flexible membrane defines a plane, a radial center, and a central axis extending perpendicularly relative to the plane at the radial center of the flexible membrane. The flexible membrane deforms along the central axis using at least a pressure of fluid in the fluid path. The flexible membrane further deforms along a lateral dimension using at least the pressure of fluid in the fluid path. The lateral dimension is transverse to the central axis. The observing includes capturing images of an optical feature via the camera. The optical feature changes a visual state as the flexible membrane deforms along the lateral dimension. The method further includes determining, via a processor, the pressure of fluid in the fluid path using at least the observed change in visual state of the optical feature as captured in the images from the at least one camera.

In some implementations of a method, such as that described in the preceding paragraph of this summary, the method further includes adjusting, via the processor, a flow of fluid through the fluid path using at least the determined pressure of fluid in the fluid path.

In some implementations of a method, such as any of those described in any of the preceding paragraphs of this summary, an opening is positioned over the flexible membrane. The flexible membrane deforms toward the opening. The opening has a radial center and a radial perimeter. The flexible membrane has an annular region. The annular region is spaced radially outwardly relative to the radial center. The annular region is further spaced radially inwardly relative to the radial center. The determining including focusing on image data from the camera indicating lateral deformation of the flexible membrane within the annular region.

Another implementation relates to an apparatus that includes a fluid processing assembly, at least one camera, and a processor. The fluid processing assembly includes a fluid flow path, a first working stage along the fluid flow path, and a first pressure sensing stage positioned along the flow path. The first working stage is to change a property of fluid flowing through the flow path. The first pressure sensing stage includes a first flexible membrane and a first optical feature. The first flexible membrane defines a first plane, a first radial center, and a first central axis extending perpendicularly relative to the first plane at the first radial center of the first flexible membrane. The first flexible membrane is to deform along a first lateral dimension using at least a pressure of fluid in the fluid path. The first lateral dimension is transverse to the first central axis. The first optical feature is to change a visual state in response to deformation of the first flexible membrane along the first lateral dimension. The at least one camera is positioned to view the first optical feature and thereby capture images of the first optical feature. The processor is to determine a first pressure of fluid in the fluid path using at least deformation of the first flexible membrane along the first lateral dimension as indicated in one or more images captured by the at least one camera.

In some implementations of an apparatus, such as that described in the preceding paragraph of this summary, the first pressure sensing stage is positioned upstream of the first working stage. The first flexible membrane is to deform along the first lateral dimension using at least the first pressure of fluid in the fluid path upstream of the first working stage.

In some implementations of an apparatus, such as any of those described in any of the preceding paragraphs of this summary, the apparatus further includes a second pressure sensing stage positioned along the flow path. The second pressure sensing stage includes a second flexible membrane and a second optical feature. The second flexible membrane defines a second plane, a second radial center, and a second central axis extending perpendicularly relative to the second plane at the second radial center of the second flexible membrane. The second flexible membrane is to deform along a second lateral dimension using at least a pressure of fluid in the fluid path. The second lateral dimension is transverse to the second central axis. The second optical feature is to change a visual state in response to deformation of the second flexible membrane along the second lateral dimension. The at least one camera is positioned to view the second optical feature and thereby capture images of the second optical feature. The processor is to determine a second pressure of fluid in the fluid path using at least deformation of the second flexible membrane along the second lateral dimension as indicated in one or more images captured by the at least one camera.

In some implementations of an apparatus, such as any of those described in any of the preceding paragraphs of this summary, the second pressure sensing stage is positioned downstream of the first working stage. The second flexible membrane is to deform along the second lateral dimension using at least the second pressure of fluid in the fluid path downstream of the first working stage.

In some implementations of an apparatus, such as any of those described in any of the preceding paragraphs of this summary, the at least one camera includes a first camera and a second camera. The first camera is positioned to view the first optical feature and thereby capture images of the first optical feature. The second camera is positioned to view the second optical feature and thereby capture images of the second optical feature.

In some implementations of an apparatus, such as any of those described in any of the preceding paragraphs of this summary, the at least one camera includes a camera that is positioned to view the first optical feature and the second optical feature simultaneously and thereby capture images of the first optical feature and the second optical feature simultaneously.

In some implementations of an apparatus, such as any of those described in any of the preceding paragraphs of this summary, the processor is to compare the first pressure to the second pressure to thereby determine a rate of flow of fluid through the fluid flow path.

In some implementations of an apparatus, such as any of those described in any of the preceding paragraphs of this summary, the processor is to determine whether a fault condition exists using at least the first pressure or the second pressure.

In some implementations of an apparatus, such as any of those described in any of the preceding paragraphs of this summary, the apparatus further includes a second working stage along the fluid flow path. The second working stage is to change a property of fluid flowing through the flow path. The second working stage is positioned downstream of the first working stage.

In some implementations of an apparatus, such as any of those described in any of the preceding paragraphs of this summary, the first pressure sensing stage is positioned upstream of the first working stage. The first flexible membrane is to deform along the first lateral dimension using at least the first pressure of fluid in the fluid path upstream of the first working stage.

In some implementations of an apparatus, such as any of those described in any of the preceding paragraphs of this summary, the second pressure sensing stage is positioned downstream of the second working stage. The second flexible membrane is to deform along the second lateral dimension using at least the second pressure of fluid in the fluid path downstream of the second working stage.

In some implementations of an apparatus, such as any of those described in any of the preceding paragraphs of this summary, the working stage is to provide valving in the fluid flow path.

In some implementations of an apparatus, such as any of those described in any of the preceding paragraphs of this summary, the working stage is to provide peristaltic pumping of fluid through the fluid flow path.

In some implementations of an apparatus, such as any of those described in any of the preceding paragraphs of this summary, the working stage is to provide synthesis of polynucleotides.

In some implementations of an apparatus, such as any of those described in any of the preceding paragraphs of this summary, the working stage is to provide purification of a fluid in the fluid flow path.

In some implementations of an apparatus, such as any of those described in any of the preceding paragraphs of this summary, the working stage is to provide storage of a fluid in the fluid flow path.

In some implementations of an apparatus, such as any of those described in any of the preceding paragraphs of this summary, the working stage is to provide mixing of fluid in the fluid flow path.

In some implementations of an apparatus, such as any of those described in any of the preceding paragraphs of this summary, the working stage is to provide metering of fluid flow through the fluid flow path.

In some implementations of an apparatus, such as any of those described in any of the preceding paragraphs of this summary, the working stage is to provide evacuation of air from the fluid flow path.

In some implementations of an apparatus, such as any of those described in any of the preceding paragraphs of this summary, the working stage is to provide concentration of a fluid in the fluid flow path.

In some implementations of an apparatus, such as any of those described in any of the preceding paragraphs of this summary, the working stage is to provide dialysis of a fluid in the fluid flow path.

In some implementations of an apparatus, such as any of those described in any of the preceding paragraphs of this summary, the working stage is to provide compounding of a therapeutic composition in the fluid flow path.

In some implementations of an apparatus, such as any of those described in any of the preceding paragraphs of this summary, the working stage is to provide dilution of a fluid in the fluid flow path.

In some implementations of an apparatus, such as any of those described in any of the preceding paragraphs of this summary, the first flexible membrane extends through the first working stage.

In some implementations of an apparatus, such as any of those described in any of the preceding paragraphs of this summary, the flexible membrane is to controllably deform within the first working stage to thereby affect movement of fluid through the first working stage.

Another implementation relates to an apparatus that includes a fluid inlet, a sensing chamber, a flexible membrane, and an optical feature. The sensing chamber is to receive fluid via the fluid inlet. The flexible membrane is positioned in the sensing chamber. The flexible membrane defines a plane, a radial center, and a central axis extending perpendicularly relative to the plane at the radial center of the flexible membrane. The flexible membrane is to deform using at least a density of fluid in the sensing chamber. The optical feature is to change a visual state in response to deformation of the flexible membrane.

In some implementations of an apparatus, such as that described in the preceding paragraph of this summary, the apparatus further includes a bead in the sensing chamber. The bead is to bear against the flexible membrane and thereby deform the membrane using at least the density of fluid in the sensing chamber.

In some implementations of an apparatus, such as any of those described in any of the preceding paragraphs of this summary, the apparatus further includes a fluid outlet. The fluid outlet is to convey fluid from the sensing chamber.

In some implementations of an apparatus, such as any of those described in any of the preceding paragraphs of this summary, the apparatus further includes a flow channel. The flow channel is to convey fluid into the fluid inlet. The flow channel is further to convey fluid past the fluid inlet.

In some implementations of an apparatus, such as any of those described in any of the preceding paragraphs of this summary, the apparatus further includes a first junction. The first junction provides a path from an upstream portion of the flow channel to the fluid inlet. The first junction further provides a path from the upstream portion of the flow channel to a first downstream portion of the flow channel.

In some implementations of an apparatus, such as any of those described in any of the preceding paragraphs of this summary, the apparatus further includes a first valve to selectively prevent fluid from being communicated from the upstream portion of the flow channel to the first downstream portion of the flow channel.

In some implementations of an apparatus, such as any of those described in any of the preceding paragraphs of this summary, the apparatus further includes a second valve to selectively prevent fluid from being communicated from the upstream portion of the flow channel to the fluid inlet.

In some implementations of an apparatus, such as any of those described in any of the preceding paragraphs of this summary, the apparatus further includes a fluid outlet to convey fluid from the sensing chamber.

In some implementations of an apparatus, such as any of those described in any of the preceding paragraphs of this summary, the apparatus further includes a second junction. The second junction provides a path from the fluid outlet to a second downstream portion of the flow channel. The second downstream portion of the flow channel is downstream of the first downstream portion.

In some implementations of an apparatus, such as any of those described in any of the preceding paragraphs of this summary, the apparatus further includes a third valve to selectively prevent fluid from being communicated from the fluid outlet to the second downstream portion of the flow channel.

In some implementations of an apparatus, such as any of those described in any of the preceding paragraphs of this summary, the apparatus further includes a camera positioned to view the optical feature and thereby capture images of the optical feature.

In some implementations of an apparatus, such as any of those described in any of the preceding paragraphs of this summary, the apparatus further includes a processor to process images captured by the camera. The processor is further to determine a density of fluid in the sensing chamber using at least deformation of the flexible membrane as indicated in one or more images captured by the camera.

In some implementations of an apparatus, such as any of those described in any of the preceding paragraphs of this summary, the flexible membrane is to deform along the central axis using at least the density of fluid in the sensing chamber. The flexible membrane is further to deform along a lateral dimension using at least the density of fluid in the sensing chamber. The lateral dimension is transverse to the central axis.

In some implementations of an apparatus, such as any of those described in any of the preceding paragraphs of this summary, the optical feature is to change a visual state in response to deformation of the flexible membrane along the lateral dimension.

In some implementations of an apparatus, such as any of those described in any of the preceding paragraphs of this summary, the optical feature includes a textured region of the flexible membrane.

In some implementations of an apparatus, such as any of those described in any of the preceding paragraphs of this summary, the optical feature includes a diffractive element on the flexible membrane.

In some implementations of an apparatus, such as any of those described in any of the preceding paragraphs of this summary, the optical feature includes a stochastic pattern on the flexible membrane.

In some implementations of an apparatus, such as any of those described in any of the preceding paragraphs of this summary, the optical feature includes a first optical pattern on the flexible membrane. The first optical pattern is to provide varying optical interference with a second optical pattern using at least a degree of deformation of the flexible membrane. The second optical pattern is fixed relative to the sensing chamber.

In some implementations of an apparatus, such as any of those described in any of the preceding paragraphs of this summary, the apparatus further includes a rigid optically transmissive member. The flexible membrane is to engage the rigid optically transmissive member as the flexible membrane deforms. A region of the flexible membrane engaging the rigid optically transmissive member defines the optical feature.

In some implementations of an apparatus, such as any of those described in any of the preceding paragraphs of this summary, the optical feature includes a reflective feature on the flexible membrane. The apparatus further includes a light source and at least one sensor. The light source is oriented to project light toward the reflective feature. The reflective feature is to reflect the light projected from the light source. The at least one sensor is to track light from the light source as reflected by the reflective feature.

Another implementation relates to an apparatus that includes a fluid processing assembly, at least one camera, and a processor. The fluid processing assembly includes a fluid inlet, a sensing chamber, and a flexible membrane positioned in the sensing chamber. The sensing chamber is to receive fluid through the fluid inlet. The flexible membrane defines a plane, a radial center, and a central axis extending perpendicularly relative to the plane at the radial center of the flexible membrane. The flexible membrane is to deform using at least a density of fluid in the sensing chamber. The optical feature is to change a visual state in response to deformation of the flexible membrane. The at least one camera is positioned to view the optical feature and thereby capture images of the optical feature. The processor is to determine the density of fluid in the fluid path using at least deformation of the flexible membrane as indicated in one or more images captured by the camera.

Another implementation relates to a method that includes observing, via at least one camera, deformation of a flexible membrane. The flexible membrane is positioned above a sensing chamber. The flexible membrane defines a plane, a radial center, and a central axis extending perpendicularly relative to the plane at the radial center of the flexible membrane. The flexible membrane deforms using at least a density of fluid in the fluid path. The observing includes capturing images of an optical feature via the camera. The optical feature changes a visual state as the flexible membrane deforms. The method further includes determining, using a processor, the density of fluid in the sensing chamber using at least the observed change in visual state of the optical feature as captured in the images from the at least one camera.

In some implementations of a method, such as that described in the preceding paragraph of this summary, the flexible membrane deforms along the central axis using at least the density of fluid in the fluid chamber. The flexible membrane further deforms along a lateral dimension using at least the density of fluid in the fluid chamber. The lateral dimension is transverse to the central axis.

In some implementations of a method, such as any of those described in any of the preceding paragraphs of this summary, the optical feature changes a visual state as the flexible membrane deforms along the lateral dimension.

In some implementations of a method, such as any of those described in any of the preceding paragraphs of this summary, the method further includes adjusting, via the processor, a flow of fluid through the fluid path using at least the determined density of fluid in the sensing chamber.

In some implementations of a method, such as any of those described in any of the preceding paragraphs of this summary, the method further includes flowing the fluid through a flow channel. The method further includes diverting the flow of fluid through the flow channel and into the sensing chamber.

In some implementations of a method, such as any of those described in any of the preceding paragraphs of this summary, the act of diverting the flow of fluid includes opening a first valve leading to the sensing chamber. In addition, or in the alternative, the act of diverting the flow of fluid includes closing a second valve leading to a downstream portion of the flow channel.

In some implementations of a method, such as any of those described in any of the preceding paragraphs of this summary, the fluid is in a static state in the sensing chamber during the act of observing.

In some implementations of a method, such as any of those described in any of the preceding paragraphs of this summary, the flexible membrane deforms in response to a bead bearing against the flexible membrane. The bead is positioned in the sensing chamber.

In some implementations of a method, such as any of those described in any of the preceding paragraphs of this summary, the bead bears against the flexible membrane with a force using at least a difference between a density of the bead and the density of the fluid in the sensing chamber.

It should be appreciated that all combinations of the foregoing concepts and additional concepts discussed in greater detail below (provided such concepts are not mutually inconsistent) are contemplated as being part of the inventive subject matter disclosed herein and to achieve the benefits/advantages as described herein. In particular, all combinations of claimed subject matter appearing at the end of this disclosure are contemplated as being part of the inventive subject matter disclosed herein.

BRIEF DESCRIPTION OF THE DRAWINGS

The details of one or more implementations are set forth in the accompanying drawings and the description below. Other features, aspects, and advantages will become apparent from the description, the drawings, and the claims, in which:

DETAILED DESCRIPTION

In some aspects, apparatuses and methods are disclosed herein for processing therapeutic polynucleotides. In particular, these apparatuses and methods may be closed path apparatuses and methods that are configured to minimize or eliminate manual handling during operation. The closed path apparatuses and methods may provide a nearly entirely aseptic environment, and the components may provide a sterile path for processing from initial input (e.g., template) to output (e.g., compounded therapeutic). Material inputs (e.g., nucleotides, and any chemical components) into the apparatus may be sterile; and may be input into the system without requiring virtually any manual interaction.

The apparatuses and methods described herein may generate therapeutics at very rapid cycle times at very high degree of reproducibility. The apparatuses described herein are configured to provide, in a single integrated apparatus, synthesis, purification, dialysis, compounding, and concentration of one or more therapeutic compositions. Alternatively, one or more of these processes may be carried out in two or more apparatuses as described herein. In some scenarios, the therapeutic compositions include therapeutic polynucleotides. Such therapeutic polynucleotides may include, for example, ribonucleic acids or deoxyribonucleic acids. The polynucleotides may include only natural nucleotide units or may include any kind of synthetic or semi-synthetic nucleotide units. All or some of the processing steps may be performed in an unbroken fluid processing pathway, which may be configured as one or a series of consumable microfluidic path device(s)—in some instances herein also referred to as process chip or biochip (through the chip need not necessarily be used in bio-related applications). This may allow for patient-specific therapeutics to be synthesized, including compounding, at a point of care (e.g. hospital, clinic, pharmacy, etc.).

I. Overview of Microfluidic System

Figure 1:
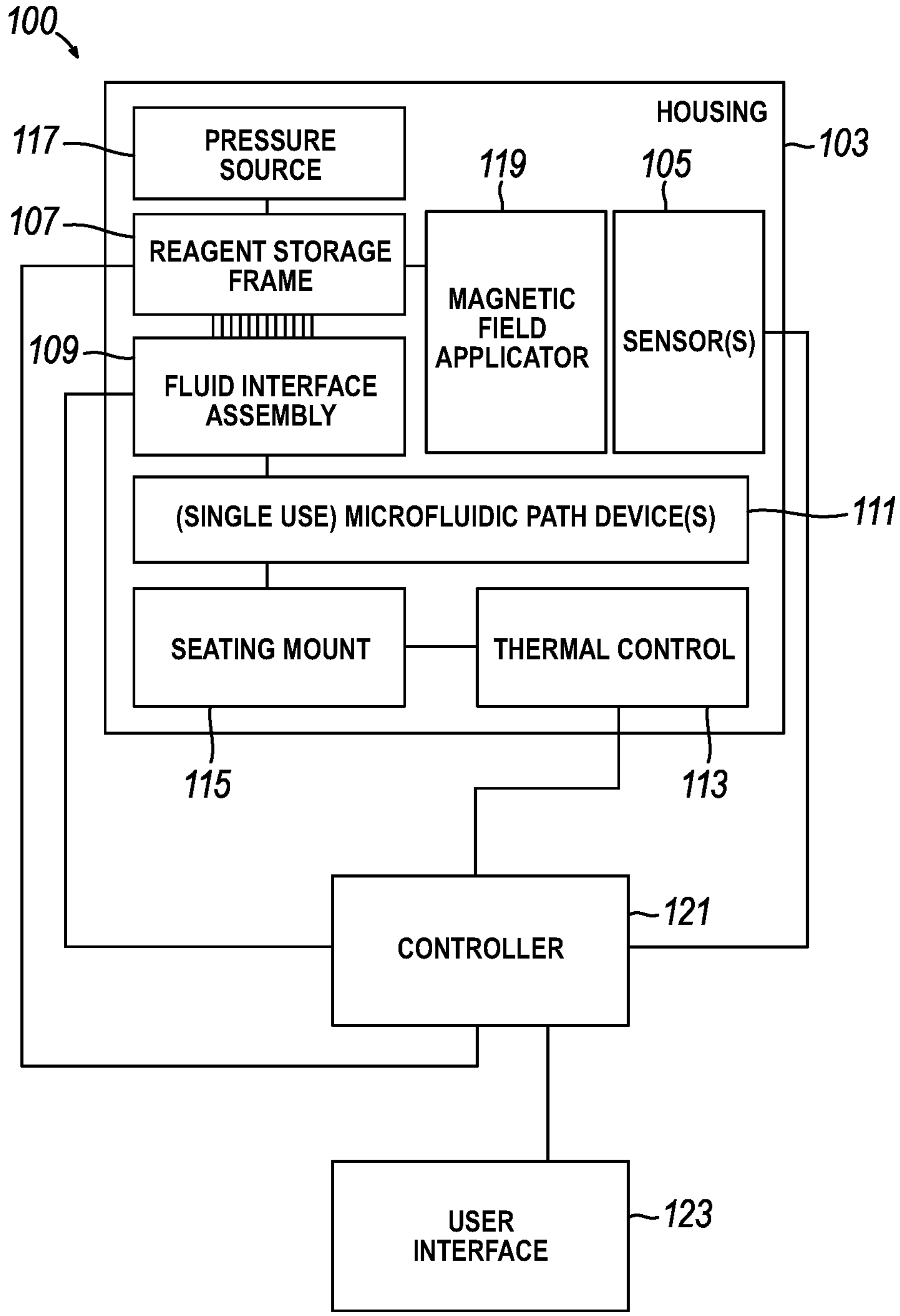
FIG. 1 depicts a schematic view of an example of a microfluidic system.

FIG. 1 depicts examples of various components that may be incorporated into a microfluidic system (100). System (100) of this example includes a housing (103) enclosing a seating mount (115) that may hold one or more process chips (111). In some versions, process chips (111) are provided and utilized as single-use devices; while the rest of system (100) is reusable. Housing (103) may be in the form of a chamber, enclosure, etc., with an opening that may be closed (e.g., via a lid or door, etc.) to thereby seal the interior. Housing (103) may enclose a thermal regulator and/or may be configured to be enclosed in a thermally-regulated environment (e.g., a refrigeration unit, etc.). Housing (103) may form an aseptic barrier. In some variations, housing (103) may form a humidified or humidity-controlled environment.

In addition, or in the alternative, system (100) may be positioned in a cabinet (not shown). Such a cabinet may provide a temperature-regulated (e.g., refrigerated) environment. Such a cabinet may also provide air filtering and air flow management and may promote reagents being kept at a desired temperature through the manufacturing process. In addition, such a cabinet may be equipped with UV lamps for sterilization of process chip (111) and other components of system (100). Various suitable features that may be incorporated into a cabinet that houses system (100) will be apparent to those skilled in the art in view of the teachings herein.

Seating mount (115) may be configured to secure process chip (111) using one or more pins or other components configured to hold process chip (111) in a fixed and predefined orientation. Seating mount (115) may thus facilitate process chip (111) being held at an appropriate position and orientation in relation to other components of system (100). In the present example, seating mount (115) is configured to hold process chip (111) in a horizontal orientation, such that process chip (111) is parallel with the ground.

In some variations, a thermal control (113) may be located adjacent to seating mount (115), to modulate the temperature of any process chip (111) mounted in seating mount (115). Thermal control (113) may include a thermoelectric component (e.g., Peltier device, etc.) and/or one or more heat sinks for controlling the temperature of all or a portion of any process chip (111) mounted in seating mount (115). In some variations, more than one thermal control (113) may be included, such as to separately regulate the temperature of different ones of one or more regions of process chip (111). Thermal control (113) may include one or more thermal sensors (e.g., thermocouples, etc.) that may be used for feedback control of process chip (111) and/or thermal control (113).

As shown in FIG. 1, a fluid interface assembly (109) couples process chip (111) with a pressure source (117), thereby providing one or more paths for fluid (e.g., gas) at a positive or negative pressure to be communicated from pressure source (117) to one or more interior regions of process chip (111) as will be described in greater detail below. While only one pressure source (117) is shown, system (100) may include two or more pressure sources (117). In some scenarios, pressure may be generated by one or more sources other than pressure source (117). For instance, one or more vials or other fluid sources within reagent storage frame (107) may be pressurized. In addition, or in the alternative, reactions and/or other processes carried out on process chip (111) may generate additional fluid pressure. In the present example, fluid interface assembly (109) also couples process chip (111) with a reagent storage frame (107), thereby providing one or more paths for liquid reagents, etc., to be communicated from reagent storage frame (107) to one or more interior regions of process chip (111) as will be described in greater detail below.

In some versions, pressurized fluid (e.g., gas) from at least one pressure source (117) reaches fluid interface assembly (109) via reagent storage frame (107), such that reagent storage frame (107) includes one or more components interposed in the fluid path between pressure source (117) and fluid interface assembly (109). In some versions, one or more pressure sources (117) are directly coupled with fluid interface assembly, such that the positively pressurized fluid (e.g., positively pressurized gas) or negatively pressurized fluid (e.g., suction or other negatively pressurized gas) bypasses reagent storage frame (107) to reach fluid interface assembly (109). Regardless of whether the fluid interface assembly (109) is interposed in the fluid path between pressure source (117) and fluid interface assembly (109), fluid interface assembly (109) may be removably coupled to the rest of system (100), such that at least a portion of fluid interface assembly (109) may be removed for sterilization between uses. As described in greater detail below, pressure source (117) may selectively pressurize one or more chamber regions on process chip (111). In addition, or in the alternative, pressure source may also selectively pressurize one or more vials or other fluid storage containers held by reagent storage frame (107).

Reagent storage frame (107) is configured to contain a plurality of fluid sample holders, each of which may hold a fluid vial or cassette that is configured to hold a reagent (e.g., nucleotides, solvent, water, etc.) for delivery to process chip (111). In some versions, one or more fluid vials, cassettes, or other storage containers in reagent storage frame (107) may be configured to receive a product from the interior of the process chip (111). In addition, or in the alternative, a second process chip (111) may receive a product from the interior of a first process chip (111), such that one or more fluids are transferred from one process chip (111) to another process chip (111). In some such scenarios, the first process chip (111) may perform a first dedicated function (e.g., synthesis, etc.) while the second process chip (111) performs a second dedicated function (e.g., encapsulation, etc.). Reagent storage frame (107) of the present example includes a plurality of pressure lines and/or a manifold configured to divide one or more pressure sources (117) into a plurality of pressure lines that may be applied to process chip (111). Such pressure lines may be independently or collectively (in sub-combinations) controlled.

Fluid interface assembly (109) may include a plurality of fluid lines and/or pressure lines where each such line includes a biased (e.g., spring-loaded) holder or tip that individually and independently drives each fluid and/or pressure line to process chip (111) when process chip (111) is held in seating mount (115). Any associated tubing (e.g., the fluid lines and/or the pressure lines) may be part of fluid interface assembly (109) and/or may connect to fluid interface assembly (109). In some versions, each fluid lines comprises a flexible tubing that connects between reagent storage frame (107), via a connector that couples the vial to the tubing in a locking engagement (e.g., ferrule) and process chip (111). In some versions, the ends of the fluid lines/pressure lines, may be configured to seal against process chip (111), e.g., at a corresponding sealing port formed in process chip (111), as described below. In the present example, the connections between pressure source (117) and process chip (111), and the connections between vials in reagent storage frame (107) and process chip (111), all form sealed and closed paths that are isolated when process chip (111) is seated in seating mount (115). Such sealed, closed paths may provide protection against contamination when processing therapeutic polynucleotides.

The vials of reagent storage frame (107) may be pressurized (e.g., >1 atm pressure, such as 2 atm, 3 atm, 5 atm, or higher). In some versions, the vials are pressurized by pressure source (117). Negative or positive pressure may thus be applied. For example, the fluid vials may be pressurized to between about 1 and about 20 psig (e.g., 5 psig, 10 psig, etc.). Alternatively, a vacuum (e.g., about −7 psig or about 7 psia) may be applied to draw fluids back into the vials (e.g., vials serving as storage depots) at the end of the process. The fluid vials may be driven at lower pressure than the pneumatic valves as described below, which may prevent or reduce leakage. In some variations, the difference in pressure between the fluid and pneumatic valves may be between about 1 psi and about 25 psi (e.g., about 3 psi, about 5 psi, 7 psi, 10 psi, 12 psi, 15 psi, 20 psi, etc.).

System (100) of the present example further includes a magnetic field applicator (119), which is configured to create a magnetic field at a region of the process chip (111). Magnetic field applicator (119) may include a movable head that is operable to move the magnetic field to thereby selectively isolate products that are adhered to magnetic capture beads within vials or other storage containers in reagent storage frame (107).

System (100) of the present example further includes one or more sensors (105). In some versions, such sensors (105) include one or more cameras and/or other kinds of optical sensors. Such sensors (105) may sense one or more of a barcode, a fluid level within a fluid vial held within reagent storage frame (107), fluidic movement within a process chip (111) that is mounted within seating mount (115), and/or other optically detectable conditions. In versions where a sensor (105) is used to sense barcodes, such barcodes may be included on vials of reagent storage frame (107), such that sensor (105) may be used to identify vials in reagent storage frame (107). In some versions, a single sensor (105) is positioned and configured to simultaneously view such barcodes on vials in reagent storage frame (107), fluid levels in vials in reagent storage frame (107), fluidic movement within a process chip (111) that is mounted within seating mount (115), and/or other optically detectable conditions. In some other versions, more than one sensor (105) is used to view such conditions. In some such versions, different sensors (105) are positioned and configured to separately view corresponding optically detectable conditions, such that a sensor (105) may be dedicated to a particular corresponding optically detectable condition.

In versions where sensors (105) include at least one optical sensor, visual/optical markers may be used to estimate yield. For example, fluorescence may be used to detect process yield or residual material by tagging with fluorophores. In addition, or in the alternative, dynamic light scattering (DLS) may be used to measure particle size distributions within a portion of the process chip (111) (e.g., such as a mixing portion of process chip (111)). In some variations, sensor (105) may provide measurements using one or two optical fibers to convey light (e.g., laser light) into process chip (111); and detect an optical signal coming out of process chip (111). In versions where sensor (105) optically detects process yield or residual material, etc., sensor (105) may be configured to detect visible light, fluorescent light, an ultraviolet (UV) absorbance signal, an infrared (IR) absorbance signal, and/or any other suitable kind of optical feedback.

In versions where sensors (105) include at least one optical sensor that is configured to capture video images, such sensors (105) may record at least some activity on process chip (111). For example, an entire run for synthesizing and/or processing a material (e.g., a therapeutic RNA) may be recorded by one or more video sensors (105), including a video sensor (105) that may visualize process chip (111) (e.g., from above). Processing on process chip (111) may be visually tracked and this video record may be retained for later quality control and/or processing. Thus, the video record of the processing may be saved, stored, and/or transmitted for subsequent review and/or analysis. In addition, as will be described in greater detail below, the video may be used as a real-time feedback input that may affect processing using at least visually observable conditions captured in the video.

System (100) of the present example is controlled by a controller (121). Controller (121) may include one or more processors, one or more memories, and various other electrical components as will be apparent to those skilled in the art in view of the teachings herein. In some versions, one or more components of controller (121) (e.g., one or more processors, etc.) is/are embedded within system (100) (e.g., contained within housing (103)). In addition, or in the alternative, one or more components of controller (121) (e.g., one or more processors, etc.) may be detachably attached or detachably connected with other components of system (100). Thus, at least a portion of controller (121) may be removable. Moreover, at least a portion of controller (121) may be remote from housing (103) in some versions.

The control by controller (121) may include activating pressure source (117) to apply pressure through process chip (111) to drive fluidic movement, among other tasks. Controller (121) may be completely or partially outside of housing (103); or completely or partially inside of housing (103). Controller (121) may be configured to receive user inputs via a user interface (123) of system (100); and provide outputs to users via user interface (123). In some versions, controller (121) is fully automated to a point where user inputs are not needed. In some such versions, user interface (123) may provide only outputs to users. User interface (123) may include a monitor, a touchscreen, a keyboard, and/or any other suitable features. Controller (121) may coordinate processing, including moving one or more fluid (s) onto and on process chip (111), mixing one or more fluids on process chip (111), adding one or more components to process chip (111), metering fluid in process chip (111), regulating the temperature of process chip (111), applying a magnetic field (e.g., when using magnetic beads), etc. Controller (121) may receive real-time feedback from sensors (105) and execute control algorithms in accordance with such feedback from sensors (105). Such feedback from sensors (105) may include, but need not be limited to, identification of reagents in vials in reagent storage frame (107), detected fluid levels in vials in reagent storage frame (107), detected movement of fluid in process chip (111), fluorescence of fluorophores in fluid in process chip (111), etc. Controller (121) may include software, firmware and/or hardware. Controller (121) may also communicate with a remote server, e.g., to track operation of the apparatus, to re-order materials (e.g., components such as nucleotides, process chips (111), etc.), and/or to download protocols, etc.

Figure 2:
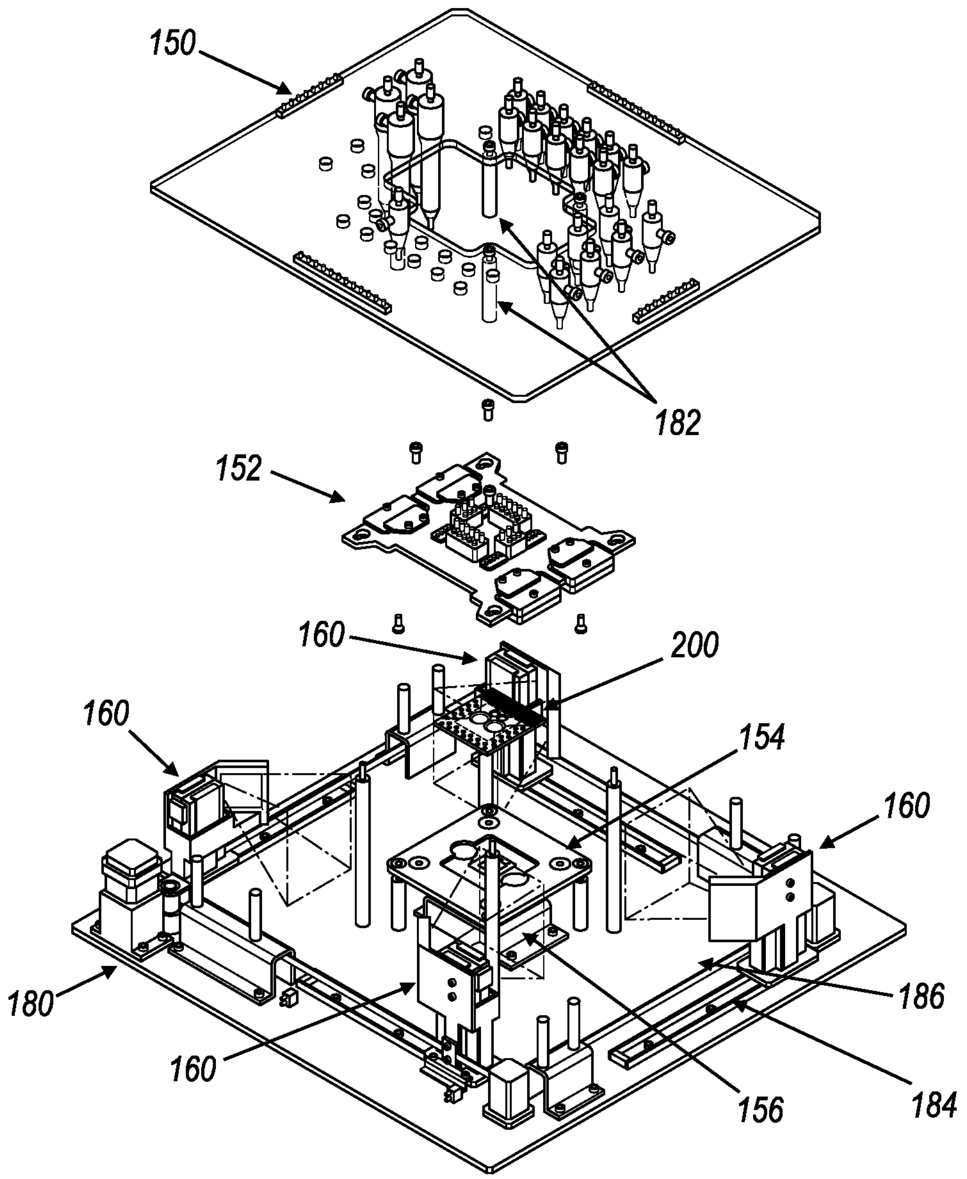
FIG. 2 depicts an exploded perspective view of examples of components of the system of FIG. 1.

FIG. 2 shows examples of certain forms that may be taken by various components of system (100). In particular, FIG. 2 shows a reagent storage frame (150), a fluid interface assembly (152), a seating mount (154), a thermal control (156), and a process chip (200). Reagent storage frame (150), fluid interface assembly (152), seating mount (154), thermal control (156), and process chip (200) of this example may be configured and operable just like reagent storage frame (107), fluid interface assembly (109), seating mount (115), thermal control (113), and process chip (111), respectively, described above. These components are secured relative to a base (180). A set of rods (182) support reagent storage frame (150) over fluid interface assembly (152).

As shown in FIG. 2, a set of optical sensors (160) are positioned at four respective locations along base (180). Optical sensors (160) may be configured and operable like sensors (105) described above. Optical sensors (160) may include off-the-shelf cameras or any other suitable kinds of optical sensors. Optical sensors (160) are positioned such that fluid vials held within reagent storage frame (150) are within the field of view of one or more of optical sensors (160). In addition, process chip (200) is within the field of view of one or more of optical sensors (160). Each optical sensor (160) is movably secured to base (180) via a corresponding rail (184) (e.g., in a gantry arrangement), such that each optical sensor (160) is configured to translate laterally along each corresponding rail (184). A linear actuator (186) is secured to each optical sensor (160) and is thereby operable to drive lateral translation of each optical sensor (160) along the corresponding rail (184). Each actuator (186) may be in the form of a drive belt, a drive chain, a drive cable, or any other suitable kind of structure. Controller (121) may drive operation of actuators (186). Optical sensors (160) may be moved along rails (184) during operation of system (100) in order to facilitate viewing of the appropriate regions of vials in reagent storage frame (150) and/or process chip (200). In some scenarios, optical sensors (160) move in unison along corresponding rails (184). In some other scenarios, optical sensors (160) move independently along corresponding rails (184).

While optical sensors (160) are shown in FIG. 2 as being mounted to base (180), optical sensors (160) may be positioned elsewhere within system (100), in addition to or as an alternative to being mounted to base (180). For instance, some versions of reagent storage frame (107) may include one or more optical sensors (160) positioned and configured to provide an overhead field of view. In some such versions, such optical sensors (160) may be mounted to rails, movable cantilever arms, or other structures that allow such optical sensors (160) to be repositioned during operation of system (100). Other suitable locations in which optical sensors (160) may be positioned will be apparent to those skilled in the art in view of the teachings herein. While not shown, system (100) may also include one or more sources of light (e.g., electroluminescent panels, etc.) to provide illumination that aids in optical sensing by optical sensors (160).

In some versions, one or more mirrors are used to facilitate visualization of components of system (100) by optical sensors (160). Such mirrors may allow optical sensors (160) to view components of system (100) that may not otherwise be within the field of view of sensors (160). Such mirrors may be placed directly adjacent to optical sensors (160). In addition, or in the alternative, such mirrors may be placed adjacent to one or more components of system (100) that are to be viewed by optical sensors (160).

In use of system (100), an operator may select a protocol to run (e.g., from a library of preset protocols), or the user may enter a new protocol (or modify an existing protocol), via user interface (123). From the protocol, controller (121) may instruct the operator which kind of process chip (111) to use, what the contents of vials in reagent storage frame (107) should be, and where to place the vials in reagent storage frame (107). The operator may load process chip (111) into seating mount (115); and load the desired reagent vials and export vials into reagent storage frame (107). System (100) may confirm the presence of the desired peripherals, identify process chip (111), and scan identifiers (e.g., barcodes) for each reagent and product vial in reagent storage frame (107), facilitating the vials to match the bill-of-reagents for the selected protocol. After confirming the starting materials and equipment, controller (121) may execute the protocol. During execution, valves and pumps are actuated to deliver reagents as described in greater detail below, reagents are blended, temperature is controlled, and reactions occur, measurements are made, and products are pumped to destination vials in reagent storage frame (107).

II. Example of Process Chip

Figure 3:
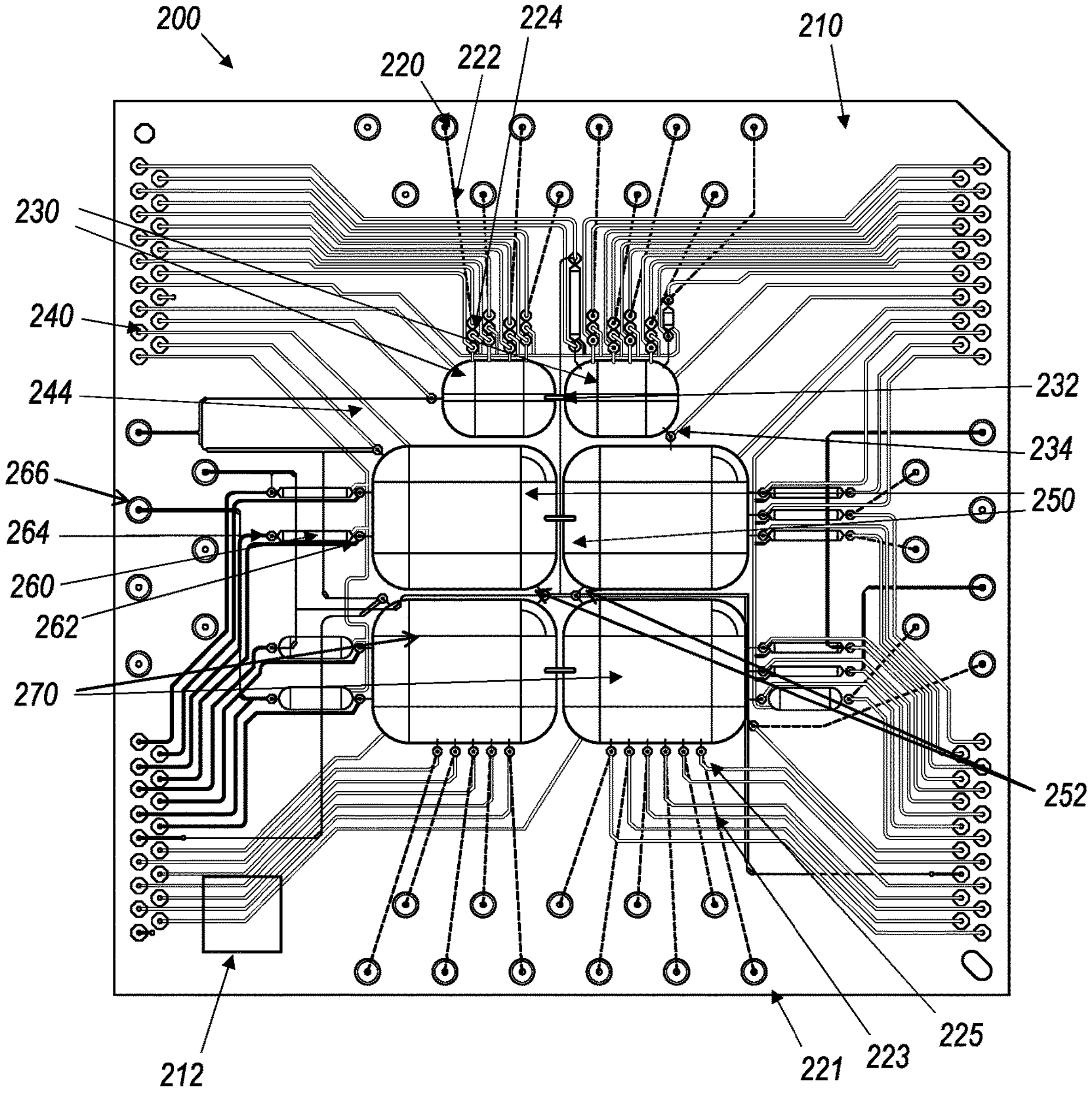
FIG. 3 depicts a top plan view of an example of a process chip that may be incorporated into the system of FIG. 1.
Figure 4A:
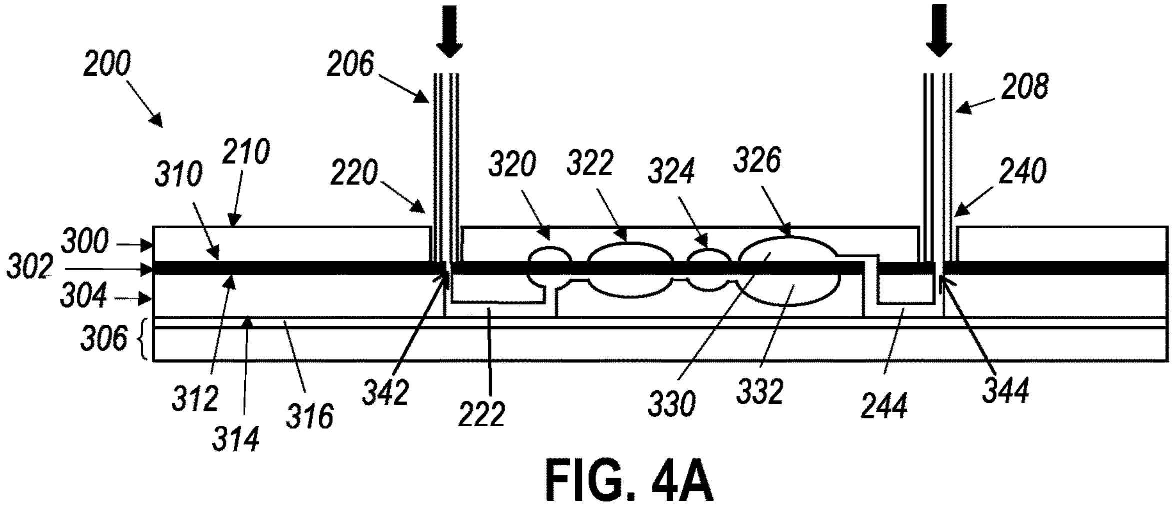
FIG. 4A depicts a cross-sectional side view of the process chip of FIG. 3 in a first state of operation.
Figure 4B:
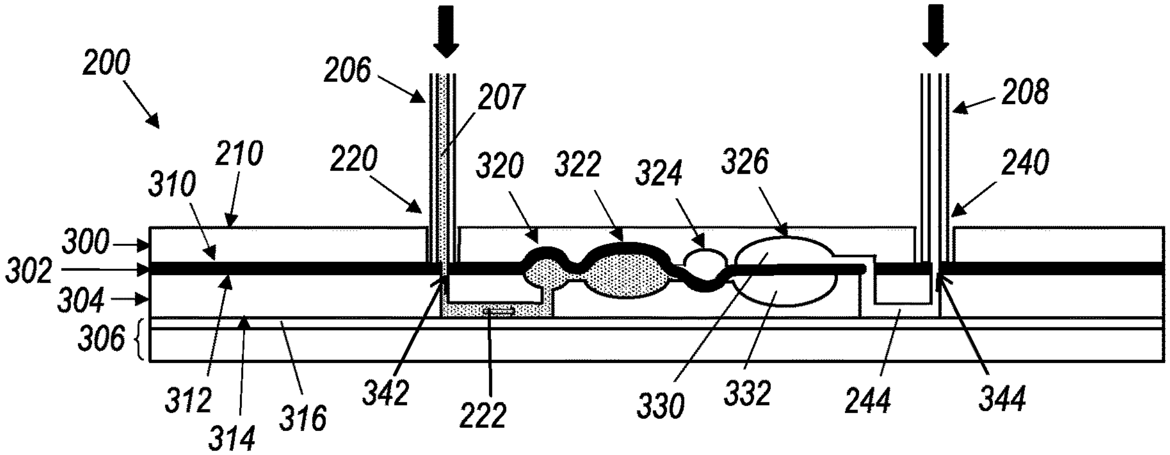
FIG. 4B depicts a cross-sectional side view of the process chip of FIG. 3 in a second state of operation.
Figure 4C:
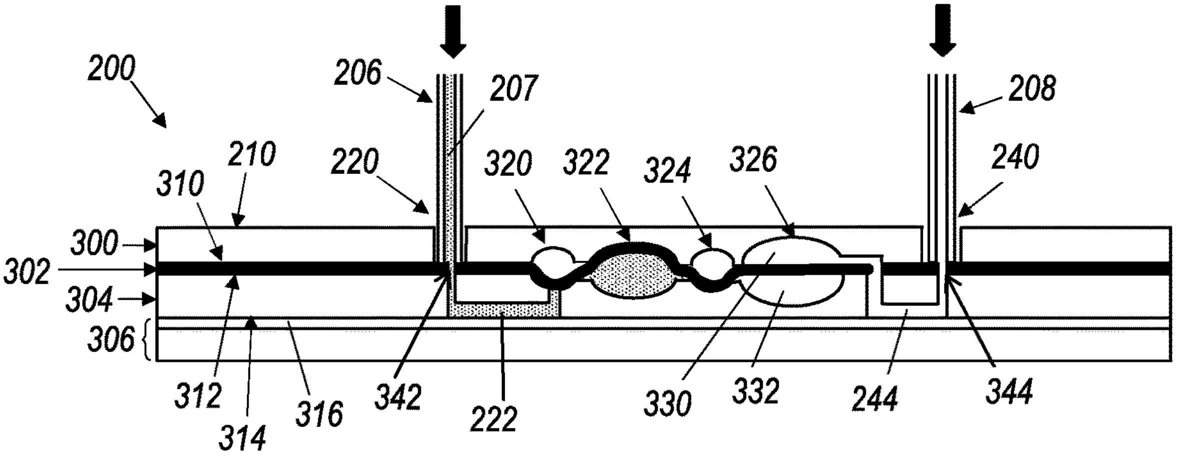
FIG. 4C depicts a cross-sectional side view of the process chip of FIG. 3 in a third state of operation.
Figure 4D:
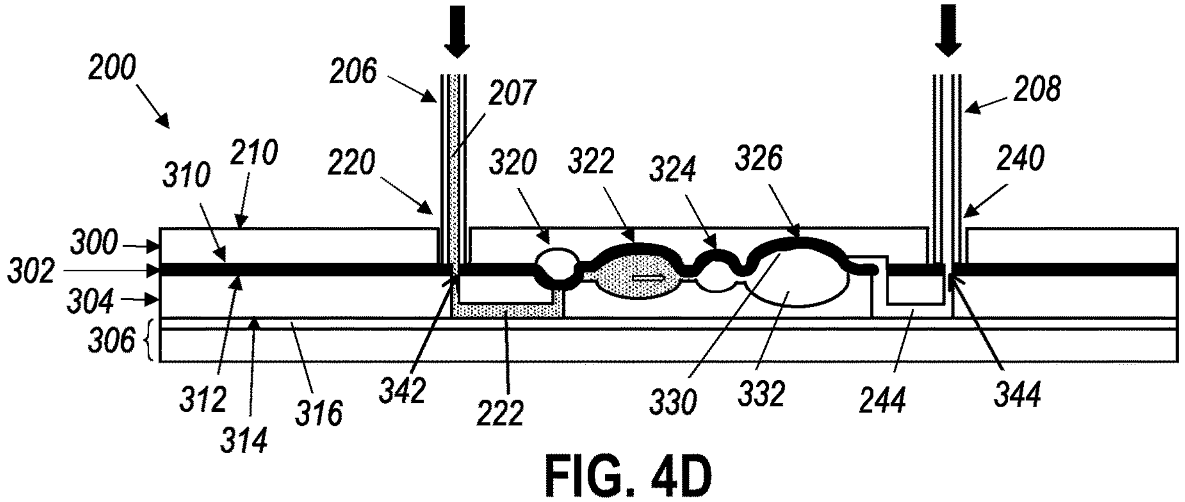
FIG. 4D depicts a cross-sectional side view of the process chip of FIG. 3 in a fourth state of operation.
Figure 4E:
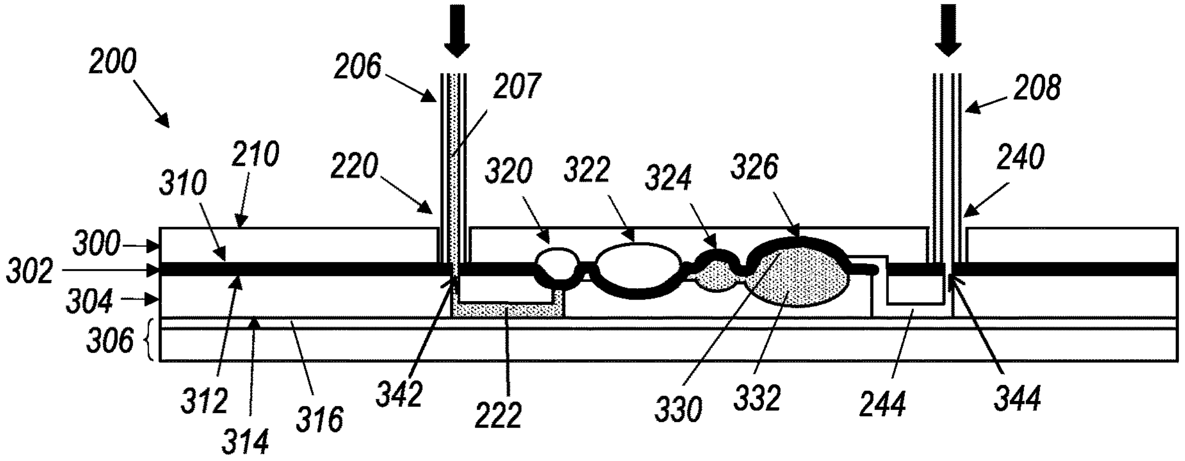
FIG. 4E depicts a cross-sectional side view of the process chip of FIG. 3 in a fifth state of operation.
Figure 4F:
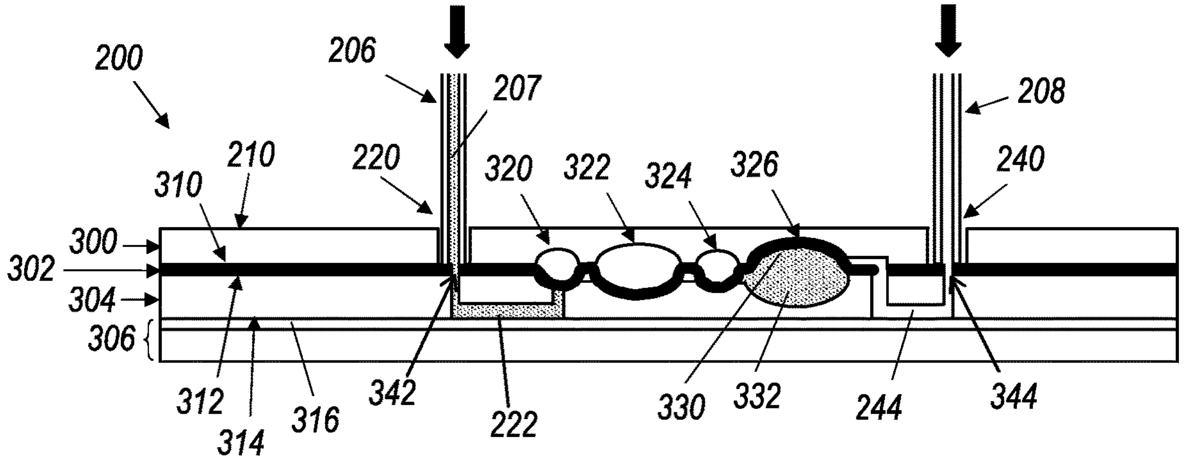
FIG. 4F depicts a cross-sectional side view of the process chip of FIG. 3 in a sixth state of operation.

FIGS. 3-4F depict the example of process chip (200) in further detail. In combination with the rest of system (100), process chip (200) may be utilized to provide in-vitro synthesis, purification, concentration, formulation, and analysis of therapeutic compositions, including but not limited to therapeutic polynucleotides. As shown in FIG. 3, process chip (200) of this example includes a plurality of fluid ports (220). Each fluid port (220) has an associated fluid channel (222) formed in process chip (200), such that fluid communicated into fluid port (220) will flow through the corresponding fluid channel (222). As described in greater detail below, each fluid port (220) is configured to receive fluid from a corresponding fluid line (206) from fluid interface assembly (109). In the present example, each fluid channel (222) leads to a valve chamber (224), which is operable to selectively prevent or permit fluid from the corresponding fluid channel (222) to be further communicated along process chip (200) as will be described in greater detail below.

As also shown in FIG. 3, process chip (200) of this example includes a plurality of additional chambers (230, 250, 270) that may be used to serve different purposes during the process of producing the therapeutic composition as described herein. By way of example only, such additional chambers (230, 250, 270) may be used to provide synthesis, purification, dialysis, compounding, and concentration of one or more therapeutic compositions; or to perform any other suitable function(s). Fluid may be communicated from one chamber (230) to another chamber (230) via a fluidic connector (232). In some versions, fluidic connector (232) is operable like a valve between an open and closed state (e.g., similar to valve chamber (224)). In some other versions, fluidic connector (232) remains open throughout the process of making the therapeutic composition. In the present example, chambers (230) are used to provide synthesis of polynucleotides, though chambers (230) may alternatively serve any other suitable purpose(s).

In the example shown in FIG. 3, another valve chamber (234) is interposed between one of chambers (230) and one of chambers (250), such that fluid may be selectively communicated from chamber (230) to chamber (250). Chambers (250) are provided in a pair and are coupled with each other such that process chip (200) may communicate the fluid back and forth between chambers (250). While a pair of chambers (250) are provided in the present example, any other suitable number of chambers (250) may be used, including just one chamber (250) or more than two chambers (250). Chambers (250) may be used to provide purification of the fluid and/or may serve any of the other various purposes described herein; and may have any suitable configuration. In versions where a chamber (250) is used for purification, chamber (250) may include a material that is configured to absorb selected moieties from a fluidic mixture in chamber (250). In some such versions, the material may include a cellulose material, which may selectively absorb double-stranded mRNA from a mixture. In some such versions, the cellulose material may be inserted in only one chamber (250) of a pair of chambers (250), such that upon mixing the fluid from the first chamber (250) of the pair to the second chamber (250), mRNA and/or some other component may be effectively removed from the fluidic mixture, which may then be transferred to another pair of chambers (270) further downstream for further processing or export. Alternatively, chambers (250) may be used for any other suitable purpose.

Additional valve chambers (252) are interposed between each chamber (250) and a corresponding chamber (270), such that fluid may be selectively communicated from chambers (250) to chambers (270) via valve chambers (252). Chambers (270) are also coupled with each other such that process chip (200) may communicate the fluid back and forth between chambers (270). Chambers (270) may be used to provide mixing of the fluid and/or may serve any of the other various purposes described herein; and may have any suitable configuration.

As shown in FIG. 3, chambers (270) are also coupled with additional fluid ports (221) via corresponding fluid channels (223) and valve chambers (225). Fluid ports (221), fluid channels (223), and valve chambers (225) may be configured an operable like fluid ports (220), fluid channels (222), and valve chambers (224) described above. In some versions, fluid ports (221) are used to communicate additional fluids to chambers (270). In addition, or in the alternative, fluid ports (221) may be used to communicate fluid from process chip (200) to another device. For instance, fluid from chambers (270) may be communicated via fluid ports (221) directly to another process chip (200), to one or more vials in reagent storage frame (107), or elsewhere.

Process chip (200) further includes several reservoir chambers (260). In this example, each reservoir chamber (260) is configured to receive and store fluid that is being communicated to or from a corresponding chamber (250, 270). Each reservoir chamber (260) has a corresponding inlet valve chamber (262) and outlet valve chamber (264). Each inlet valve chamber (262) is interposed between reservoir chamber (260) and the corresponding chamber (250, 270) and is thereby operable to permit or prevent the flow of fluid between reservoir chamber (260) and the corresponding chamber (250, 270). Each outlet valve chamber (264) is operable to meter the flow of fluid between reservoir chamber (260) and a corresponding fluid port (266). In some versions, each fluid port (266) is configured to communicate fluid from a corresponding vial in reagent storage frame (107) to a corresponding reservoir chamber (260). In addition, or in the alternative, each fluid port (266) may be configured to communicate fluid from a corresponding reservoir chamber (260) to a corresponding vial in reagent storage frame (107). In the present example, reservoir chambers (260) are used to provide metering of fluid communicated to and/or from process chip (200). Alternatively, reservoir chambers (260) may be utilized for any other suitable purposes, including but not limited to pressurizing fluid that is communicated to and/or from process chip (200).

As also shown in FIG. 3, process chip (200) of this example includes a plurality of pressure ports (240). Each pressure port (240) has an associated pressure channel (244) formed in process chip (200), such that pressurized gas communicated through pressure port (240) will be further communicated through the corresponding pressure channel (244). As described in greater detail below, each pressure port (240) is configured to receive pressurized gas from a corresponding pressure line (208) from fluid interface assembly (109). In the present example, each pressure channel (244) leads to a corresponding chamber (224, 225, 230, 234, 250, 252, 260, 262, 264, 270) to thereby provide valving or peristaltic pumping via such chambers (224, 225, 230, 234, 250, 252, 260, 262, 264, 270) as described in greater detail below.

Process chip (200) may also include electrical contacts, pins, pin sockets, capacitive coils, inductive coils, or other features that are configured to provide electrical communication with other components of system (100). In the example shown in FIG. 3, process chip (200) includes an electrically active region (212) includes such electrical communication features. Electrically active region (212) may further include electrical circuits and other electrical components. In some versions, electrically active region (212) may provide communication of power, data, etc. While electrically active region (212) is shown in one particular location on process chip, electrically active region (212) may alternatively be positioned at any other suitable location or locations. In some versions, electrically active region (212) is omitted.

As shown in FIGS. 4A-4F, process chip (200) further includes a first plate (300), an elastic layer (302), a second plate (304), and a third plate (306). As described in greater detail below, some versions of elastic layer (302) are in the form of a flexible membrane. First plate (300) has an upper surface (210) and a lower surface (310), with lower surface (310) apposing elastic layer (302). Second plate (304) has an upper surface (312) and a lower surface (314), with upper surface (312) apposing elastic layer (302); and with lower surface (314) apposing third plate (306). Elastic layer (302) is thus interposed between first and second plates (300, 304). In the present example, another elastic layer (316) is also interposed between second and third plates (304, 306), though this elastic layer (316) is optional.

Plates (300, 304, 306) of the present example are at least substantially translucent to visible light and/or ultraviolet light. By "substantially translucent" is meant that at least 90% of light is transmitted through the material compared to a translucent material. In some variations, the one or more of plates (300, 304, 306) may comprise materials that are substantially transparent to visible light and/or ultraviolet light. By "substantially" translucent is meant that at least 90% of light is transmitted through the material compared to a completely transparent material. As another example, one or more of plates (300, 304, 306) may provide transmission of ultraviolet light at a wavelength of approximately 260 nm at a transmission rate ranging from approximately 0.2% to approximately 20%, including from approximately 0.4% to approximately 15%, or including from approximately 0.5% to approximately 10%.

Plates (300, 304, 306) of the present example are also rigid. In some other versions, one or more of plates (300, 304, 306) are semi-rigid. Plates (300, 304, 306) may comprise glass, plastic, silicone, and/or any other suitable material(s). In some versions, one or more of plates (300, 304, 306) is formed as a lamination of two or more layers of material, such that each plate (300, 304, 306) does not necessarily need to be formed as a single homogenous continuum of material. The material(s) comprising one of plates (300, 304, 306) may also differ from the material(s) comprising other plates (300, 304, 306).

Elastic layer (302) of the present example is formed as a liquid-impermeable flexible membrane. In some versions, elastic layer (302) is gas-permeable despite being liquid-impermeable. In some such versions, certain regions of elastic layer (302) are treated to be gas-permeable while the non-treated regions of elastic layer (302) are gas-impermeable. As described below, elastic layer (302) may be used to drive fluids across process chip (200) via peristaltic pumping action. As also described below, elastic layer (302) may be used to provide valves at various locations along process chip (200). In some versions, a single sheet of elastic material spans across the width of process chip (200) to form elastic layer (302). In some other versions, two or more discrete pieces of elastic material are used to form elastic layer (302), which such discrete pieces of elastic material being positioned at different locations across the width of process chip (200). By way of example only, elastic layer (302) may include a membrane comprising polydimethylsilicone (PDMS) elastomer film.

As best seen in FIGS. 4A-4F, first and second plates (300, 304) cooperate to define a plurality of chambers (320, 322, 324, 326), with elastic layer (302) bisecting each chamber (320, 322, 324, 326) into a corresponding upper chamber region (330) and lower chamber region (332). Chambers (224, 225, 230, 234, 250, 252, 260, 262, 264, 270) shown in FIG. 3 may be configured and operable just like chambers (320, 322, 324, 326) shown in FIGS. 4A-4F. For instance, chamber (320) may be analogous to chamber (264), chamber (322) may be analogous to chamber (260), chamber (324) may be analogous to chamber (262), and chamber (326) may be analogous to chamber (250).

As shown in FIGS. 4A-4F, fluid port (220) is formed through first plate (220). A corresponding opening (342) is formed through the region of elastic layer (302) underlying fluid port (220). Fluid channel (222) extends from opening (342) to lower chamber region (332) of first chamber (320). As noted above, fluid port (220) is configured to receive a fluid line (206) from fluid interface assembly (109). The distal end of fluid line (206) is configured to seal against the region of elastic layer (302) that is exposed by fluid port (220) and communicate fluid (207) through opening (342). In some versions, a spring or other resilient member provides a resilient bias to fluid line (206), urging the distal end of fluid line (206) against the region of elastic layer (302) that is exposed by fluid port (220) to thereby maintain the seal. Fluid (207) from fluid line (206) reaches lower chamber region (332) of first chamber (320) via fluid channel (222). As described in greater detail below, this fluid (207) may be further communicated from first chamber (320) to other chambers (322, 324, 326) through a peristaltic pumping action that is provided via elastic layer (302). After reaching fourth chamber (326), the fluid (207) may be further communicated to other chambers or other features in biochip (100), may be communicated to a storage vial in reagent storage frame (107), or may be otherwise processed. The path for fluid (207) thus does not necessarily terminate at fourth chamber (326). It should also be understood that any of the other fluid ports (221, 266) shown in FIG. 3 may be configured and operable like fluid port (220) shown in FIGS. 4A-4F.

Pressure port (240) is formed through first plate (220). A corresponding opening (344) is formed through the region of elastic layer (302) underlying fluid port (240). Pressure channel (244) extends from opening (344) to upper chamber region (330) of first chamber (320). As noted above, pressure port (240) is configured to receive a pressure line (208) from fluid interface assembly (109), to thereby receive pressurized gas from pressure source (117). The distal end of pressure line (208) is configured to seal against the region of elastic layer (302) that is exposed by pressure port (240) and communicate either positively pressurized gas or negatively pressurized gas through opening (344). In some versions, a spring or other resilient member provides a resilient bias to pressure line (208), urging the distal end of pressure line (208) against the region of elastic layer (302) that is exposed by pressure port (240) to thereby maintain the seal. Positively pressurized gas or negatively pressurized gas from pressure line (208) reaches upper chamber region (330) of fourth chamber (326) via pressure channel (244).

While FIGS. 4A-4F depict just one pressure line (208) being coupled with process chip (200), process chip (200) may have several coupled pressure lines (208), with such pressure lines (208) independently applying positive or negative pressure to corresponding chambers (320, 322, 324, 326) of process chip (200). In some versions, one or more of chambers (320, 322, 324, 326) has its own dedicated pressure line (208) and corresponding pressure channel (244). In addition, or in the alternative, one or more of chambers (320, 322, 324, 326) may share a common pressure line (208), via the same pressure channel (244) or via separate pressure channels (244). While FIGS. 4A-4F depict pressure channel (244) formed through second plate (304), some pressure channels (244) (or regions of pressure channels (244)) may be formed by first plate (300). For instance, some pressure channels (244) (or regions of pressure channels (244)) may be formed between a recess in the lower surface of first plate (300) and the top surface of elastic layer (302).

A. Example of Valving and Peristaltic Pumping Driven Via Elastic Layer

As noted above, elastic layer (302) may be operated to drive fluid through process chip (200) through a peristaltic pumping action; and to arrest movement of fluid through process chip (200) by providing a valving action. An example of such operation is illustrated in the sequence depicted through FIGS. 4A-4F. In this example, chambers (320, 324) serve as valve chambers, while chamber (322) serves as a metering chamber. Chamber (326) serves as a working chamber, such that synthesis, purification, dialysis, compounding, concentration, or some other process is performed in chamber (326). This configuration, arrangement, and usage of chambers (320, 322, 324, 326) is provided as an illustrative example. Chambers (320, 322, 324, 326) may alternatively be configured, arranged, and used in other ways.

FIG. 4A shows process chip (200) in a state where fluid is not yet being communicated to process chip (200); and pressurized gas is not yet being communicated to process chip (200). In FIG. 4B, positively pressurized gas is communicated to upper chamber region (330) of chamber (324), negatively pressurized gas is communicated to upper regions (330) of chambers (320, 322), and fluid (207) is communicated to chambers (320, 322). In this state, the positively pressurized gas deforms the portion of elastic layer (302) in chamber (324) such that elastic layer (302) seats against the surface of lower chamber region (332) of chamber (324). This seating of elastic layer (302) against the surface of lower chamber region (332) of chamber (324) prevents fluid (207) from entering chamber (324), such that chamber (324) is operating like a closed valve in the state shown in FIG. 4B. The negatively pressurized gas in upper chamber regions (330) of chambers (320, 322) causes the corresponding portion of elastic layer (302) in chambers (320, 322) to deform and seat against upper chamber regions (330) of chambers (320, 322). This allows fluid (207) to occupy the full capacity of chambers (320, 322).

After reaching the state shown in FIG. 4B, positively pressurized gas is communicated to upper chamber region (330) of chamber (320) while the pneumatic state of chambers (322, 324) remains unchanged. This results in the state shown in FIG. 4C. As shown, the positively pressurized gas deforms the portion of elastic layer (302) in chamber (320) such that elastic layer (302) seats against the surface of lower chamber region (332) of chamber (320). This seating of elastic layer (302) against the surface of lower chamber region (332) of chamber (320) drives the fluid (207) out from chamber (320) and results in chamber (320) operating like a closed valve in the state shown in FIG. 4C. However, the volume of fluid (207) in chamber (322) is unaffected in the state shown in FIG. 4C. Chamber (322) may thus be used to provide metering of fluid (207), such that only a precise, predetermined volume of fluid (207) is communicated further along process chip (200). By way of example only, such metered volumes may be on the order of approximately 10 nL, 20 nL, 25 nL, 50 nL, 75 nL, 100 nL, 1 microliter, 5 microliters, etc.

Once the appropriate metering volume has been achieved, negatively pressurized gas is communicated to upper chamber regions (330) of chambers (324, 326) while the pneumatic state of chambers (320, 322) remains unchanged. This results in the state shown in FIG. 4D. As shown, the negatively pressurized gas in upper chamber regions (330) of chambers (324, 326) causes the corresponding portion of elastic layer (302) in chamber (324, 326) to deform and seat against the surface of upper chamber regions (330) of chambers (324, 326). This effectively opens the valve formed by chamber (324) and puts chamber (326) in a state to receive fluid (207). This also produces a negative pressure in chamber (324) that draws fluid (207) from chamber (322) into chamber (324).

With the valve formed by chamber (324) being in the open state, positively pressurized gas is communicated to upper chamber region (330) of chamber (322) while the pneumatic state of chambers (320, 324, 326) remains unchanged. This results in the state shown in FIG. 4E. As shown, the positively pressurized gas in upper chamber region (330) of chamber (322) causes the corresponding portion of elastic layer (302) in chamber (322) to deform and seat against the surface of lower chamber region (332) of chamber (322). This deformation of elastic layer (302) drives fluid (207) out of chamber (322). Since the valve formed by chamber (320) is in a closed state and the valve formed by chamber (324) is in an open state, fluid (207) travels from chamber (322) into chamber (324). In the present example, the capacity of chamber (322) is greater than the capacity of chamber (324), such that fluid (207) from chamber (322) overflows from chamber (324) into chamber (326).

Once fluid (207) has been communicated from chamber (322) to chambers (324, 326), positively pressurized gas is communicated to upper chamber region (330) of chamber (324) while the pneumatic state of chambers (320, 322, 326) remains unchanged. This results in the state shown in FIG. 4F. As shown, the positively pressurized gas in upper chamber region (330) of chamber (324) causes the corresponding portion of elastic layer (302) in chamber (324) to deform and seat against the surface of lower chamber region (332) of chamber (324). This deformation of elastic layer (302) drives fluid (207) out of chamber (324). Since the deformed portion of elastic layer (302) in chamber (324) is effectively sealing off chamber (324) from chamber (324) (e.g., such that chamber (324) is operating like a valve in a closed state), fluid (207) travels from chamber (324) into chamber (326).

At the stage shown in FIG. 4F, fluid (207) has been evacuated from chambers (320, 332, 324), and chamber (326) contains the volume of fluid (207) that was precisely metered in chamber (322). Fluid (207) in chamber (326) may be further processed within chamber (326) in accordance with the teachings herein. In addition, or in the alternative, fluid (207) in chamber (326) may be communicated to one or more other chambers in process chip (200), may be communicated to a vial in reagent storage frame (107), or may be otherwise handled. Regardless of what is done with fluid (207) after fluid (207) has reached chamber (326), it should be understood that fluid (207) was communicated along chambers (320, 322, 324), in a sequence, to reach chamber (326) via a peristaltic action created through elastic layer (302) in response to positively pressurized gas or negatively pressurized gas being communicated to upper chamber regions (330) of chambers (320, 322, 324, 326) in a particular sequence. Such peristaltic pumping may have particular advantage for moving fluid that may be viscous or contain suspended particles such as purification or capture beads. Such peristaltic pumping through selective deformation of elastic layer (302) may also be referred to as pneumatic barrier deflection or "pneumodeflection."

In some scenarios, it may be necessary or otherwise desirable to remove air or other gas from one or more fluid pathways in process chip (200). To accomplish this, process chip (200) may include one or more chambers that are configured to provide ventilation of a fluid pathway or otherwise evacuate gas from the fluid pathway. For instance, such ventilation or evacuation may be performed as part of a priming process as fluid is initially introduced to process chip (200). In addition, or in the alternative, such ventilation or evacuation may be performed to relieve gas that is generated in the fluid during the process of forming the therapeutic composition. Such ventilation or gas relief chambers may be referred to as "vacuum caps." In some versions, at least the region of elastic layer (302) that is positioned in the vacuum cap (if not the entirety of elastic layer (302)) is gas permeable (while still being liquid impermeable). Negatively pressurized gas may be applied to the upper chamber region (330) of the chamber that is being used as a vacuum cap, and this negatively pressurized gas may draw the air or gas from the fluid pathway out through the corresponding region of elastic layer (302). In some versions, the upper chamber region (330) of the chamber that is being used as a vacuum cap includes one or more projections or stand-off features that prevent the corresponding region of elastic layer (302) from fully seating against the surface of the upper chamber region (330) of the chamber that is being used as a vacuum cap. This may further promote evacuation of air or other gas via the vacuum cap.

B. Example of Mixing Stage

Figure 5:
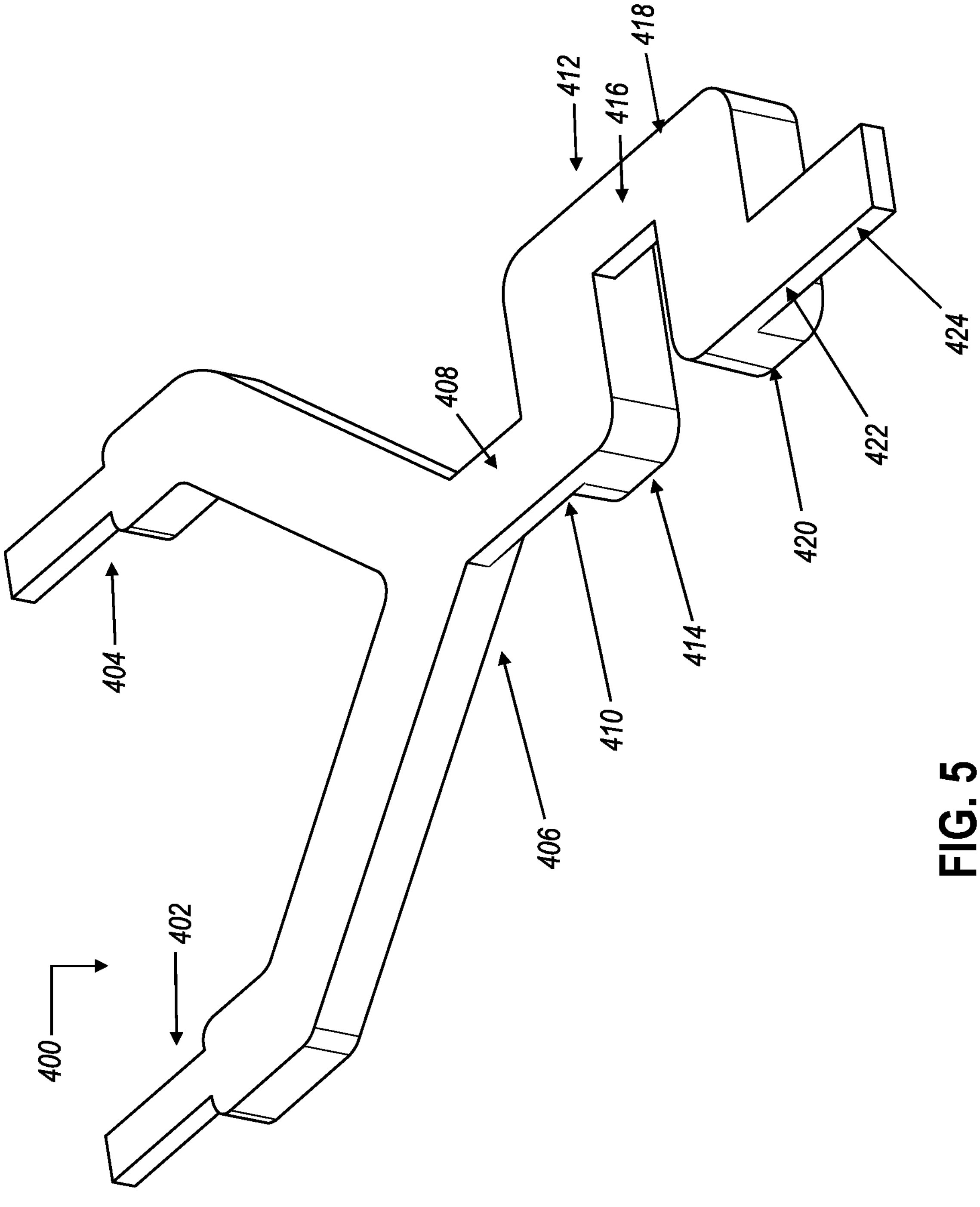
FIG. 5 depicts a perspective view of an example of a mixing stage that may be incorporated into the process chip of FIG. 3.

While chambers (270) may be used to perform mixing of a fluid (e.g., by repeatedly communicating the fluid back and forth between chambers (270)), it may be desirable to provide a differently configured mixing stage along a fluid path leading toward a chamber. FIG. 5 shows an example of such a mixing stage (400) that may be incorporated into a process chip (111, 200). Mixing stage (400) of this example includes two fluid inlet channels (402, 404) that are offset from each other and are configured to transport one or more substances (e.g., biomolecular product(s), buffers, carriers, subsidiary components) that may be combined together. Although two inlet channels (402, 404) are shown, three or more (4, 5, 6, etc.) may be used, and may converge in the same mixing stage (400). The fluidic mixtures may transit inlet channels (402, 404) under positive pressure. This pressure may be constant, variable, increasing, decreasing, and/or pulsatile. Inlet channels (402, 404) may receive fluid from any of the various kinds of chambers or fluid ports described herein.

Inlet channels (402, 404) converge at an intersection (406) that leads to a merged channel (408). In the present example, merged channel (408) has a cross-sectional area that is smaller than the cross-sectional area of each inlet channel (402, 404). The reduced cross-sectional area may include a channel height that is less than the channel height of inlet channels (402, 404) and/or a channel width that is less than the channel width of inlet channels (402, 404). This reduced cross-sectional area may promote mixing of fluids that are introduced via inlet channels (402, 404).

A first vortex mixing chamber (414) is positioned downstream of merged channel (408), with fluid flowing into first vortex mixing chamber (414) via an inlet opening (410). Inlet opening (410) is positioned near a corner of first vortex mixing chamber (414). An outlet opening (412) is positioned near another corner of first vortex mixing chamber (414). First vortex mixing chamber (414) has a height and width greater than the height and width of merged channel (408). These greater dimensions, along with the relative positioning of inlet opening (410) and outlet opening (412), may promote the formation of a vortex within first vortex mixing chamber (414). Such a vortex may further promote mixing of fluid as the fluid flows through first vortex mixing chamber (414).

A connecting channel (416) connects first vortex mixing chamber (414) with a second vortex mixing channel (420). Connecting channel (416) has a height and width less than the height and width of first vortex mixing chamber (414). Second vortex mixing channel (420) has a height and width greater than the height and width of connecting channel (416). Fluid flows from connecting channel (416) into second vortex mixing chamber (420) via an inlet opening (418), which is positioned near a corner of second vortex mixing chamber (420). Fluid flows out of second vortex mixing chamber (420) via an outlet opening (422), which is positioned at another corner of second vortex mixing chamber (420). Outlet opening (420) leads to an outlet channel (424). Outlet channel (424) has a height and width less than the height and width of second vortex mixing chamber (420). The greater dimensions of second vortex mixing chamber (420) (relative to the dimensions of channels (416, 424), and the relative positioning of inlet opening (418) and outlet opening (422), may promote the formation of a vortex within second vortex mixing chamber (420). Such a vortex may further promote mixing of fluid as the fluid flows through second vortex mixing chamber (420).

By the time the fluid flows out through outlet channel (424), the fluid may be sufficiently mixed by mixing stage (400). Such mixed fluid may be further communicated to other chambers or ports for further processing. While mixing stage (400) of this example has two vortex mixing chambers (414, 420), other versions may have just one vortex mixing chamber or more than two vortex mixing chambers.

Figure 6:
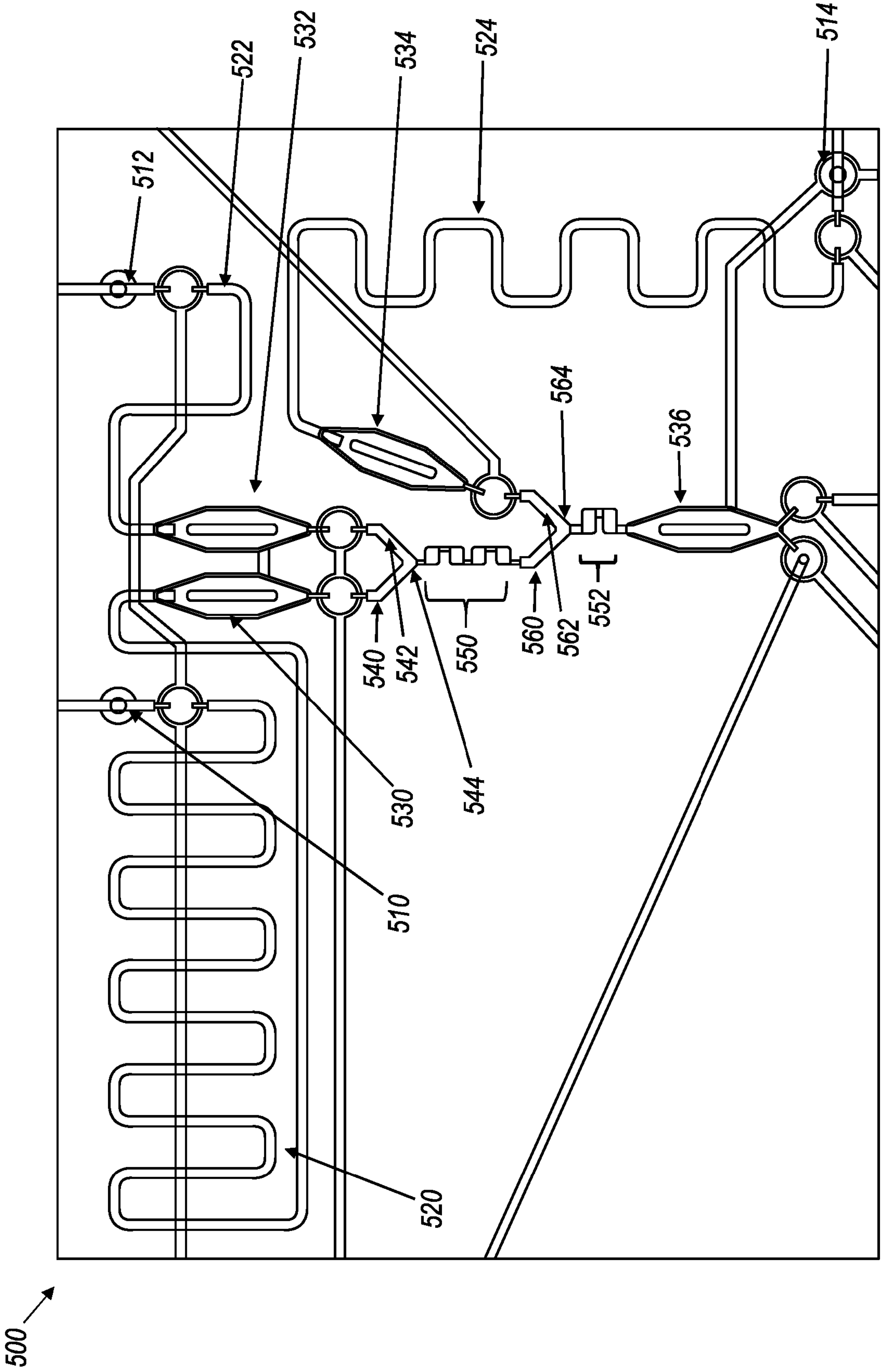
FIG. 6 depicts a top plan view of a portion of an example of a process chip incorporating mixing stages.

FIG. 6 shows an example of a region of a process chip (500) incorporating two mixing stages. In this example, a first fluid passes through a first inlet valve (510), then through a first flow restrictor (520) in the form of a serpentine channel, then through a first vacuum cap (530), before reaching a first inlet (540) of a first mixing stage. A second fluid passes through a second fluid inlet valve (512), then through a second flow restrictor (522) in the form of a serpentine channel, then through a second vacuum cap (532) before reaching a second inlet (542) of the first mixing stage. Inlets (540, 542) converge to provide a single flow path through a merged channel (544), which leads to a first set (550) of vortex mixing chambers. The vortex mixing chambers of first set (550) may be configured and operable like vortex mixing chambers (414, 420) described above. While four vortex mixing chambers are included in first set (550) in this example, first set (550) may instead have any other suitable number of vortex mixing chambers.

After flowing through first set (550) of vortex mixing chambers, the fluid reaches a first inlet (560) of a second mixing stage. A third fluid passes through a third fluid inlet valve (514), then through a third flow restrictor (524) in the form of a serpentine channel, then through a third vacuum cap (534) before reaching a second inlet (562) of the second mixing stage. Inlets (560, 562) converge to provide a single flow path through a merged channel (564), which leads to a second set (552) of vortex mixing chambers. The vortex mixing chambers of second set (552) may be configured and operable like vortex mixing chambers (414, 420) described above. While two vortex mixing chambers are included in second set (552) in this example, second set (552) may instead have any other suitable number of vortex mixing chambers.

After flowing through second set (552) of vortex mixing chambers, the fluid passes through a fourth vacuum cap (536). After passing through fourth vacuum cap (536), the fluid may be substantially mixed by both sets (550, 552) of vortex mixing chambers; and any air bubbles may have been removed by vacuum caps (530, 532, 534, 536). The mixed fluid may be further communicated to other chambers or ports for further processing after passing through fourth vacuum cap (536).

In one example of how process chip (500) may be used, a polynucleotide (e.g., mRNA in water) may be introduced via first inlet valve (510) while a delivery vehicle molecule or molecules in a fluid medium (e.g., ethanol or some other fluid medium) may be introduced via second inlet valve (512). These fluids may be mixed through first set (550) of vortex mixing chambers to form complexed nanoparticles. A dilution agent (e.g., citrate-based buffer solution or other kind of buffer) may be introduced via third inlet valve (514) to provide pH adjustment as the dilution agent is mixed with the complexed nanoparticle in second set (552) of vortex mixing chambers. Other suitable ways in which process chip (500) may be used will be apparent to those skilled in the art in view of the teachings herein.

The foregoing structures are examples of how mixing of fluids from different sources may be carried out in a process chip (111, 200, 500). It is contemplated that various other kinds of structures may be used to provide mixing of fluids from different sources in a process chip (111, 200, 500).

C. Example of Concentration Chamber

Some variations of in a process chip (111, 200, 500) may further include a concentration chamber. In some versions of a concentration chamber, polynucleotides may be concentrated by driving off excess fluidic medium, and the concentrated polynucleotide mixture may be exported out of the concentration chamber for further handling or use. In some variations, the concentration chamber may be in the form of a dialysis chamber. For example, a dialysis membrane may be present within or between plates of process chip (111, 200, 500). In some other variations, a concentration chamber may provide concentration without necessarily serving as a dialysis chamber.

Figure 7:
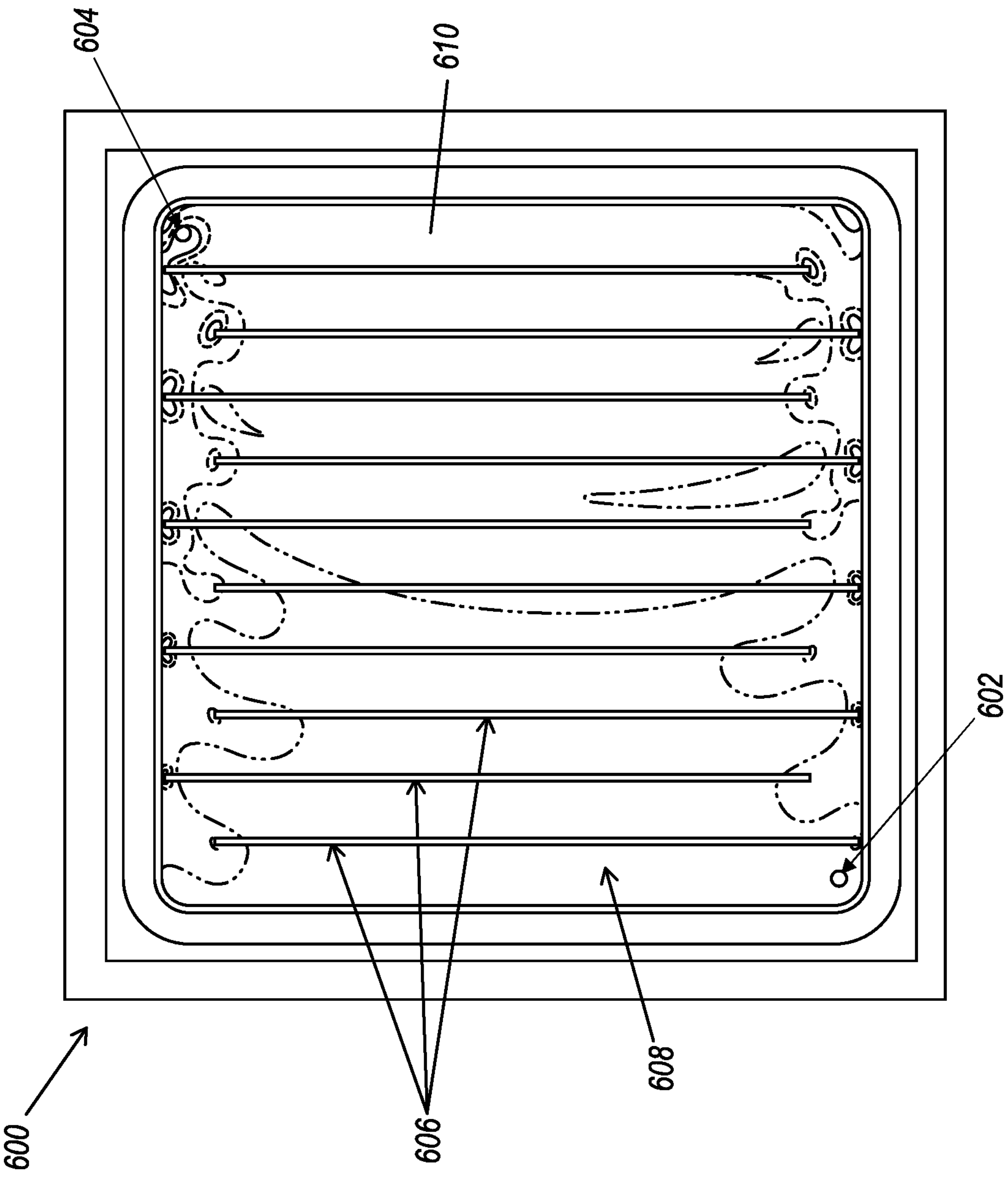
FIG. 7 depicts a top plan view of an example of a concentration chamber that may be incorporated into the process chip of FIG. 3.

FIG. 7 shows an example of a concentration chamber (600) that may be incorporated into a process chip (111, 200, 500). Concentration chamber (600) of this example includes an inlet (602) and an outlet (604). A plurality of walls (606) forms a serpentine flow path (608) between inlet (602) and outlet (604). A membrane (610) is positioned over flow path (608). In the present example, inlet (602) and outlet (604) are both below membrane (610), such that fluid flows along flow path (608) underneath membrane (608). Membrane (610) is configured to allow water vapor to pass through membrane (610). Air may be flowed across the top of membrane (610) to promote evaporation. One or more pressure lines (208) may be fluidically coupled with the region above membrane (610) to provide such air flow; and to evacuate the water vapor. This evaporation through membrane (610) may provide concentration of the fluid flowing through flow path (608) underneath membrane (610).

In some versions, membrane (610) comprises polytetrafluoroethylene with a pore size of approximately 0.22 micrometers and a thickness of approximately 37 micrometers. Alternatively, any other suitable kind of materials, pore size, and thickness may be used for membrane (610). By way of further example, fluid may pass through inlet (602) at a flow rate of approximately 0.5 ml/min; and through outlet (604) at a flow rate of approximately 0.019 ml/min. Alternatively, any other suitable flow rates may be provided. In some versions, concentration chamber (600) concentrates a therapeutic composition to a point where the therapeutic composition is in an injectable form after leaving concentrations stage (600). After leaving concentration chamber (600) via outlet (604), the fluid may be further communicated to other chambers or ports for further processing; or may be communicated to a storage vial in reagent storage frame (107).

The features of process chip (111, 200, 500) described above are non-limiting examples. Additional features that may be incorporated into a process chip (111, 200, 500) are described in greater detail below. Such additional features may be included in a process chip (111, 200, 500) in addition to, or in lieu of, any of the features described above. There may also be scenarios where a plurality of different kinds of process chips (111, 200, 500) are available to serve different kinds of purposes (e.g., to produce different kinds of therapeutic compositions), such that an operator may select the most appropriate biochip on an ad hoc basis to prepare the desired therapeutic substance. Such selections may be made based on the operator's judgment and/or based on the suggestion or instruction from system (100) via user interface (123). In versions where system (100) suggests the kind of process chip (111, 200, 500) to be used, such suggestion may be based on one or more operator inputs provided via user interface (123) and/or based on other factors.

In some variations, different process chips (111, 200, 500) may be used in the same system, in a sequence or in parallel, to produce a therapeutic composition. For example, in a therapeutic mRNA production process, a first process chip (111, 200, 500) may be used for DNA template production. The resulting template may be transferred in a closed-path manner by system (100) to a second process chip (111, 200, 500). In some versions, the template is transferred directly from the first process chip (111, 200, 500) to the second process chip (111, 200, 500). In some other versions, the transfer is indirect, such that the template is first transferred from the first process chip (111, 200, 500) to a vial in reagent storage frame (107); then transferred from that vial to the second process chip (111, 200, 500). In some variations, the second process chip (111, 200, 500) may be configured to perform in vitro transcription of the mRNA and the purification of that material to generate the drug substance. The product(s) from this second process chip (111, 200, 500) may then be transferred (directly indirectly) to a third process chip (111, 200, 500). Drug product formulation may then take place on the third process chip (111, 200, 500). In such scenarios, the first process chip (111, 200, 500) may be referred to as a "template biochip;" the second process chip (111, 200, 500) as a "IVT biochip;" and the third process chip (111, 200, 500) as a "formulation biochip."

III. Examples of Pressure Sensing in Process Chip

As described above, system (100) is configured to provide production and/or other processing of a therapeutic composition along an entirely closed fluid path, thereby minimizing the risk of contamination during the process of preparing the therapeutic composition. To this end, it may be desirable to determine whether all seals are suitably maintained in a fluid-tight state during operation of system (100). This may be done by monitoring fluid pressure levels within system (100). Monitoring fluid pressure levels within system (100) may also indicate whether valve chambers in process chip (111, 200, 500) are functioning properly, that process chip (111, 200, 500) is properly performing peristaltic pumping as described above, and that the flow of fluid through process chip (111, 200, 500) is otherwise appropriate. It may therefore be desirable to integrate one or more pressure sensing stages in process chip (111, 200, 500). It may be further desirable to provide such pressure sensing without the pressure sensing contaminating or otherwise affecting the properties of the fluid being communicated through process chip (111, 200, 500), without affecting the flow of fluid through process chip (111, 200, 500), without substantially increasing the spatial footprint within system (100), and/or without altering thermal properties of system (100). Examples of how such pressure sensing stages may be configured, how such pressure sensing stages may be integrated into process chip (111, 200, 500), and how pressure data from such pressure sensing stages may be used will be described in greater detail below.

A. Example of Pressure Sensing Stage with Optical Feature on Elastic Layer

Figure 8A:
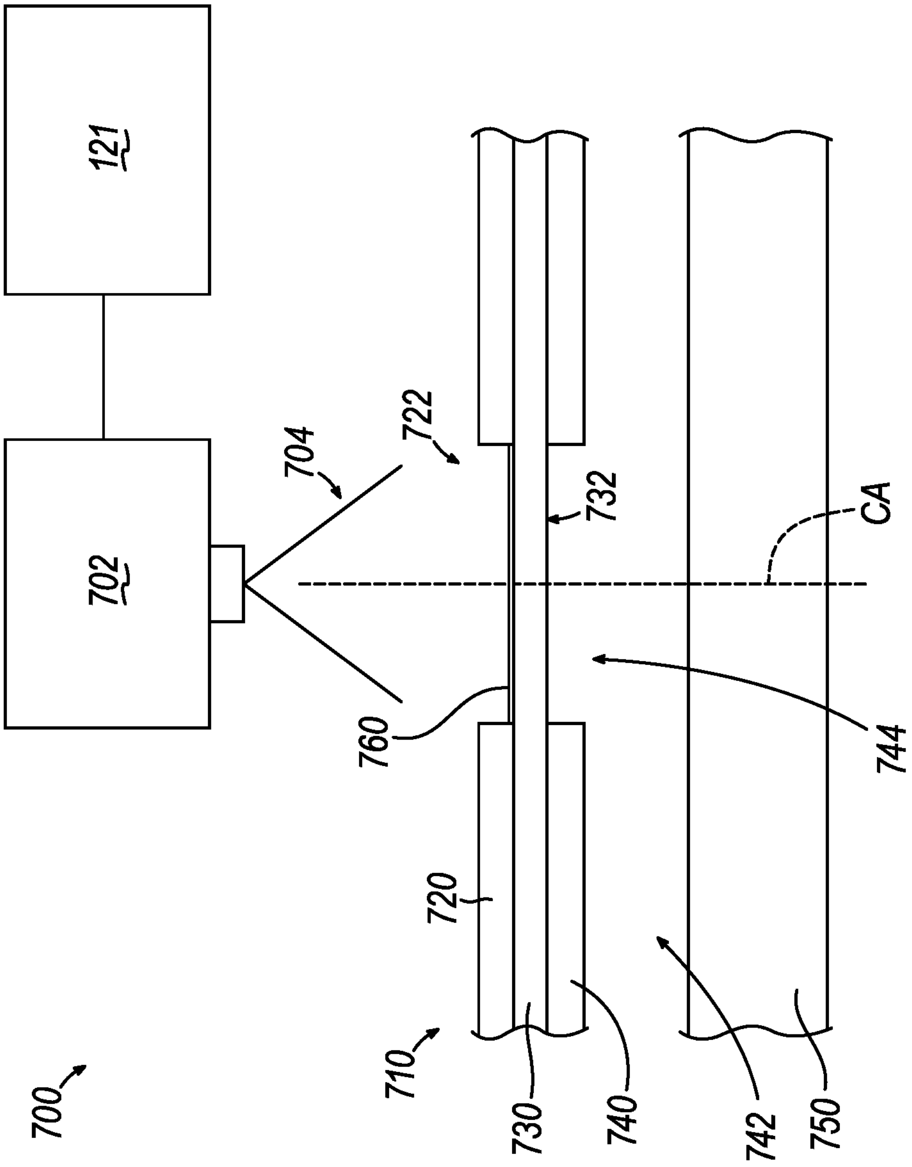
FIG. 8A depicts a schematic cross-sectional view of an example of a pressure sensing stage that may be incorporated into the process chip of FIG. 3, with an elastic layer in a non-deflected state.
Figure 8B:
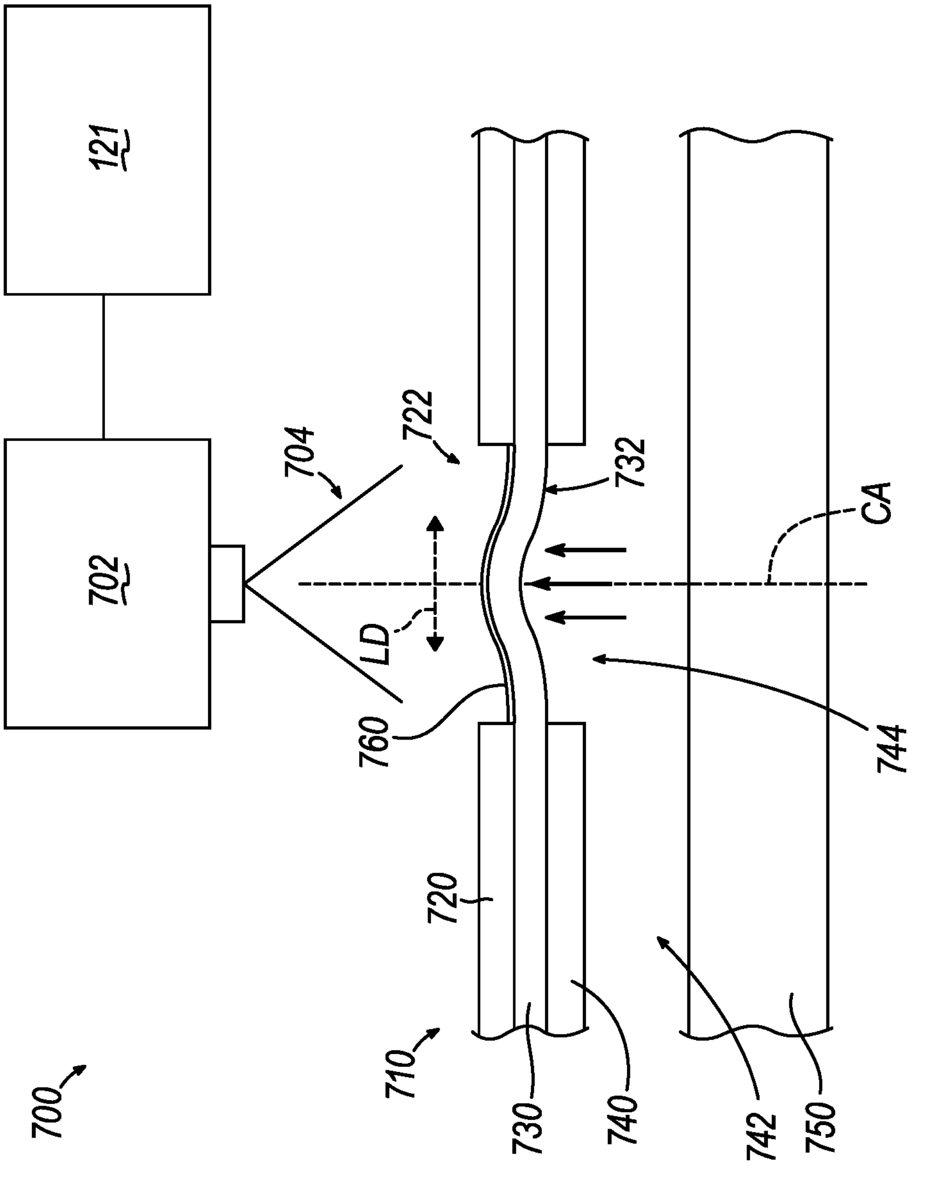
FIG. 8B depicts a schematic cross-sectional view of the pressure sensing stage of FIG. 8A, with the elastic layer in a deflected state.

FIGS. 8A-8B show an example of a pressure sensing stage (700) that includes a portion of a process chip (710), a camera (702), and controller (121). In addition to including the features and functionality described below, process chip (710) may include any of the other features and functionalities described above in the context of process chips (111, 200, 500). In other words, the following teachings relating to pressure sensing stage (700) may be readily applied to any of the various process chips (111, 200, 500) described herein.

Camera (702) of the present example is positioned to provide a field of view (704) in which camera (702) may capture images of an optical feature (760) of process chip (700). While camera (702) is shown in FIGS. 8A-8B as being positioned directly over optical feature (760), camera (702) may instead be positioned at any other suitable locations. For instance, in some variations, camera (702) is positioned directly underneath process chip (710). In some such versions (e.g., where at least a corresponding region of process chip (710) is optically transmissive), optical feature (760) may still be directly within the field of view (704) of camera (702) despite camera (702) being underneath process chip (710).

In versions where optical feature (760) is not directly within the field of view (704) of camera (702), one or more mirrors may be positioned to provide a reflection of optical feature (760), with the reflection being within the field of view (704) of camera (702). In some versions, camera (702) may be regarded as one of sensors (105) of system (100) as described above. For instance, an optical sensor (105) such as an optical sensor (160) shown in FIG. 2 may serve as camera (702) in pressure sensing stage (700). Thus, while camera (702) is used in pressure sensing stage (700) as described below, camera (702) may also be used to serve other functions, including but not limited to viewing barcodes on vials held within reagent storage frame (107), viewing fluid levels within vials held within reagent storage frame (107), viewing fluidic movement within process chip (700), and/or viewing other optically detectable conditions.

Controller (121) receives image signals from camera (702) and processes those image signals to determine a fluid pressure value as described in greater detail below. Controller (121) may further execute various algorithms using at least such determined fluid pressure values, as will also be described in greater detail below. In the present example, controller (121) of pressure sensing stage (700) is the same controller (121) that is used to perform other operations in system (100) as described above. In some other versions, a separate controller is used to determine fluid pressure values using at least image signals from camera (702). In such versions, the separate controller may communicate those determined fluid pressure values to controller (121) for execution of pressure-based algorithms. Alternatively, the determined fluid pressure values may be utilized in any other suitable fashion by any other suitable hardware components.

Process chip (710) of the present example includes a first plate (720), an elastic layer (730), a second plate (740), and a third plate (750). Elastic layer (730) is interposed between plates (720, 740). Third plate (750) cooperates with second plate (740) to define a channel (742) through which fluid may flow. The region of channel (742) at the left-hand side of FIGS. 8A-8B may be regarded as a fluid input port of pressure-sensing stage (700); while the region of channel (742) at the right-hand-side of FIGS. 8A-8B may be regarded as a fluid output port of pressure-sensing stage (700). Plates (720, 740, 750) of process chip (710) may be configured and operable like plates (300, 304, 306) of process chip (200). Similarly, elastic layer (730) of process chip (710) may be configured and operable like elastic layer (302) of process chip (200). Thus, elastic layer (730) may extend across all or a substantial portion of the width of process chip (710), such that elastic layer (730) may also perform functions in other chambers of process chip (710) (e.g., valving, peristaltic pumping, ventilating etc.).

Second plate (740) defines an opening (744) that is fluidically coupled with channel (742), such that opening (744) exposes a portion (732) of elastic layer (730) to fluid in channel (742). By way of example only, at least portion (732) of elastic layer (730) may have a thickness ranging from approximately 50 micrometers to approximately 200 micrometers; including a thickness of approximately 100 micrometers. First plate (720) defines an opening (722) that is aligned with opening (744) of second plate (740). In the example shown in FIGS. 8A-8B, opening (722) and opening (744) have the same diameter. In some other versions, opening (722) has a larger diameter than opening (744). In some other versions, opening (722) has a smaller diameter than opening (744). In the present example, both openings (722, 744) are circular. Alternatively, openings (722, 744) may have any other suitable respective configurations. In the present example, with opening (744) providing a path for fluid in channel (742) to reach portion (732) of elastic layer (730), and with opening (722) providing clearance for elastic layer (730) to deform, portion (732) of elastic layer (730) may achieve a deformed state as shown in FIG. 8B in response to positive pressurization of fluid within channel (742).

Optical feature (760) is positioned atop portion (732) of elastic layer (730). Optical feature (760) is configured to deform with elastic layer (730). For instance, as shown in the transition from FIG. 8A (non-pressurized state) to FIG. 8B (pressurized state), elastic layer (730) and optical feature (760) deform together, upwardly along a central axis (CA), in response to positive pressurization of fluid within channel (742). In this example, the central axis (CA) is perpendicular to the plane defined by elastic layer (730) when elastic layer (730) is in a non-deformed state (FIG. 8A); and is positioned at the radial center of opening (722). The pressurized state shown in FIG. 8B may occur during the peristaltic driving of fluid from one location upstream of channel (742) to another location downstream of channel (742) during any of the various operations described herein. In addition, or in the alternative, the pressurized state shown in FIG. 8B may occur in various other scenarios, including but not limited to the fluid in channel (742) being from an already-pressurized fluid source in reagent storage frame (107), changes in ambient pressure, pressure loss due to piping, and/or various other conditions. With optical feature (760) being directly or indirectly within the field of view (704) of camera (702), camera (702) is operable to capture images of the deformation of optical feature (760) and transmit the image data to controller (121). Controller (121) is operable to convert the image data into a pressure value indicating the pressure of fluid in channel (742) as described in greater detail below.

As elastic layer (730) and optical feature (760) deform together along the central axis (CA) in response to positive pressurization of fluid within channel (742) (FIG. 8B), elastic layer (730) and optical feature (760) may also deform along a lateral dimension (LD) that is transverse to the central axis (CA). As described in greater detail below, camera (702) and controller (121) may be operated to particularly track this "lateral deformation" along the lateral dimension (LD) to determine the pressure of fluid in channel (742). Such lateral deformation of elastic layer (730) and optical feature (760) may be tracked in addition to, or in lieu of, tracking the deformation of elastic layer (730) and optical feature (760) along the central axis (CA).

While FIG. 8B depicts elastic layer (730) and optical feature (760) deforming upwardly along the central axis (CA) in response to positive pressurization of fluid within channel (742), there may also be scenarios where elastic layer (730) and optical feature (760) deform downwardly along the central axis (CA) in response to negative pressurization of fluid within channel (742). In such scenarios, elastic layer (730) and optical feature (760) may also achieve lateral deformation as described above. Camera (702) and controller (121) may thus be operated to track this lateral deformation to determine the pressure of fluid in channel (742) regardless of whether the pressure is positive (resulting in upward deformation along the central axis (CA)) or negative (resulting in downward deformation along the central axis (CA)). In other words, the pressure sensing structures and techniques are not limited to sensing positive pressures; as the pressure sensing structures and techniques may also be used to sense negative pressures.

Figure 9:
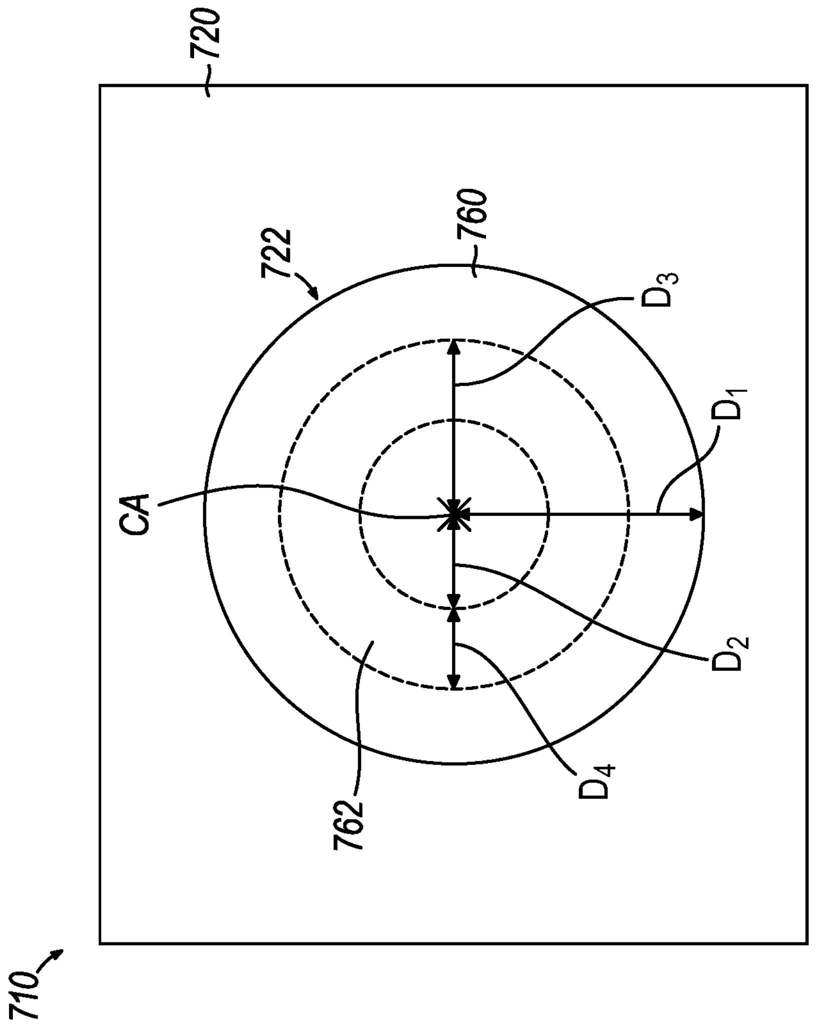
FIG. 9 depicts a top plan view of a portion of the pressure sensing stage of FIG. 8A.

As shown in FIG. 9, optical feature (760) spans across the full radial distance ($D_1$) of opening (722). Alternatively, optical feature (760) may span across only a portion of the full radial distance ($D_1$) of opening (722). In some versions, it may be desirable to track lateral deformation of elastic layer (730) via a certain annular region (762) of optical feature (760). In other words, it may be desirable to track deformation of a certain annular region of elastic layer (730) by optically tracking optical feature (760) within annular region (762) of optical feature (760). In this example, annular region (762) is radially offset outwardly from the central axis (CA); and radially offset inwardly from the outer perimeter of opening (722). Annular region (762) is defined between a first partial radial distance ($D_2$) and a second partial radial distance ($D_3$). Annular region (762) thus has a radial dimension ($D_4$) between these partial radial distances ($D_2$, $D_3$).

By way of example only, opening (722) may have a full radial distance ($D_1$) ranging from approximately 0.75 mm to approximately 3.5 mm, including from approximately 1.0 mm to approximately 3.0 mm. By way of further example only, first partial radial distance ($D_2$) may range from approximately 0.2 mm to approximately 2.0 mm, including from approximately 0.3 mm. to approximately 1.0 mm; or may be approximately 0.5. By way of further example only, second partial radial distance ($D_3$) may range from approximately 1.0 mm to approximately 3.0 mm, including from approximately 1.25 mm to approximately 2.0 mm; or may be approximately 1.5 mm. By way of further example only, radial dimension ($D_4$) of annular region (762) may range from approximately 0.5 mm to approximately 2.25 mm, including from approximately 0.75 mm to approximately 1.75 mm; or may be approximately 1 mm. As another example, optical feature (760) may take the form of concentric rings that are spaced apart from each other by a distance ranging from approximately 50 micrometers to approximately 150 micrometers, including from approximately 75 micrometers to approximately 125 micrometers; or may be a distance of approximately 100 micrometers.

In the present example, optical feature (760) does not affect the elasticity of elastic layer (730). In some versions, optical feature (760) is adhered to elastic layer (730) via an adhesive. In some other versions, optical feature (760) is in the form of a film that is applied to elastic layer (730). In some other versions, optical feature (760) is printed directly on elastic layer (730). In some other versions, optical feature (760) is inscribed on elastic layer (730). In some other versions, optical feature (760) is formed as a texture on elastic layer (730). Alternatively, optical feature (760) may be secured to or otherwise incorporated into elastic layer (730) in any other suitable fashion. In some versions, optical feature (760) spans across the full area of portion (732) of elastic layer (730) as defined by the full radial distance ($D_1$) of opening (722). In some other versions, optical feature (760) is only positioned on one or more discrete regions of portion (732) of elastic layer (730) within opening (722), without spanning across the full area of portion (732) of elastic layer (730) within opening (722). For instance, in some versions, optical feature (760) is only positioned in annular region (762) shown in FIG. 9, such that optical feature (760) does not extend through first partial radial distance ($D_2$) or through the space between second partial radial distance ($D_3$) and full radial distance ($D_1$).

While optical feature (760) is shown as being positioned atop elastic layer (730), some other versions of optical feature (760) may be positioned under elastic layer (730). For instance, optical feature (760) may be positioned under elastic layer (730) in versions where elastic layer (730) is optically transmissive. As another example, optical feature (760) may be positioned under elastic layer (730) in versions where third plate (750) is optically transmissive; and camera (702) may view optical feature (760) from a vantage point that is directly or indirectly under process chip (710). As yet another example, optical feature (760) may be embedded within elastic layer (730). In some such versions, the entire width of elastic layer (730) includes embedded optically viewable features that may serve as optical feature (760), including regions of elastic layer (730) that are outside of portion (732). In some other versions, optical feature (760) is embedded only in portion (732) of elastic layer (730).

In the present example, the pressure sensing portion (732) of elastic layer (730) and optical feature (760) are exposed to atmosphere, such that the deformation of elastic layer (730) and optical feature (760) is based on the difference between the pressure of fluid in channel (742) and atmospheric pressure. In some other versions, the region of process chip (700) above the pressure sensing portion (732) of elastic layer (730) and optical feature (760) may be enclosed and exposed to a fluid path that is pressurized by system (100) at a known pressure level. In such scenarios, controller (121) may measure the pressure of fluid in channel (742) relative to this known, system-generated pressure level. Such versions may prevent changes in atmospheric pressure from affecting the pressure sensing process in a manner that might otherwise occur in versions where the pressure sensing portion (732) of elastic layer (730) and optical feature (760) are exposed to atmosphere.

B. Example of Pressure Sensing Stage with Dedicated Elastic Layer

Figure 10A:
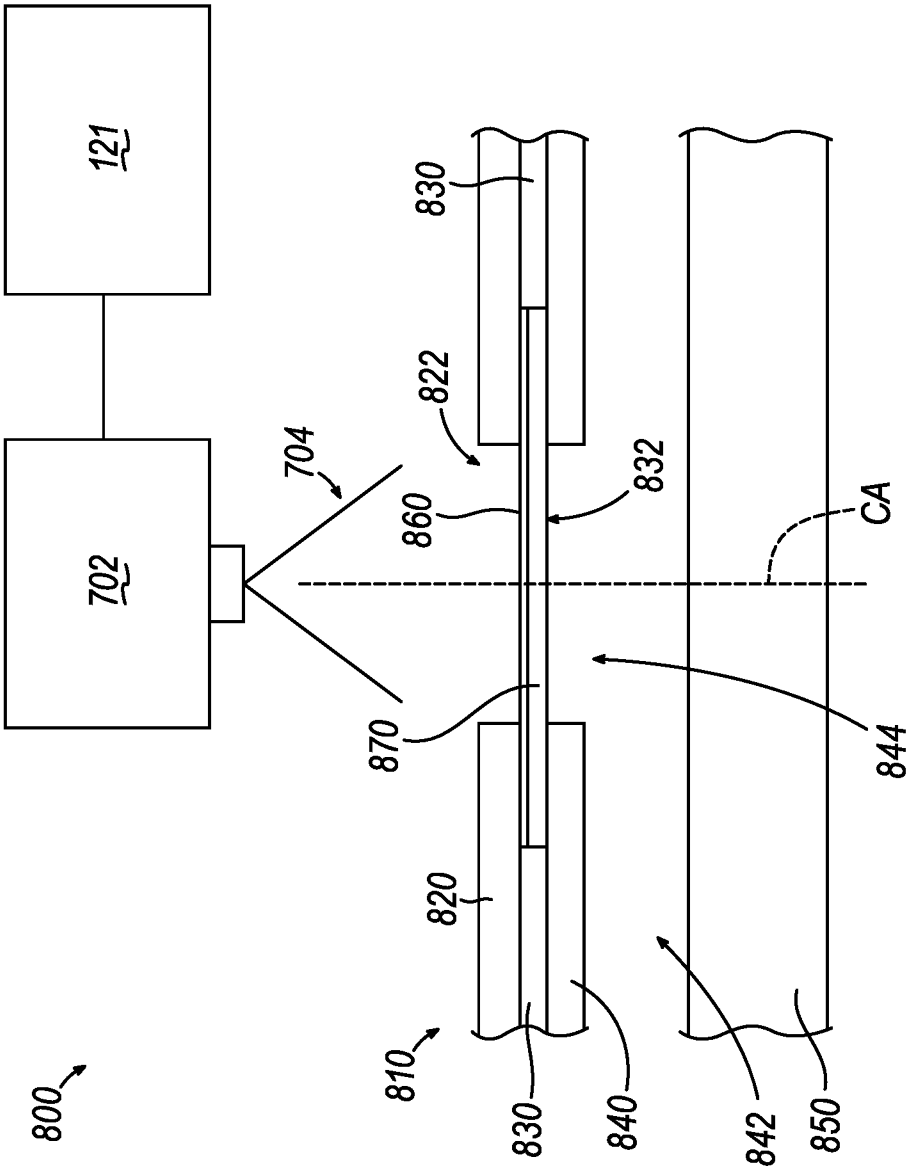
FIG. 10A depicts a schematic cross-sectional view of another example of a pressure sensing stage that may be incorporated into the process chip of FIG. 3, with an elastic layer in a non-deflected state.
Figure 10B:
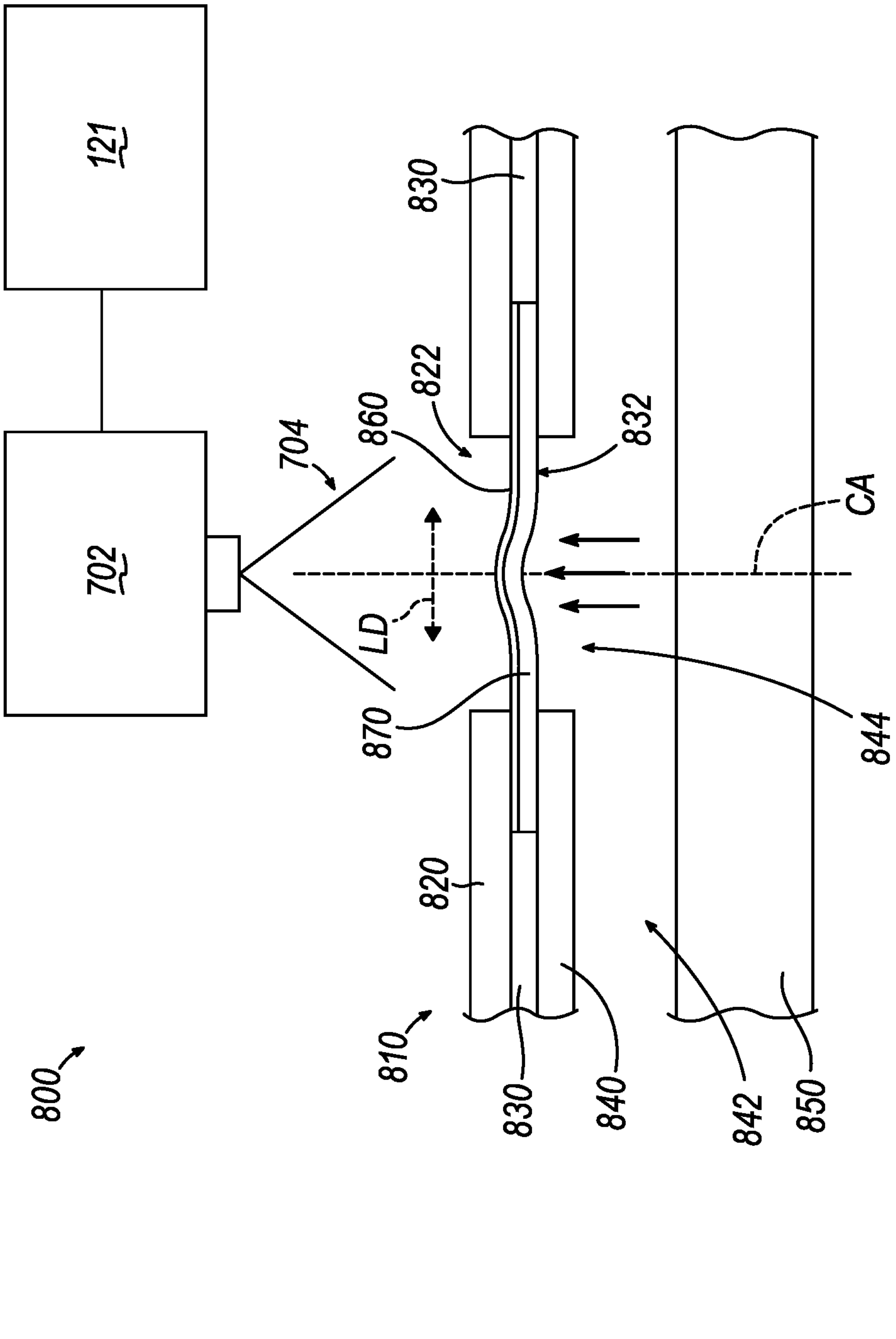
FIG. 10B depicts a schematic cross-sectional view of the pressure sensing stage of FIG. 10A, with the elastic layer in a deflected state.

In the above-described example of pressure sensing stage (700), optical feature (760) is positioned on or in the same elastic layer (730) that is used to perform other functions (e.g., valving, peristaltic pumping, ventilating, etc.) within process chip (710). In some other versions, it may be desirable to provide a separate membrane or other kind of elastic layer that is dedicated to pressure sensing purposes. FIGS. 10A-10B show an example of how this may be carried out. The pressure sensing stage (800) shown in FIGS. 10A-10B includes a portion of a process chip (810), a camera (702), and controller (121). In addition to including the features and functionality described below, process chip (810) may include any of the other features and functionalities described above in the context of process chips (111, 200, 500). In other words, the following teachings relating to pressure sensing stage (800) may be readily applied to any of the various process chips (111, 200, 500) described herein.

The respective roles and configurations of camera (702) and controller (121) are pressure sensing stage (800) is the same as the respective roles and configurations of camera (702) and controller (121) in pressure sensing stage (700). Those roles and configurations will therefore not be repeated here.

Process chip (810) of the present example includes a first plate (820), an elastic layer (830), a second plate (840), and a third plate (850). Elastic layer (830) is interposed between plates (820, 840). Third plate (850) cooperates with second plate (840) to define a channel (842) through which fluid may flow. The region of channel (842) at the left-hand side of FIGS. 10A-10B may be regarded as a fluid input port of pressure-sensing stage (800); while the region of channel (842) at the right-hand-side of FIGS. 10A-10B may be regarded as a fluid output port of pressure-sensing stage (800). Plates (820, 840, 850) of process chip (810) may be configured and operable like plates (300, 304, 306) of process chip (200). Similarly, elastic layer (830) of process chip (810) may be configured and operable like elastic layer (302) of process chip (200). Thus, elastic layer (830) may extend across a substantial portion of the width of process chip (810), such that elastic layer (830) may also perform functions in other chambers of process chip (810) (e.g., valving, peristaltic pumping, ventilating etc.).

Second plate (840) defines an opening (844) that is fluidically coupled with channel (842). First plate (822) defines an opening (822) that is aligned with opening (844) of second plate (840). In the example shown in FIGS. 10A-10B, opening (822) and opening (844) have the same diameter. In some other versions, opening (822) has a larger diameter than opening (844). In some other versions, opening (822) has a smaller diameter than opening (844). In the present example, both openings (822, 844) are circular. Alternatively, openings (822, 844) may have any other suitable respective configurations.

Unlike elastic layer (730) in process chip (710), elastic layer (830) of process chip (810) does not have a portion that is exposed to fluids in channel (842) via opening (844). Instead, elastic layer (830) of process chip (810) defines an opening (832) that is coaxially positioned along the central axis (CA); and that has a larger diameter than openings (822, 844). A pressure sensing membrane (870) is positioned in opening (832) of elastic layer (830). By way of example only, pressure sensing membrane (870) may have a thickness ranging from approximately 50 micrometers to approximately 200 micrometers; including a thickness of approximately 100 micrometers. The outer region of pressure sensing membrane (870) is captured between plates (820, 840) to thereby secure the position of pressure sensing membrane (870) relative to openings (822, 844). In some other versions, pressure sensing membrane (870) is positioned atop plate (820), and another plate or other structure is used to secure the outer region of pressure sensing membrane (870) to plate (820). Alternatively, the position of pressure sensing membrane (870) may be secured in process chip (810) in any other suitable fashion.

Pressure sensing membrane (870) of the present example is flexible. As used herein, the term "flexible membrane" should be understood to include pressure sensing membrane (870), the various elastic layers (302, 730, 830, 1130, 1230, 1330, 1430, 1530, 1674) described herein, and similar structures.

In the present example, with opening (844) providing a path for fluid in channel (842) to reach pressure sensing membrane (870), and with opening (822) providing clearance for pressure sensing membrane (870) to deform, pressure sensing membrane (870) may achieve a deformed state as shown in FIG. 10B in response to positive pressurization of fluid within channel (842). Pressure sensing membrane (870) may thus operate similar to portion (732) of membrane (730) in process chip (710). In some versions, pressure sensing membrane (870) has properties that differ from the properties of elastic layer (830). For instance, pressure sensing membrane (870) may have a lower durometer or greater elasticity than elastic layer (830). In addition, or in the alternative, pressure sensing membrane (870) may have a reduced thickness relative to elastic layer (830). In addition, or in the alternative, pressure sensing membrane (870) may have greater optical transmissivity than elastic layer (830). In versions where elastic layer (830) is gas permeable, pressure sensing membrane (870) is not gas permeable. In addition, or in the alternative, pressure sensing membrane (870) may be formed by orthogonal polarizers with a pressure-sensitive birefringent layer in between. In addition, or in the alternative, pressure sensing membrane (870) may be optically reflective. In addition, or in the alternative, pressure sensing membrane (870) may be gas-impermeable. Alternatively, other properties of pressure sensing membrane (870) may differ from those of elastic layer (830).

Optical feature (860) is positioned atop pressure sensing membrane (870). Optical feature (860) is configured to deform with pressure sensing membrane (870). For instance, as shown in the transition from FIG. 10A (non-pressurized state) to FIG. 10B (pressurized state), pressure sensing membrane (870) and optical feature (860) deform together, upwardly along a central axis (CA), in response to positive pressurization of fluid within channel (842). The pressurized state shown in FIG. 10B may occur during the peristaltic driving of fluid from one location upstream of channel (842) to another location downstream of channel (842) during any of the various operations described herein. With optical feature (860) being directly or indirectly within the field of view (704) of camera (702), camera (702) is operable to capture images of the deformation of optical feature (860) and transmit the image data to controller (121). Controller (121) is operable to convert the image data into a pressure value indicating the pressure of fluid in channel (842) as described in greater detail below.

As pressure sensing membrane (870) and optical feature (860) deform together along the central axis (CA) in response to positive pressurization of fluid within channel (842) (FIG. 10B), pressure sensing membrane (870) and optical feature (860) may also deform along a lateral dimension (LD) that is transverse to the central axis (CA). As described herein, camera (702) and controller (121) may be operated to particularly track this "lateral deformation" along the lateral dimension (LD) to determine the pressure of fluid in channel (842). Such lateral deformation of pressure sensing membrane (870) and optical feature (860) may be tracked in addition to, or in lieu of, tracking the deformation of pressure sensing membrane (870) and optical feature (860) along the central axis (CA). This lateral deformation may be tracked via a certain annular region of pressure sensing membrane (870) or optical feature (860), like annular region (762) described above.

In some versions, optical feature (860) is adhered to pressure sensing membrane (870) via an adhesive. In some other versions, optical feature (860) is printed directly on pressure sensing membrane (870). Alternatively, optical feature (860) may be secured to pressure sensing membrane (870) in any other suitable fashion. In the example shown in FIGS. 10A-10B, optical feature (860) spans across the full surface area of pressure sensing membrane (870). In some other versions, optical feature (860) is only positioned on one or more discrete regions of pressure sensing membrane (870) within opening (822), without spanning across the full surface area of pressure sensing membrane (870). For instance, in some versions, optical feature (860) is only positioned in an annular region of pressure sensing membrane (870), similar to annular region (762) shown in FIG. 9.

While optical feature (860) is shown as being positioned atop pressure sensing membrane (870), some other versions of optical feature (860) may be positioned under pressure sensing membrane (870). For instance, optical feature (860) may be positioned under pressure sensing membrane (870) in versions where pressure sensing membrane (870) is optically transmissive. As another example, optical feature (860) may be positioned under pressure sensing membrane (870) in versions where third plate (850) is optically transmissive; and camera (702) may view optical feature (860) from a vantage point that is directly or indirectly under process chip (810). As yet another example, optical feature (860) may be embedded within pressure sensing membrane (870). In some such versions, the entire width of pressure sensing membrane (870) includes embedded optically viewable features that may serve as optical feature (860), including regions of pressure sensing membrane (870) that are not exposed via opening (822). In some other versions, optical feature (860) is embedded only in the region of pressure sensing membrane (870) that is exposed via opening (822).

C. Examples of Optical Feature Patterns

Figure 11:
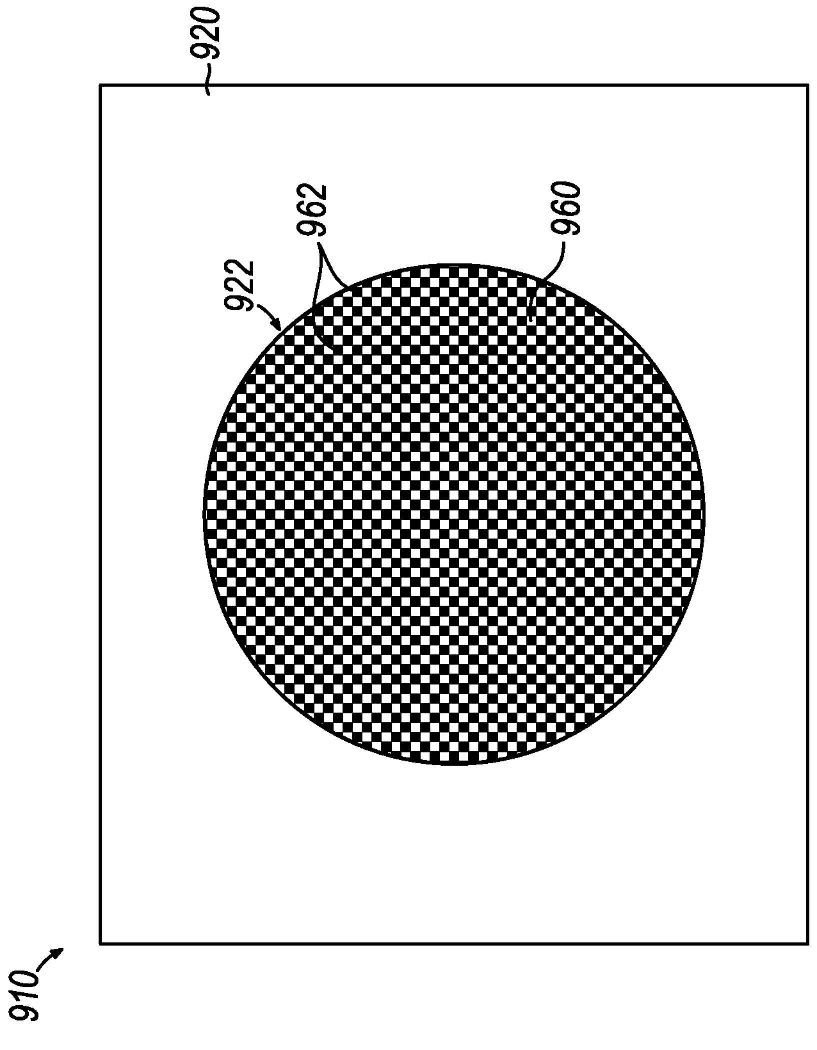
FIG. 11 depicts a top plan view of a portion of another example of a pressure sensing stage that may be incorporated into the process chip of FIG. 3.

As noted above, optical features (760, 860) are optically configured to facilitate visual tracking of lateral deformation of a pressure sensing region (732) of elastic layer (730) or lateral deformation of a dedicated pressure sensing membrane (870). FIG. 11 shows an example of how this may be carried out. As shown in FIG. 11, a process chip (910) includes an optical feature (960) that is visible through an opening (922) formed in a plate (920) of process chip (910). Process chip (910) may be otherwise configured and operable in accordance with any of the other various process chips (111, 200, 500, 710, 810) described herein. Optical feature (960) may be positioned over, in, or under elastic layer (730); or over, in, or under a dedicated pressure sensing membrane like pressure sensing membrane (870). In other words, optical features (760, 860) of process chips (710, 810) may be configured and operable like optical feature (960).

Optical feature (960) of this example includes a plurality of visible elements (962) that are arranged in a regularly repeating pattern. In this example, visible elements (962) are in the form of alternating black and white squares that are arranged in a grid pattern. As another example, visible elements (962) may include a series of concentric circles that are equally spaced apart from each other. As another example, visible elements (962) may include three-dimensional structures that cast shadows, such that the shadows would change direction and/or length as elastic layer (730) deforms in response to pressure changes. Such shadow changes may provide enhanced visual feedback that might not otherwise be as readily discernable through two-dimensional versions of visible elements (962). In versions where three-dimensional visible elements (962) are used, one or more additional light sources may be used to enhance the shadow-casting effects of three-dimensional visible elements (962). Alternatively, visible elements (962) may have any other suitable shapes or configuration in any other suitable kind of pattern(s).

Figure 12:
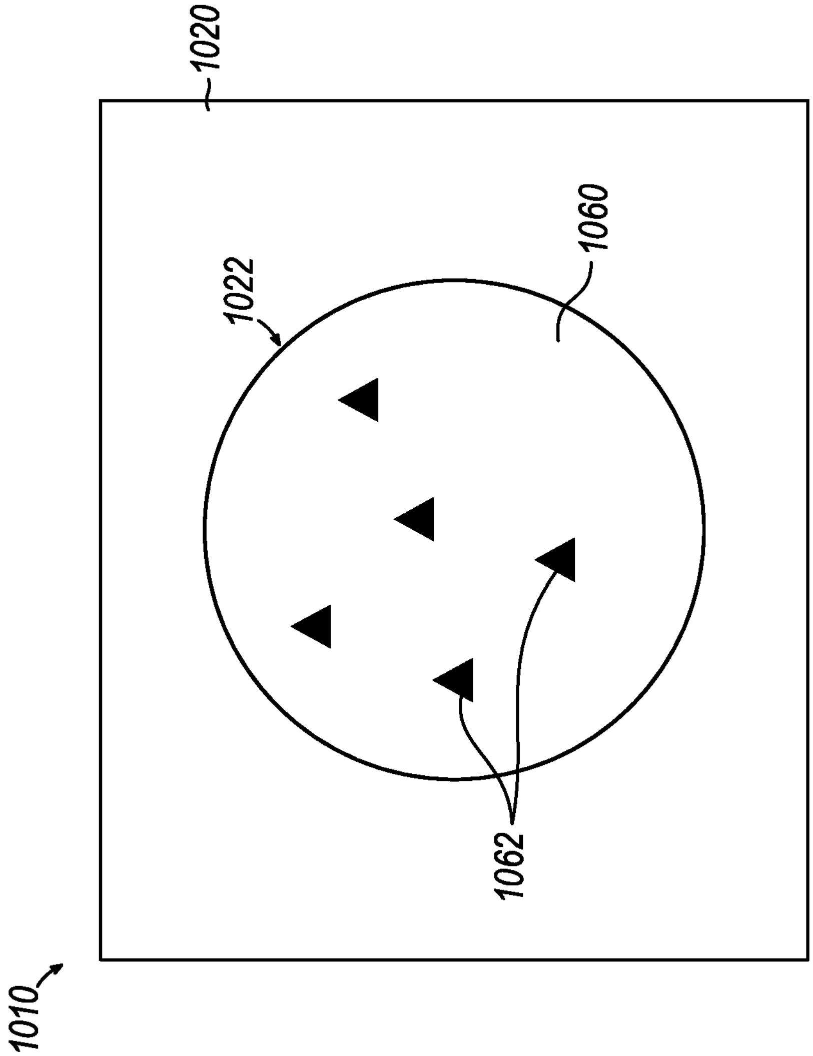
FIG. 12 depicts a top plan view of a portion of another example of a pressure sensing stage that may be incorporated into the process chip of FIG. 3.

In addition to, or in lieu of, providing visible elements that are arranged in a predefined, regular pattern, it may be desirable to have the visible elements arranged in a stochastic arrangement. FIG. 12 shows an example of how this may be carried out. As shown in FIG. 12, a process chip (1010) includes an optical feature (1060) that is visible through an opening (1022) formed in a plate (1020) of process chip (1010). Process chip (1010) may be otherwise configured and operable in accordance with any of the other various process chips (111, 200, 500, 710, 810) described herein. Optical feature (1060) may be positioned over, in, or under an elastic layer like elastic layer (730); or over, in, or under a dedicated pressure sensing membrane like pressure sensing membrane (870). In other words, optical features (760, 860) of process chips (710, 810) may be configured and operable like optical feature (1060).

Optical feature (1060) of this example includes a plurality of visible elements (1062) that are arranged in a stochastic arrangement. In this example, visible elements (1062) are in the form of triangles that are randomly positioned across the surface of optical feature (1060). Alternatively, visible elements (1062) may have any other suitable shapes or configuration.

Figure 13:
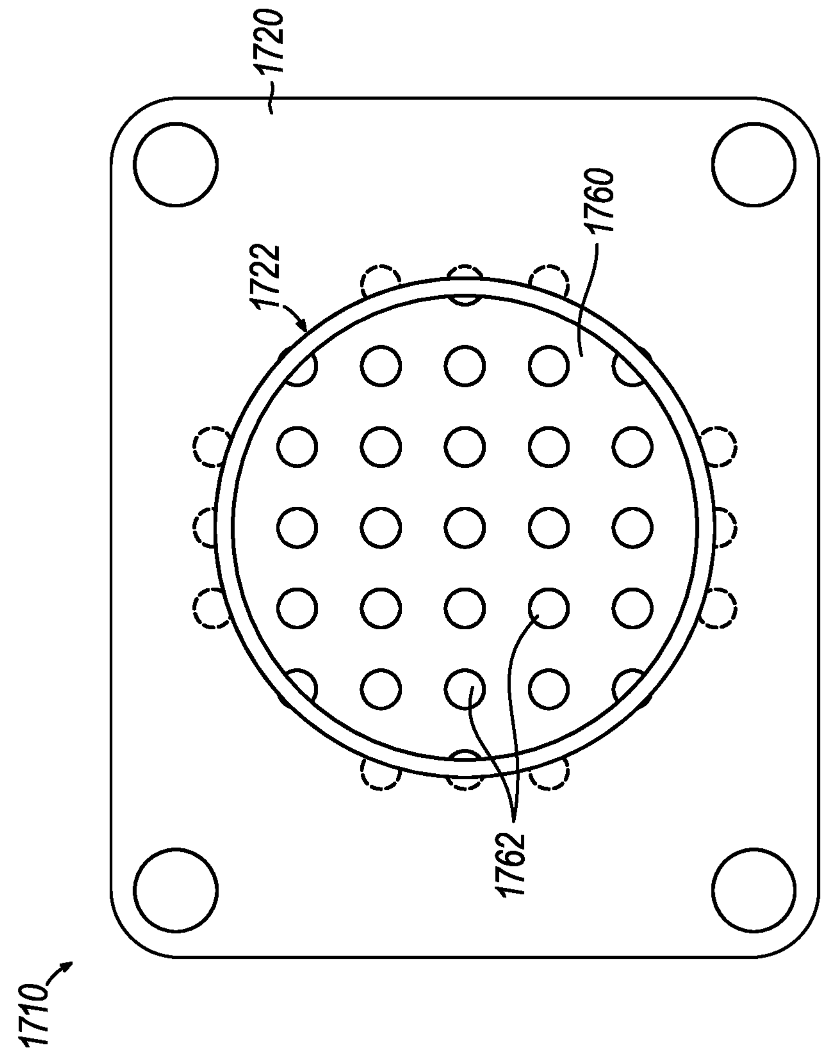
FIG. 13 depicts a top plan view of a portion of another example of a pressure sensing stage that may be incorporated into the process chip of FIG. 3.

FIG. 13 shows another example of a process chip (1710) that includes an optical feature (1760) that is visible through an opening (1722) formed in a plate (1720) of process chip (1710). Process chip (1710) may be otherwise configured and operable in accordance with any of the other various process chips (111, 200, 500, 710, 810, 910, 1010) described herein. Optical feature (1760) may be positioned over, in, or under an elastic layer like elastic layer (730); or over, in, or under a dedicated pressure sensing membrane like pressure sensing membrane (870). In other words, optical features (760, 860) of process chips (710, 810) may be configured and operable like optical feature (1760).

Optical feature (1760) of this example includes a plurality of visible elements (1762) that are arranged in a grid arrangement. In this example, visible elements (1762) are in the form of dots that are equidistantly spaced apart from each other across the surface of optical feature (1760), such that the arrangement of visible elements (1762) is viewable through opening (1722). Alternatively, visible elements (1762) may have any other suitable shapes or configuration.

Figure 14:
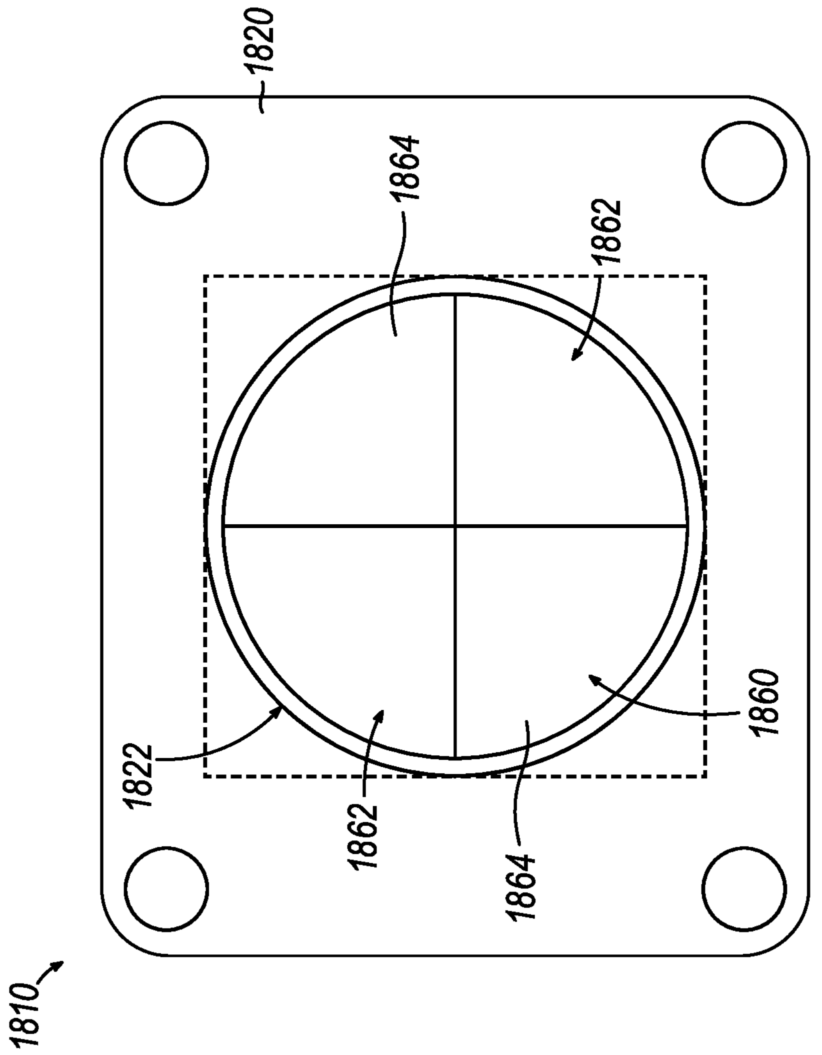
FIG. 14 depicts a top plan view of a portion of another example of a pressure sensing stage that may be incorporated into the process chip of FIG. 3.

FIG. 14 shows another example of a process chip (1810) includes an optical feature (1860) that is visible through an opening (1822) formed in a plate (1820) of process chip (1810). Process chip (1810) may be otherwise configured and operable in accordance with any of the other various process chips (111, 200, 500, 710, 810, 910, 1010, 1710) described herein. Optical feature (1860) may be positioned over, in, or under an elastic layer like elastic layer (730); or over, in, or under a dedicated pressure sensing membrane like pressure sensing membrane (870). In other words, optical features (760, 860) of process chips (710, 810) may be configured and operable like optical feature (1860).

Optical feature (1860) of this example includes a first pair of visible elements (1862) and a second pair of visible elements (1864). In this example, visible elements (1862) are in the form of black squares and visible elements (1864) are in the form of white squares. Visible elements (1862) are cater-cornered relative to each other; while visible elements (1864) are also cater-cornered relative to each other. Visible elements (1862, 1864) thus form an angularly alternating black and white checkerboard pattern in this example, with corners of visible elements (1862, 1864) converging at the central region of opening (1822). In the example shown, some regions of visible elements (1862, 1864) are outside the circumference of opening (1822), though other versions may provide the entirety of visible elements (1862, 1864) within the circumference of opening (1822). Alternatively, visible elements (1862, 1864) may have any other suitable shapes or configuration.

Figure 15:
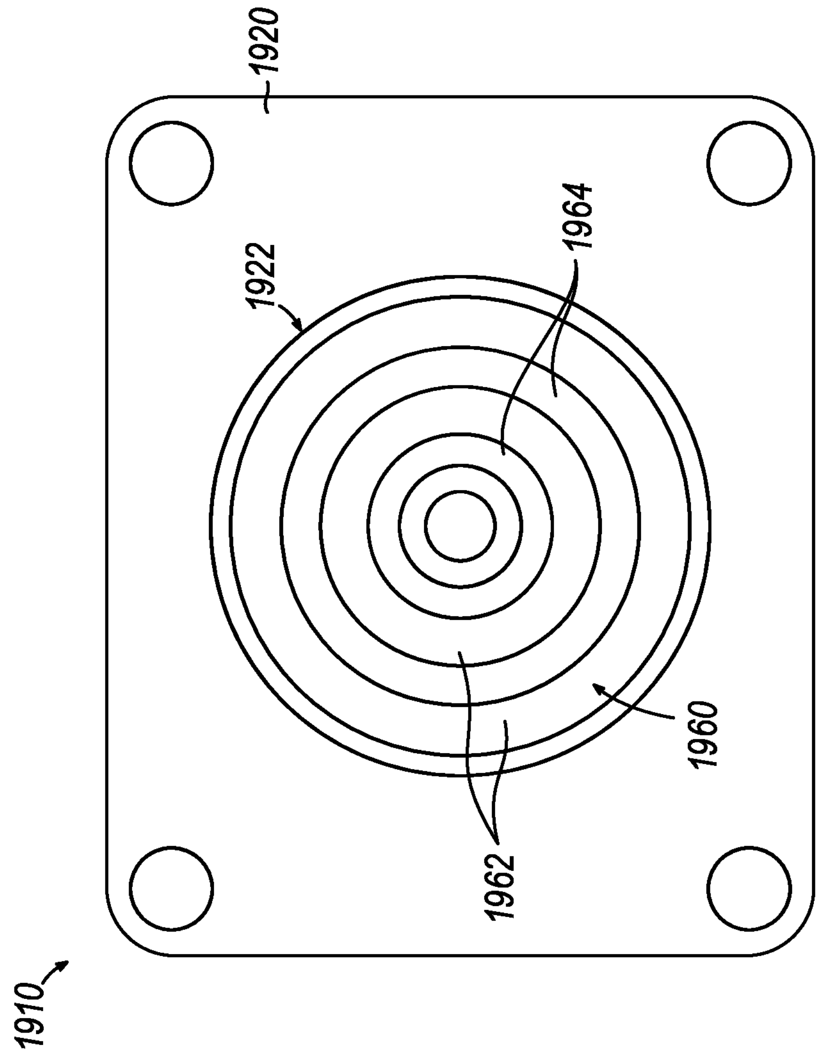
FIG. 15 depicts a top plan view of a portion of another example of a pressure sensing stage that may be incorporated into the process chip of FIG. 3.

FIG. 15 shows another example of a process chip (1910) includes an optical feature (1960) that is visible through an opening (1922) formed in a plate (1920) of process chip (1910). Process chip (1910) may be otherwise configured and operable in accordance with any of the other various process chips (111, 200, 500, 710, 810, 910, 1010, 1710, 1810) described herein. Optical feature (1960) may be positioned over, in, or under an elastic layer like elastic layer (730); or over, in, or under a dedicated pressure sensing membrane like pressure sensing membrane (870). In other words, optical features (760, 860) of process chips (710, 810) may be configured and operable like optical feature (1960).

Optical feature (1960) of this example includes a first arrangement of visible elements (1962) and a second arrangement of visible elements (1964). In this example, visible elements (1962) are in the form of white rings and visible elements (1964) are in the form of black rings. Visible elements (1962, 1964) are concentrically arranged with each other in an alternating fashion, with a black dot forming a bullseye at the center. In addition to being concentrically arranged with each other, visible elements (1962, 1964) are concentrically positioned within opening (1922). Alternatively, visible elements (1962, 1964) may have any other suitable shapes or configuration.

In some versions of process chips (910, 1010, 1710, 1810, 1910), visible elements (962, 1062, 1762, 1862, 1864, 1962, 1964) are adhered or printed directly on an elastic layer like elastic layer (730); or directly on a dedicated pressure sensing membrane like pressure sensing membrane (870). In some other versions of process chips (910, 1010, 1710, 1810, 1910), visible elements (962, 1062, 1762, 1862, 1864, 1962, 1964) are incorporated into a thin film or other layer that is laid over elastic layer like elastic layer (730); or over a dedicated pressure sensing membrane like pressure sensing membrane (870). Other suitable ways in which visible elements (962, 1062, 1762, 1862, 1864, 1962, 1964) may be incorporated into a process chip (910, 1010, 1710, 1810, 1910) will be apparent to those skilled in the art in view of the teachings herein.

D. Example of Pressure Sensing Stage with Interfering Patterns

Figure 16:
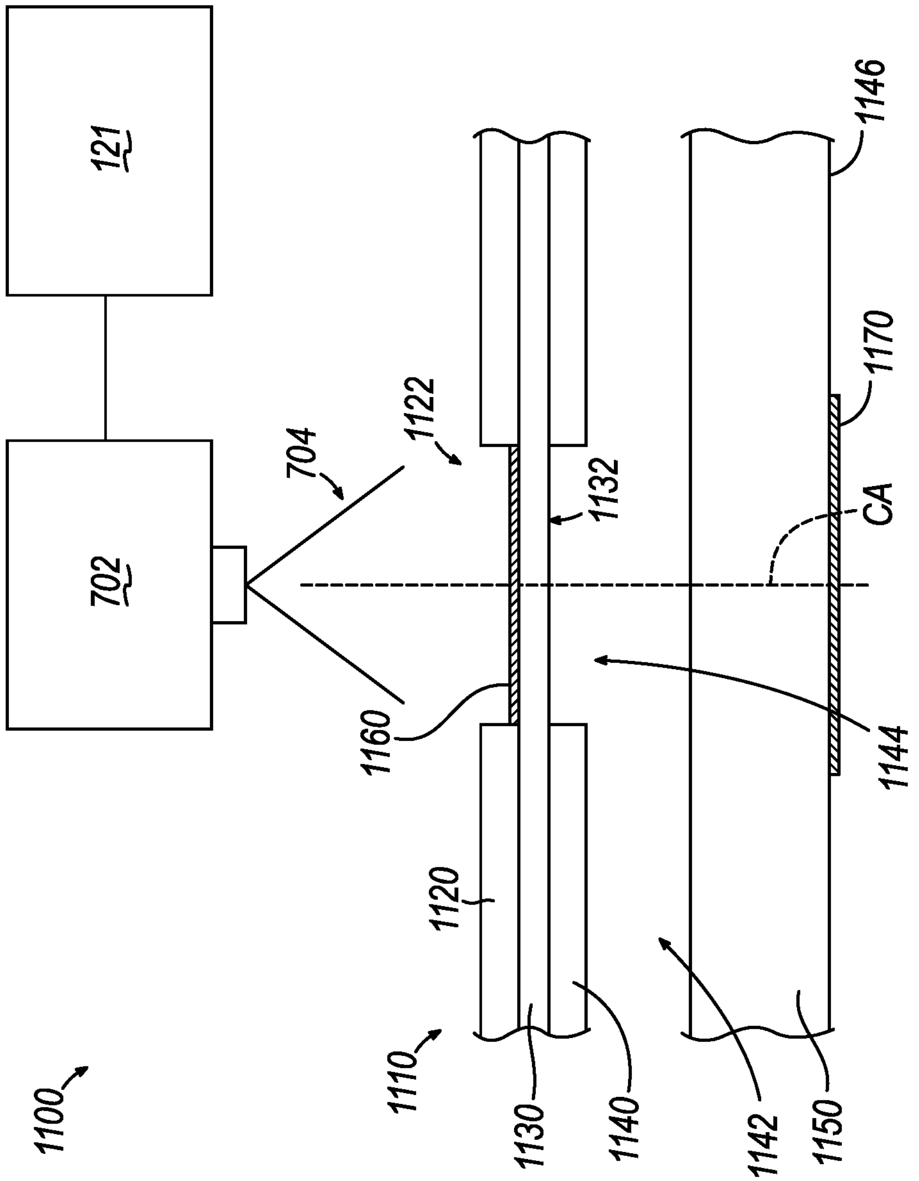
FIG. 16 depicts a schematic cross-sectional view of another example of a pressure sensing stage that may be incorporated into the process chip of FIG. 3.

In some scenarios, it may be desirable to provide visual tracking of lateral deformation via the Moiré effect. To that end, FIG. 16 shows an example of a pressure sensing stage (1100) that is operable to provide visual tracking of lateral deformation via the Moiré effect. Pressure sensing stage (1100) of this example includes a portion of a process chip (1110), a camera (702), and controller (121). In addition to including the features and functionality described below, process chip (1110) may include any of the other features and functionalities described above in the context of process chips (111, 200, 500). In other words, the following teachings relating to pressure sensing stage (1100) may be readily applied to any of the various process chips (111, 200, 500) described herein.

The respective roles and configurations of camera (702) and controller (121) are pressure sensing stage (1100) is the same as the respective roles and configurations of camera (702) and controller (121) in pressure sensing stage (700). Those roles and configurations will therefore not be repeated here.

Process chip (1110) of the present example includes a first plate (1120), an elastic layer (1130), a second plate (1140), and a third plate (1150). Elastic layer (1130) is interposed between plates (1120, 1140). Third plate (1150) cooperates with second plate (1140) to define a channel (1142) through which fluid may flow. The region of channel (1142) at the left-hand side of FIG. 16 may be regarded as a fluid input port of pressure-sensing stage (1100); while the region of channel (1142) at the right-hand-side of FIG. 16 may be regarded as a fluid output port of pressure-sensing stage (1100). Plates (1120, 1140, 1150) of process chip (1110) may be configured and operable like plates (300, 304, 306) of process chip (200). Similarly, elastic layer (1130) of process chip (1110) may be configured and operable like elastic layer (302) of process chip (200). Thus, elastic layer (1130) may extend across a substantial portion of the width of process chip (1110), such that elastic layer (1130) may also perform functions in other chambers of process chip (1110) (e.g., valving, peristaltic pumping, ventilating etc.).

Second plate (1140) defines an opening (1144) that is fluidically coupled with channel (1142), such that opening (1144) exposes a portion (1132) of elastic layer (1130) to fluid in channel (1142). By way of example only, at least portion (1132) of elastic layer (1130) may have a thickness ranging from approximately 50 micrometers to approximately 200 micrometers; including a thickness of approximately 100 micrometers. First plate (1120) defines an opening (1122) that is aligned with opening (1144) of second plate (1140). In the example shown in FIG. 16, opening (1122) and opening (1144) have the same diameter. In some other versions, opening (1122) has a larger diameter than opening (1144). In some other versions, opening (1122) has a smaller diameter than opening (1144). In the present example, both openings (1122, 1144) are circular. Alternatively, openings (1122, 1144) may have any other suitable respective configurations. In the present example, with opening (1144) providing a path for fluid in channel (1142) to reach portion (1132) of elastic layer (1130), and with opening (1122) providing clearance for elastic layer (1130) to deform, portion (1132) of elastic layer (1130) may achieve a deformed state as shown and described herein in the context of elastic layer (730).

While portion (1132) of elastic layer (1130) is exposed to openings (1122, 1144) in this example, other variations may instead include a dedicated pressure sensing membrane like pressure sensing membrane (870) of process chip (810). In such versions, the dedicated pressure sensing membrane may be positioned within, over, or under a corresponding opening (e.g., like opening (832)) that is formed in elastic layer (1130).

A first optical feature (1160) is positioned atop portion (1132) of elastic layer (1130). In versions where a dedicated pressure sensing membrane is used instead of portion (1132) of elastic layer (1130), first optical feature (1160) may be positioned on, in, or under the dedicated pressure sensing membrane. First optical feature (1160) is configured to deform with elastic layer (1130) in response to positive pressurization of fluid within channel (1142), similar to the effects described above in the context of FIG. 8B. As portion (1132) of elastic layer (1130) and first optical feature (1160) deform together along the central axis (CA) in response to positive pressurization of fluid within channel (1142), portion (1132) of elastic layer (1130) and first optical feature (1160) may also deform along a lateral dimension (LD) that is transverse to the central axis (CA). This lateral deformation may be tracked via a certain annular region of portion (1132) or first optical feature (1160), like annular region (762) described above.

In some versions, first optical feature (1160) is adhered to elastic layer (1130) via an adhesive. In some other versions, first optical feature (1160) is printed directly on elastic layer (1130). Alternatively, first optical feature (1160) may be secured to elastic layer (1130) in any other suitable fashion. In the example shown in FIG. 16, first optical feature (1160) spans across the full surface area of portion (1132) of elastic layer (1130). In some other versions, first optical feature (1160) is only positioned on one or more discrete regions of elastic layer (1130) within opening (1122), without spanning across the full surface area of portion (1132) of elastic layer (1130). For instance, in some versions, first optical feature (1160) is only positioned in an annular region of elastic layer (1130), similar to annular region (762) shown in FIG. 9.

While first optical feature (1160) is shown as being positioned atop elastic layer (1130), some other versions of first optical feature (1160) may be positioned under elastic layer (1130). For instance, first optical feature (1160) may be positioned under elastic layer (1130). As yet another example, first optical feature (1160) may be embedded within elastic layer (1130). In some such versions, the entire width of elastic layer (1130) includes embedded optically viewable features that may serve as first optical feature (1160), including regions of elastic layer (1130) that are not exposed via opening (1122). In some other versions, first optical feature (1160) is embedded only in portion (1132) of elastic layer (1130).

A second optical feature (1170) is positioned below third plate (1150) in this example. First and second optical features (1160, 1170) are both positioned along the central axis (CA). In the example shown, second optical feature (1170) is wider than first optical feature (1160), though optical features (1160, 1170) may instead have any other relative sizing. In some versions, second optical feature (1170) is adhered to the lower surface (1146) of third plate (1150), is printed directly on the lower surface (1146) of third plate (1150), or is otherwise secured to the lower surface (1146) of third plate (1150). In some other versions, second optical feature (1170) is embedded within third plate (1150). In some other versions, second optical feature (1170) is positioned on the floor of channel (1142). In still other versions, second optical feature (1170) is positioned over first optical feature (1170). For instance, second optical feature (1170) may be incorporated in a plate (not shown) that is positioned atop first plate (1120). In any of these examples, first and second optical features (1160, 1170) are both within the field of view (704) of camera (702). Camera (702) may thus view second optical feature (1170) through the optically transmissive material comprising third plate (1150) in the example shown in FIG. 16.

First optical feature (1160) has a first pattern while second optical feature (1170) has a second pattern. By way of example only, each of these patterns may include a series of parallel lines that are equally spaced apart from each other, a series of concentric circles that are equally spaced apart from each other, or any other suitable kinds of patterns. The first and second patterns are similar to each other, such that when the first pattern is offset relative to the second pattern, the offset creates visual interferences or Moiré fringe patterns. While first optical feature (1160) deforms with elastic layer (1130) in response to pressurization of fluid in channel (1142), second optical feature (1170) does not deform in this example (regardless of the pressure of fluid in channel (1142)). Thus, as first optical feature (1160) deforms while second optical feature (1170) remains fixed, the patterns of optical features (1160, 1170) cooperate to create visual interferences or Moiré fringe patterns. Such Moiré fringe patterns may indicate the degree of lateral deformation of elastic layer (1130), which may in turn indicate the pressure of fluid in channel (1142). These Moiré fringe patterns may be captured by camera (702). Camera (702) may transmit the image data to controller (121). Controller (121) may then convert the image data into a pressure value indicating the pressure of fluid in channel (1142) as described herein.

E. Example of Pressure Sensing Stage with Diffracting Optical Feature

Figure 17:
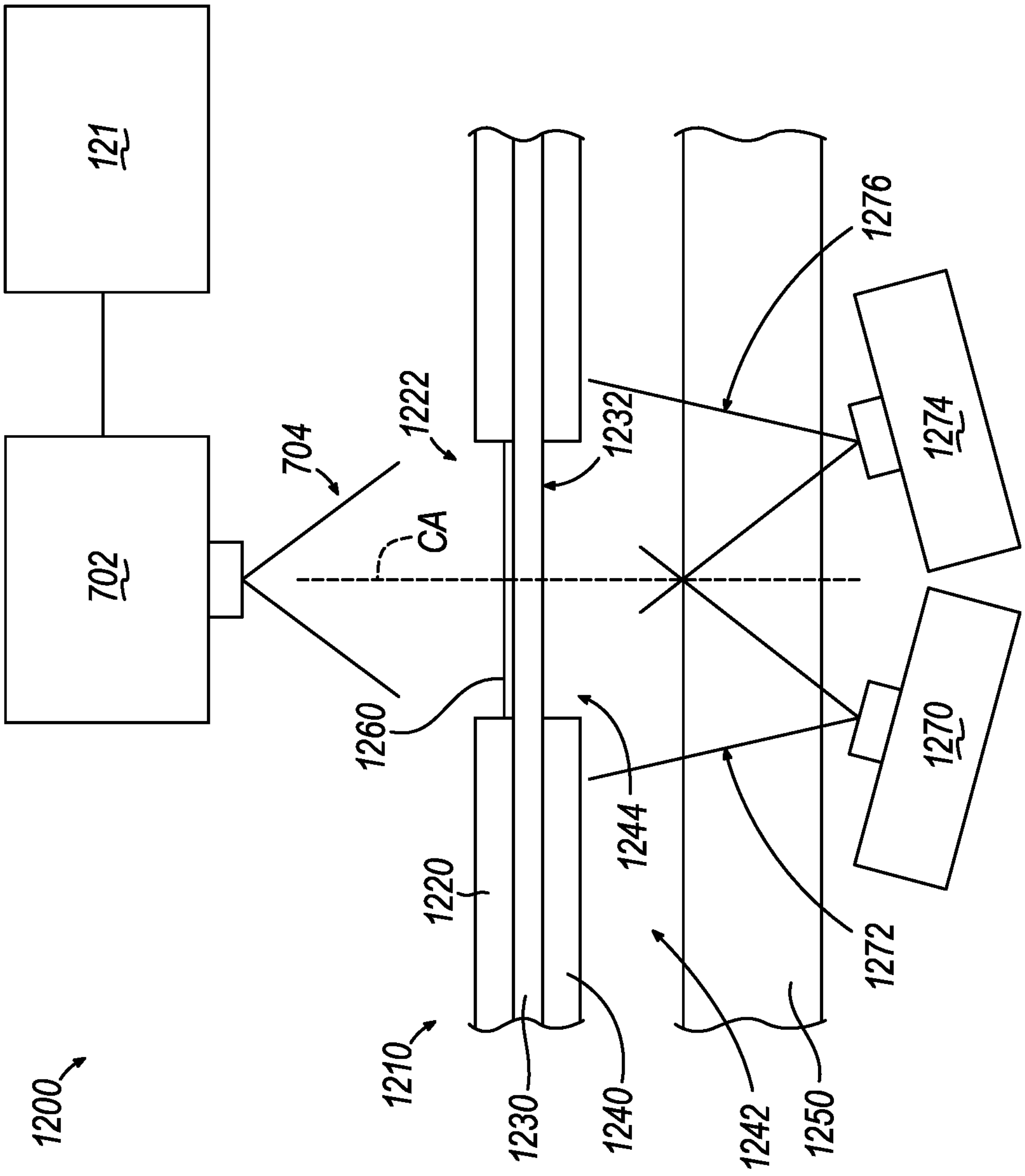
FIG. 17 depicts a schematic cross-sectional view of another example of a pressure sensing stage that may be incorporated into the process chip of FIG. 3.

In some scenarios, it may be desirable to provide visual tracking of lateral deformation via diffraction. To that end, FIG. 17 shows an example of a pressure sensing stage (1200) that is operable to provide visual tracking of lateral deformation via diffraction. Pressure sensing stage (1200) of this example includes a portion of a process chip (1210), a camera (702), a controller (121), and a pair of light sources (1270, 1274). In addition to including the features and functionality described below, process chip (1210) may include any of the other features and functionalities described above in the context of process chips (111, 200, 500). In other words, the following teachings relating to pressure sensing stage (1200) may be readily applied to any of the various process chips (111, 200, 500) described herein.

The respective roles and configurations of camera (702) and controller (121) are pressure sensing stage (1200) is the same as the respective roles and configurations of camera (702) and controller (121) in pressure sensing stage (700). Those roles and configurations will therefore not be repeated here.

Process chip (1210) of the present example includes a first plate (1220), an elastic layer (1230), a second plate (1240), and a third plate (1250). Elastic layer (1230) is interposed between plates (1220, 1240). Third plate (1250) cooperates with second plate (1240) to define a channel (1242) through which fluid may flow. The region of channel (1242) at the left-hand side of FIG. 17 may be regarded as a fluid input port of pressure-sensing stage (1200); while the region of channel (1242) at the right-hand-side of FIG. 17 may be regarded as a fluid output port of pressure-sensing stage (1200). Plates (1220, 1240, 1250) of process chip (1210) may be configured and operable like plates (300, 304, 306) of process chip (200). Similarly, elastic layer (1230) of process chip (1210) may be configured and operable like elastic layer (302) of process chip (200). Thus, elastic layer (1230) may extend across a substantial portion of the width of process chip (1210), such that elastic layer (1230) may also perform functions in other chambers of process chip (1210) (e.g., valving, peristaltic pumping, ventilating etc.).

Second plate (1240) defines an opening (1244) that is fluidically coupled with channel (1242), such that opening (1244) exposes a portion (1232) of elastic layer (1230) to fluid in channel (1242). By way of example only, at least portion (1232) of elastic layer (1230) may have a thickness ranging from approximately 50 micrometers to approximately 200 micrometers; including a thickness of approximately 100 micrometers. First plate (1220) defines an opening (1222) that is aligned with opening (1244) of second plate (1240). In the example shown in FIG. 17, opening (1222) and opening (1244) have the same diameter. In some other versions, opening (1222) has a larger diameter than opening (1244). In some other versions, opening (1222) has a smaller diameter than opening (1244). In the present example, both openings (1222, 1244) are circular. Alternatively, openings (1222, 1244) may have any other suitable respective configurations. In the present example, with opening (1244) providing a path for fluid in channel (1242) to reach portion (1232) of elastic layer (1230), and with opening (1222) providing clearance for elastic layer (1230) to deform, portion (1232) of elastic layer (1230) may achieve a deformed state as shown and described herein in the context of elastic layer (730).

While portion (1232) of elastic layer (1230) is exposed to openings (1222, 1244) in this example, other variations may instead include a dedicated pressure sensing membrane like pressure sensing membrane (870) of process chip (810). In such versions, the dedicated pressure sensing membrane may be positioned within, over, or under a corresponding opening (e.g., like opening (832)) that is formed in elastic layer (1230).

An optical feature (1260) is positioned atop portion (1232) of elastic layer (1230). In versions where a dedicated pressure sensing membrane is used instead of portion (1232) of elastic layer (1230), optical feature (1260) may be positioned on, in, or under the dedicated pressure sensing membrane. Optical feature (1260) is configured to deform with elastic layer (1230) in response to positive pressurization of fluid within channel (1242), similar to the effects described above in the context of FIG. 8B. As portion (1232) of elastic layer (1230) and optical feature (1260) deform together along the central axis (CA) in response to positive pressurization of fluid within channel (1242), portion (1232) of elastic layer (1230) and optical feature (1260) may also deform along a lateral dimension (LD) that is transverse to the central axis (CA). This lateral deformation may be tracked via a certain annular region of portion (1232) or optical feature (1260), like annular region (762) described above.

In some versions, optical feature (1260) is adhered to elastic layer (1230) via an adhesive. In some other versions, optical feature (1260) is printed directly on elastic layer (1230). Alternatively, optical feature (1260) may be secured to elastic layer (1230) in any other suitable fashion. In the example shown in FIG. 17, optical feature (1260) spans across the full surface area of portion (1232) of elastic layer (1230). In some other versions, optical feature (1260) is only positioned on one or more discrete regions of elastic layer (1230) within opening (1222), without spanning across the full surface area of portion (1232) of elastic layer (1230). For instance, in some versions, optical feature (1260) is only positioned in an annular region of elastic layer (1230), similar to annular region (762) shown in FIG. 9.

While optical feature (1260) is shown as being positioned atop elastic layer (1230), some other versions of optical feature (1260) may be positioned under elastic layer (1230). For instance, optical feature (1260) may be positioned under elastic layer (1230). As yet another example, optical feature (1260) may be embedded within elastic layer (1230). In some such versions, the entire width of elastic layer (1230) includes embedded optically viewable features that may serve as optical feature (1260), including regions of elastic layer (1230) that are not exposed via opening (1222). In some other versions, optical feature (1260) is embedded only in portion (1232) of elastic layer (1230).

Optical feature (1260) of this example includes a diffraction feature (e.g., a diffraction grating, colloidal crystals, etc.), that is configured to diffract light. As shown in FIG. 17, light sources (1270, 1274) are positioned under process chip (1210) and are configured to project respective light beams (1272, 1276) through third plate (1250) and toward optical feature (1260). While light sources (1270, 1274) are shown as being positioned under process chip (1210), in some other versions light sources (1270, 1274) may be positioned elsewhere and mirrors may be used to direct light beams (1272, 1276) toward optical feature (1260). In the present example, light beams (1272, 1276) are incoherent. In some other versions, light sources (1270, 1274) project coherent light. In the present example, light beams (1272, 1276) are at different wavelengths. In some other versions, only one light source (1270, 1274) is used.

Regardless of whether one, two, or more light sources (1270, 1274) are used, optical feature (1260) is configured to diffract the light projected by such one, two, or more light sources (1270, 1274). As optical feature (1260) deforms with elastic layer (1230), including the lateral deformation as described herein, the diffraction provided by optical feature (1260) may change based on the deformation. In other words, optical feature (1260) deforms with elastic layer (1230), this deformation alters the spacing and refractive index of optical feature (1260), providing color effects that may be visually observed by camera (702). Thus, the diffraction may be visually indicative of the pressure of fluid in channel (1242). With optical feature (1260) being within the field of view (704) of camera (702), camera (702) may capture the diffraction from optical feature (1260) and the changes in diffraction as optical feature (1260) deforms with elastic layer (1230). Camera (702) may transmit the image data to controller (121). Controller (121) may then convert the image data into a pressure value indicating the pressure of fluid in channel (1242) as described herein.

F. Example of Pressure Sensing Stage with Reflective Optical Feature

Figure 18:
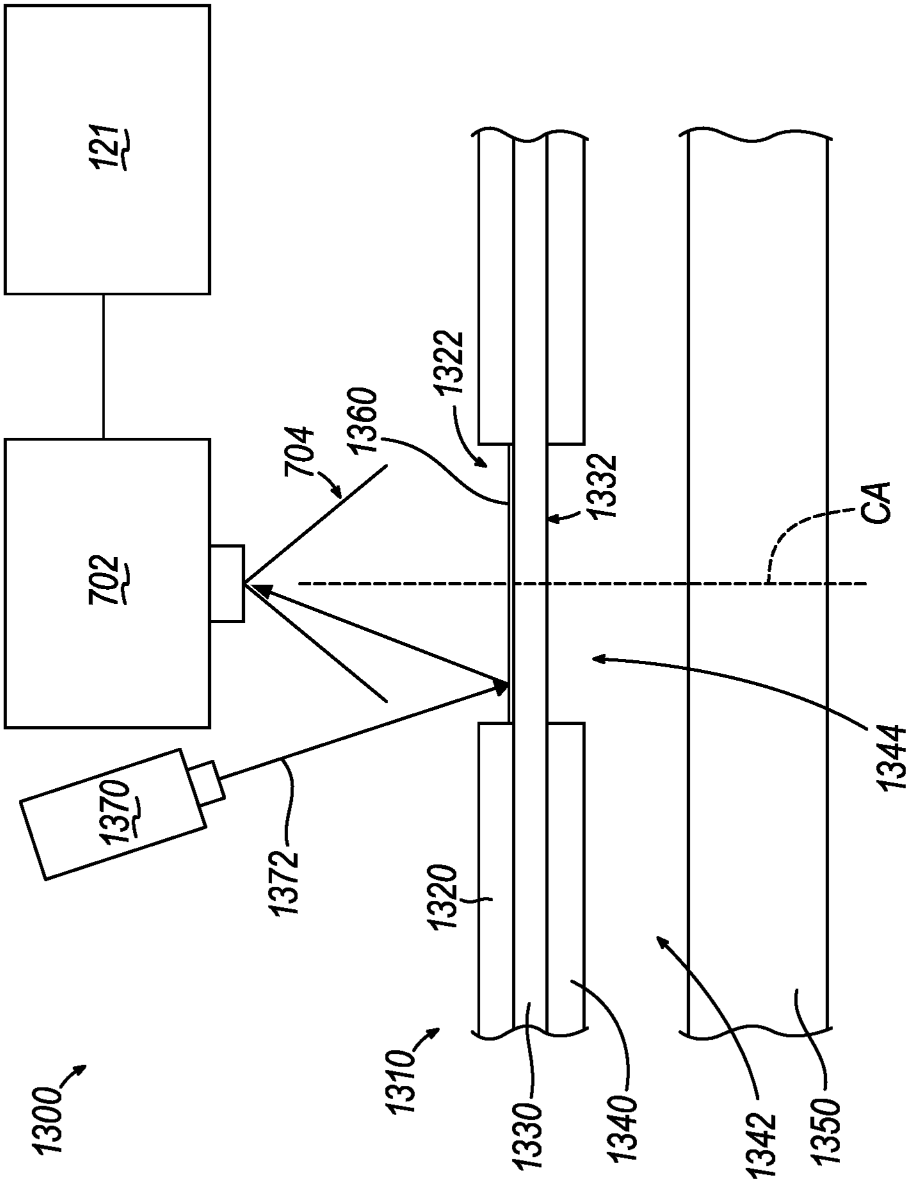
FIG. 18 depicts a schematic cross-sectional view of another example of a pressure sensing stage that may be incorporated into the process chip of FIG. 3.

In some scenarios, it may be desirable to provide visual tracking of lateral deformation via reflection. To that end, FIG. 18 shows an example of a pressure sensing stage (1300) that is operable to provide visual tracking of lateral deformation via reflection. Pressure sensing stage (1300) of this example includes a portion of a process chip (1310), a camera (702), a controller (121), and a light source (1370). In addition to including the features and functionality described below, process chip (1310) may include any of the other features and functionalities described above in the context of process chips (111, 200, 500). In other words, the following teachings relating to pressure sensing stage (1300) may be readily applied to any of the various process chips (111, 200, 500) described herein.

The respective roles and configurations of camera (702) and controller (121) are pressure sensing stage (1200) is the same as the respective roles and configurations of camera (702) and controller (121) in pressure sensing stage (700). Those roles and configurations will therefore not be repeated here.

Process chip (1310) of the present example includes a first plate (1320), an elastic layer (1330), a second plate (1340), and a third plate (1350). Elastic layer (1330) is interposed between plates (1320, 1340). Third plate (1350) cooperates with second plate (1340) to define a channel (1342) through which fluid may flow. The region of channel (1342) at the left-hand side of FIG. 18 may be regarded as a fluid input port of pressure-sensing stage (1300); while the region of channel (1342) at the right-hand-side of FIG. 18 may be regarded as a fluid output port of pressure-sensing stage (1300). Plates (1320, 1340, 1350) of process chip (1310) may be configured and operable like plates (300, 304, 306) of process chip (200). Similarly, elastic layer (1330) of process chip (1310) may be configured and operable like elastic layer (302) of process chip (200). Thus, elastic layer (1330) may extend across a substantial portion of the width of process chip (1310), such that elastic layer (1330) may also perform functions in other chambers of process chip (1310) (e.g., valving, peristaltic pumping, ventilating etc.).

Second plate (1340) defines an opening (1344) that is fluidically coupled with channel (1342), such that opening (1344) exposes a portion (1332) of elastic layer (1330) to fluid in channel (1342). By way of example only, at least portion (1332) of elastic layer (1330) may have a thickness ranging from approximately 50 micrometers to approximately 200 micrometers; including a thickness of approximately 100 micrometers. First plate (1320) defines an opening (1322) that is aligned with opening (1344) of second plate (1340). In the example shown in FIG. 18, opening (1322) and opening (1344) have the same diameter. In some other versions, opening (1322) has a larger diameter than opening (1344). In some other versions, opening (1322) has a smaller diameter than opening (1344). In the present example, both openings (1322, 1344) are circular. Alternatively, openings (1322, 1344) may have any other suitable respective configurations. In the present example, with opening (1344) providing a path for fluid in channel (1342) to reach portion (1332) of elastic layer (1330), and with opening (1322) providing clearance for elastic layer (1330) to deform, portion (1332) of elastic layer (1330) may achieve a deformed state as shown and described herein in the context of elastic layer (730).

While portion (1332) of elastic layer (1330) is exposed to openings (1322, 1344) in this example, other variations may instead include a dedicated pressure sensing membrane like pressure sensing membrane (870) of process chip (810). In such versions, the dedicated pressure sensing membrane may be positioned within, over, or under a corresponding opening (e.g., like opening (832)) that is formed in elastic layer (1330).

An optical feature (1360) is positioned atop portion (1332) of elastic layer (1330). In versions where a dedicated pressure sensing membrane is used instead of portion (1332) of elastic layer (1330), optical feature (1360) may be positioned on, in, or under the dedicated pressure sensing membrane. Optical feature (1360) is configured to deform with elastic layer (1330) in response to positive pressurization of fluid within channel (1342), similar to the effects described above in the context of FIG. 8B. As portion (1332) of elastic layer (1330) and optical feature (1360) deform together along the central axis (CA) in response to positive pressurization of fluid within channel (1342), portion (1332) of elastic layer (1330) and optical feature (1360) may also deform along a lateral dimension (LD) that is transverse to the central axis (CA). This lateral deformation may be tracked via a certain annular region of portion (1332) or optical feature (1360), like annular region (762) described above.

In some versions, optical feature (1360) is adhered to elastic layer (1330) via an adhesive. In some other versions, optical feature (1360) is printed directly on elastic layer (1330). Alternatively, optical feature (1360) may be secured to elastic layer (1330) in any other suitable fashion. In the example shown in FIG. 17, optical feature (1360) spans across the full surface area of portion (1332) of elastic layer (1330). In some other versions, optical feature (1360) is only positioned on one or more discrete regions of elastic layer (1330) within opening (1322), without spanning across the full surface area of portion (1332) of elastic layer (1330). For instance, in some versions, optical feature (1360) is only positioned in an annular region of elastic layer (1330), similar to annular region (762) shown in FIG. 9.

While optical feature (1360) is shown as being positioned atop elastic layer (1330), some other versions of optical feature (1360) may be positioned under elastic layer (1330). For instance, optical feature (1360) may be positioned under elastic layer (1330). As yet another example, optical feature (1360) may be embedded within elastic layer (1330). In some such versions, the entire width of elastic layer (1330) includes embedded optically viewable features that may serve as optical feature (1360), including regions of elastic layer (1330) that are not exposed via opening (1322). In some other versions, optical feature (1360) is embedded only in portion (1332) of elastic layer (1330).

Optical feature (1360) of this example is configured to reflect light. As shown in FIG. 18, light source (1370) is positioned over process chip (1310) and is configured to project a light beam (1372) toward optical feature (1360). While light source (1370) is shown as being positioned over process chip (1310), in some other versions light source (1370) may be positioned elsewhere and mirrors may be used to direct light beams (1372) toward optical feature (1360). In the present example, light beam (1372) is coherent. In some other versions, light source (1370) projects incoherent light. Some versions of light source (1370) may also project patterned light (e.g., light having a chessboard pattern, etc.). While only one light source (1370) is used in the present example, other versions may use more than one light source (1370). In the present example, light beam (1372) is oriented toward a region of optical feature (1360) that is laterally offset from the central axis (CA). Light beam (1372) may thus be oriented such that light beam (1372) will reflect off of a certain annular region of optical feature (1360) (e.g., like annular region (762) described above) as elastic layer (1330) and optical feature (1360) transition from the non-deformed state shown in FIG. 18 to a deformed state in response to fluid pressure in channel (1342).

As optical feature (1360) deforms with elastic layer (1230), including the lateral deformation as described herein, the portion of light beam (1372) that is reflected off of optical feature (1360) will be redirected. This redirection of reflected light may be visually indicative of the pressure of fluid in channel (1342). With optical feature (1360) being within the field of view (704) of camera (702), camera (702) may capture the redirection of light reflected from optical feature (1360) as optical feature (1360) deforms with elastic layer (1330). Camera (702) may transmit the image data to controller (121). Controller (121) may then convert the image data into a pressure value indicating the pressure of fluid in channel (1342) as described herein.

G. Example of Pressure Sensing Stage with Engagement Plate

Figure 19A:
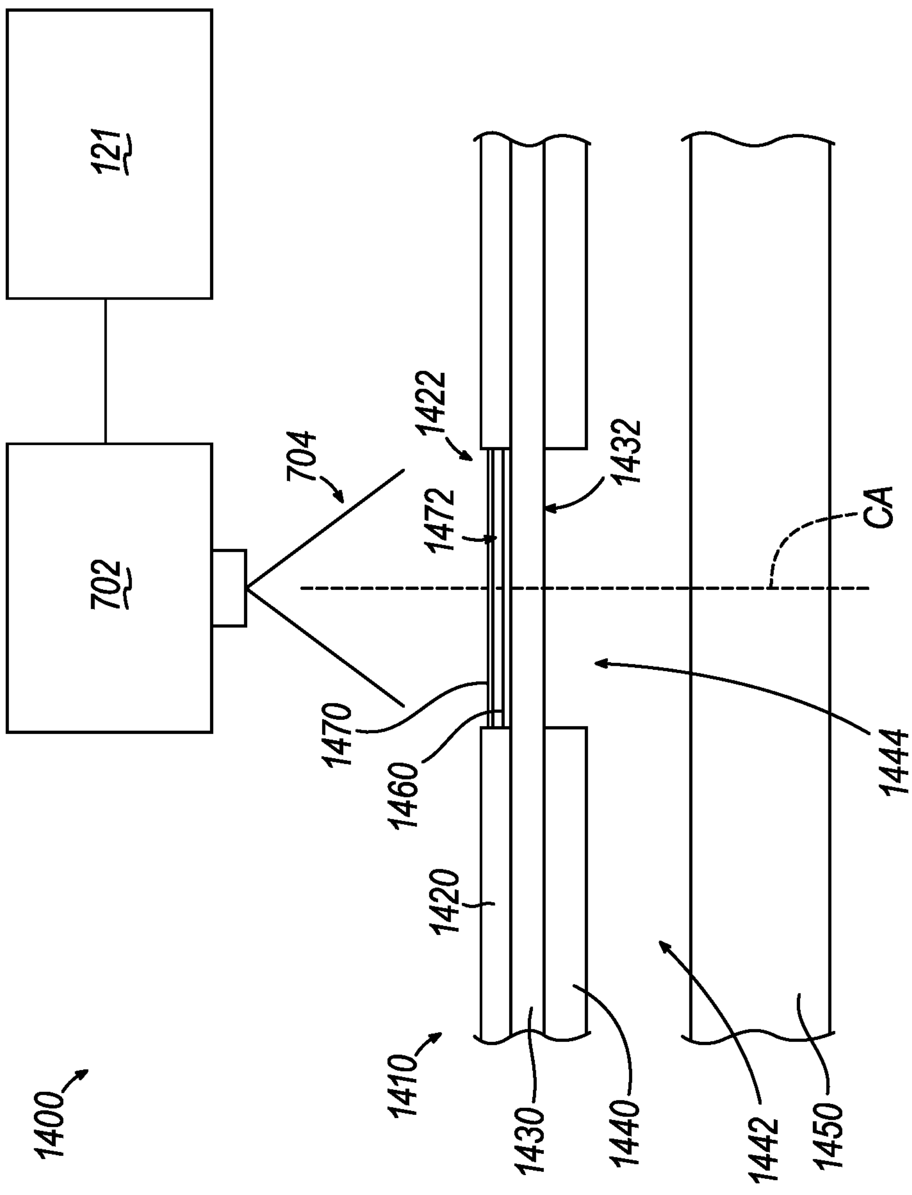
FIG. 19A depicts a schematic cross-sectional view of another example of a pressure sensing stage that may be incorporated into the process chip of FIG. 3, with an elastic layer in a non-deflected state.
Figure 19B:
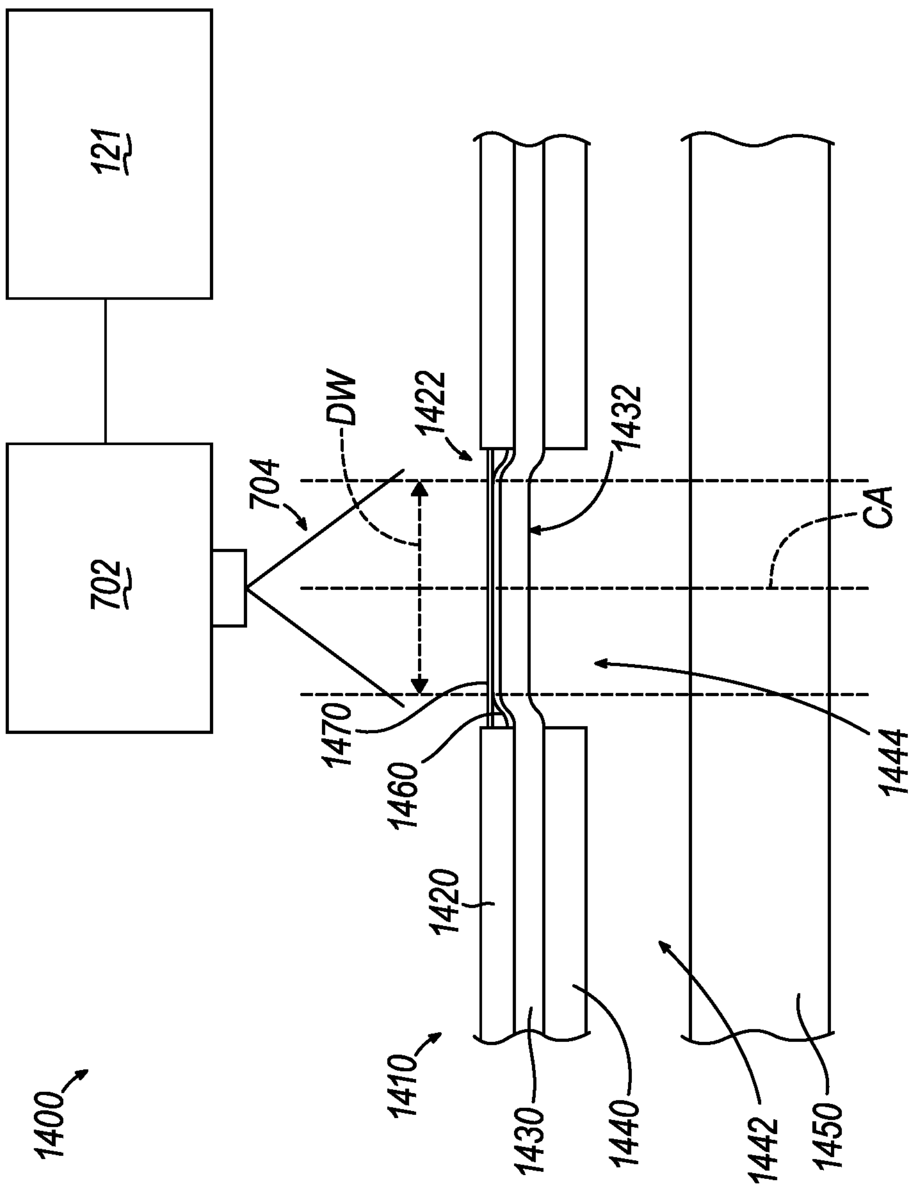
FIG. 19B depicts a schematic cross-sectional view of the pressure sensing stage of FIG. 19A, with the elastic layer in a deflected state.

In some scenarios, it may be desirable to provide visual tracking of lateral deformation via changes in contact between the deforming structural feature and a fixed structure. To that end, FIGS. 19A-19B show an example of a pressure sensing stage (1400) that is operable to provide visual tracking of lateral deformation via lateral deformation via changes in contact between the deforming structural feature and a fixed structure. Pressure sensing stage (1400) of this example includes a portion of a process chip (1410), a camera (702), and a controller (121). In addition to including the features and functionality described below, process chip (1410) may include any of the other features and functionalities described above in the context of process chips (111, 200, 500). In other words, the following teachings relating to pressure sensing stage (1400) may be readily applied to any of the various process chips (111, 200, 500) described herein.

The respective roles and configurations of camera (702) and controller (121) are pressure sensing stage (1400) is the same as the respective roles and configurations of camera (702) and controller (121) in pressure sensing stage (700). Those roles and configurations will therefore not be repeated here.

Process chip (1410) of the present example includes a first plate (1420), an elastic layer (1430), a second plate (1440), and a third plate (1450). Elastic layer (1430) is interposed between plates (1420, 1440). Third plate (1450) cooperates with second plate (1440) to define a channel (1442) through which fluid may flow. The region of channel (1442) at the left-hand side of FIGS. 19A-19B may be regarded as a fluid input port of pressure-sensing stage (1400); while the region of channel (1442) at the right-hand-side of FIGS. 19A-19B may be regarded as a fluid output port of pressure-sensing stage (1400). Plates (1420, 1440, 1450) of process chip (1410) may be configured and operable like plates (300, 304, 306) of process chip (200). Similarly, elastic layer (1430) of process chip (1410) may be configured and operable like elastic layer (302) of process chip (200). Thus, elastic layer (1430) may extend across a substantial portion of the width of process chip (1410), such that elastic layer (1430) may also perform functions in other chambers of process chip (1410) (e.g., valving, peristaltic pumping, ventilating etc.).

Second plate (1440) defines an opening (1444) that is fluidically coupled with channel (1442), such that opening (1444) exposes a portion (1432) of elastic layer (1430) to fluid in channel (1442). By way of example only, at least portion (1432) of elastic layer (1430) may have a thickness ranging from approximately 50 micrometers to approximately 200 micrometers; including a thickness of approximately 100 micrometers. First plate (1420) defines an opening (1422) that is aligned with opening (1444) of second plate (1440). In the example shown in FIGS. 19A-19B, opening (1422) and opening (1444) have the same diameter. In some other versions, opening (1422) has a larger diameter than opening (1444). In some other versions, opening (1422) has a smaller diameter than opening (1444). In the present example, both openings (1422, 1444) are circular. Alternatively, openings (1422, 1444) may have any other suitable respective configurations. In the present example, with opening (1444) providing a path for fluid in channel (1442) to reach portion (1432) of elastic layer (1430), and with opening (1422) providing clearance for elastic layer (1430) to deform, portion (1432) of elastic layer (1430) may achieve a deformed state as shown in FIG. 19B.

While portion (1432) of elastic layer (1430) is exposed to openings (1422, 1444) in this example, other variations may instead include a dedicated pressure sensing membrane like pressure sensing membrane (870) of process chip (810). In such versions, the dedicated pressure sensing membrane may be positioned within, over, or under a corresponding opening (e.g., like opening (832)) that is formed in elastic layer (1430).

A first optical feature (1460) is positioned atop portion (1432) of elastic layer (1430). In versions where a dedicated pressure sensing membrane is used instead of portion (1432) of elastic layer (1430), first optical feature (1460) may be positioned on, in, or under the dedicated pressure sensing membrane. First optical feature (1460) is configured to deform with elastic layer (1430) in response to positive pressurization of fluid within channel (1442), as shown in FIG. 19B.

A second optical feature (1470) is positioned over first optical feature (1460) and is spaced apart from first optical feature (1460) by a gap (1472). Second optical feature (1470) of this example is in the form of a rigid, transparent plate or disc. As shown in FIGS. 19A-19B, second optical feature (1470) is positioned in opening (1422), below the plane defined by the upper surface of first plate (1420). In some other versions, second optical feature (1470) is positioned atop first plate (1420), over opening (1422). In either case, second optical feature (1470) may be secured to first plate (1420) in any suitable fashion. As another variation, second optical feature (1470) may be formed by first plate (1430). For instance, instead of having opening (1422) formed through the entire thickness of first plate (1420), a cylindraceous recess corresponding to opening (1432) may be formed on the underside of first plate (1420) (e.g., via machining, molding, etc.), with a layer of material comprising first plate (1420) being left to form second optical feature (1470). Alternatively, second optical feature (1470) may be formed in any other suitable fashion.

As portion (1432) of elastic layer (1430) and optical feature (1460) deform together along the central axis (CA) in response to positive pressurization of fluid within channel (1442), first optical feature (1460) eventually engages second optical feature (1470) and deforms against second optical feature (1470) as shown in FIG. 19B. With this deformation, a certain width of first optical feature (1460), which may be referred to as a "deformation width" (DW), contacts the underside of second optical feature (1470). This deformation width (DW) may vary based on the pressure of fluid in channel (1442), such that the deformation width (DW) may provide visual feedback that is similar to the lateral deformation feedback described herein. In some versions, second optical feature (1470) includes one or more vent openings to allow air to escape gap (1472) as elastic layer (1430) transitions from the non-deformed state shown in FIG. 19A to the deformed state in FIG. 19B; and to allow air to enter gap (1472) as elastic layer (1430) transitions from the deformed state shown in FIG. 19B to the non-deformed state in FIG. 19A.

With optical features (1460, 1470) being within the field of view (704) of camera (702), camera (702) may capture the deformation width (DW) as first optical feature (1460) engages second optical feature (1470) in response to fluid pressure in channel (1442). Camera (702) may transmit the image data to controller (121). Controller (121) may then convert the image data into a pressure value indicating the pressure of fluid in channel (1442) as described herein.

First optical feature (1460) and/or second optical feature (1470) may include one or more visual features that enhance visualization of the deformation width (DW). For instance, second optical feature may include series of concentric circles inscribed thereon, such that first optical feature (1460) progressively overlaps with more of these circles as first optical feature deforms against second optical feature (1470). The concentric circles may thus serve as indicia facilitating visualization of the degree to which first optical feature (1460) is pressed against second optical feature (1470) (i.e., the deformation width (DW)). As another example, first optical feature (1460) may include one or more structures (e.g., three-dimensional features) that change shape when compressed against second optical feature (1470). As another example, first and second optical features (1460, 1470) may include materials that react with each other based on proximity. Examples of such materials may include those that provide Förster resonance energy transfer (FRET) effects based on their proximity to each other. As another example, first and second optical features (1460, 1470) may include features that generate visual interferences or Moiré fringe patterns, similar to the effect described above in the context of pressure sensing stage (1100). Alternatively, any other suitable kinds of visual features may be provided on first optical feature (1460) and/or second optical feature (1470) to enhance visualization of the deformation width (DW).

In some versions, first optical feature (1460) is omitted, such that the deformed elastic layer (1430) directly contacts the underside of second optical feature (1470); and such that camera (702) views this direct contact between elastic layer (1430) and second optical feature (1470) to thereby capture the deformation width (DW). The deformation width (DW), and the relationship between the deformation width (DW) and the pressure of fluid in channel (1442), may be the same regardless of whether first optical feature (1460) is omitted and elastic layer (1430) directly contacts second optical feature (1470) or first optical feature (1460) is present and contacts second optical feature (1470).

H Example of Pressure Sensing Stage with Stereoscopic Viewing

Figure 20:
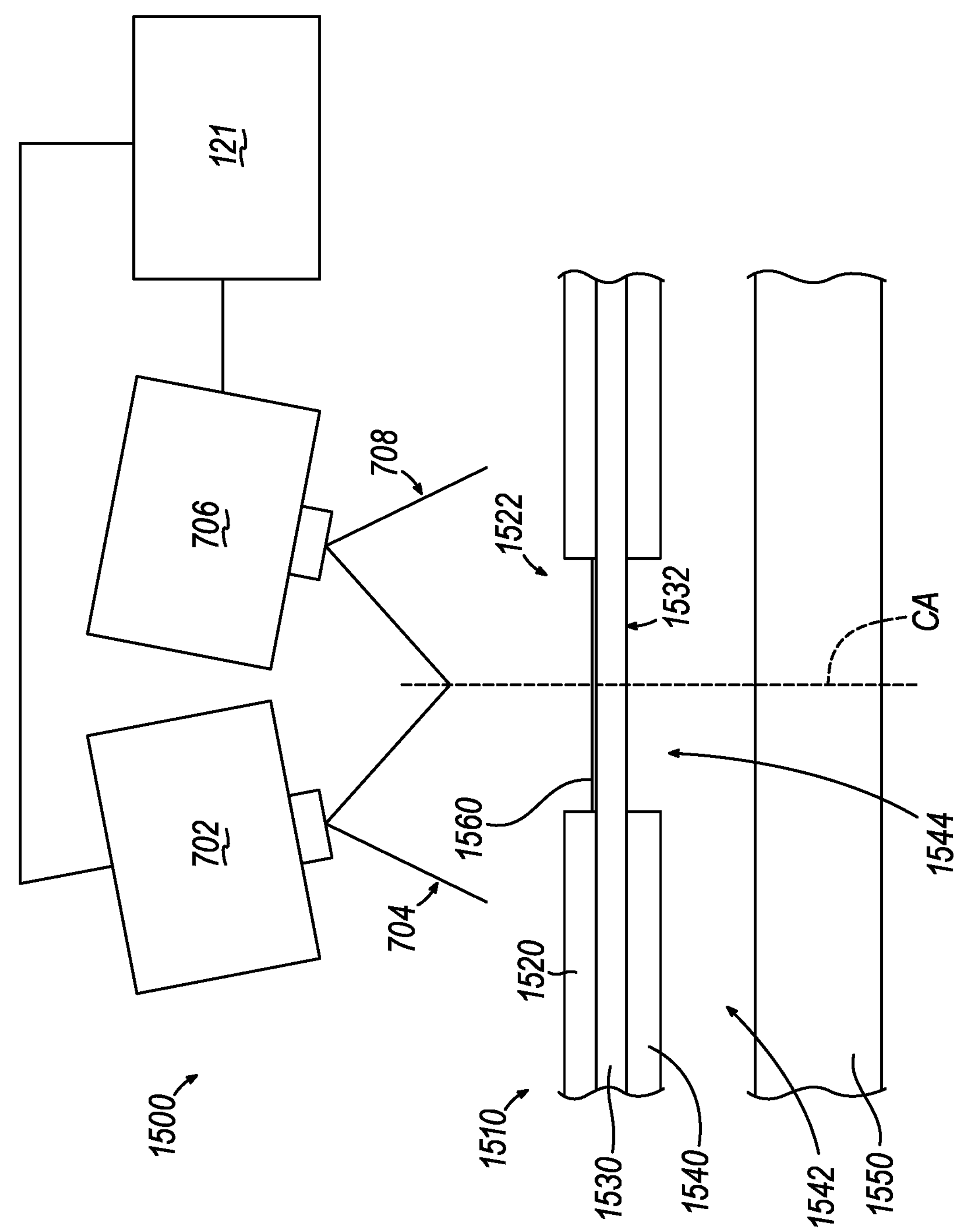
FIG. 20 depicts a schematic cross-sectional view of another example of a pressure sensing stage that may be incorporated into the process chip of FIG. 3.

In some scenarios, it may be desirable to view lateral deformation from two different perspectives simultaneously, such that a parallax effect may provide stereoscopic vision of the lateral deformation. FIG. 20 shows an example of a pressure sensing stage (1500) that provides such viewing. As shown in FIG. 20, pressure sensing stage (1500) of this example includes a process chip (1510), a pair of cameras (702, 706), and controller (121). In addition to including the features and functionality described below, process chip (1510) may include any of the other features and functionalities described above in the context of process chips (111, 200, 500). In other words, the following teachings relating to pressure sensing stage (1500) may be readily applied to any of the various process chips (111, 200, 500) described herein.

Process chip (1510) of the present example includes a first plate (1520), an elastic layer (1530), a second plate (1540), a third plate (1550), and an optical feature (1560). First plate (1520) defines an opening (1522). Second and third plates (1540, 1550) cooperate to define a fluid channel (1542). Second plate (1542) further defines an opening (1544)

exposing a portion (1532) of elastic layer (1530) to fluid channel (1542). All these features (1520, 1522, 1530, 1532, 1540, 1542, 1544, 1550, 1560) of process chip (1510) may be configured and operable just like the same features (720, 722, 730, 732, 740, 742, 744, 750, 760) of process chip (710). The details of these features (1520, 1522, 1530, 1532, 1540, 1542, 1544, 1550, 1560) will therefore not be repeated here. While this description provides an analogy between features (1520, 1522, 1530, 1532, 1540, 1542, 1544, 1550, 1560) of process chip (1510) and features (720, 722, 730, 732, 740, 742, 744, 750, 760) of process chip (710), the dual-camera (702, 706) configuration of pressure sensing stage (1500) may be readily incorporated into any of the other pressure sensing stages (800, 1100, 1200, 1300, 1400) described herein.

A first camera (702) of the present example is positioned to provide a first field of view (704) in which first camera (702) may capture images of optical feature (1560) of process chip (1510). A second camera (706) is positioned to provide a second field of view (708) in which second camera (706) may capture images of optical feature (1560) of process chip (1510). In the present example, the field of view (704) of first camera (702) overlaps with the field of view (708) of second camera (706), with optical feature (1560) being located within the overlapping regions of fields of view (704, 708).

In some versions, each camera (702, 706) may be regarded as sensors (105) of system (100) as described above. For instance, one optical sensor (105) such as an optical sensor (160) shown in FIG. 2 may serve as first camera (702) in pressure sensing stage (1500); while another one of the optical sensors (160) shown in FIG. 2 may serve as second camera (706) in pressure sensing stage (1500). Thus, while cameras (702, 706) are used in pressure sensing stage (1500) as described herein, cameras (702, 706) may also be used to serve other functions, including but not limited to viewing barcodes on vials held within reagent storage frame (107), viewing fluid levels within vials held within reagent storage frame (107), viewing fluidic movement within process chip (700), and/or viewing other optically detectable conditions.

Cameras (702, 706) of the present example are oriented such that their respective lines of sight are obliquely oriented relative to the central axis (CA). In some other versions, first camera (702) and/or second camera (706) is oriented such that its line of sight is parallel with the central axis (CA). In versions where the line(s) of sight for first camera (702) and/or second camera (706) is parallel with the central axis (CA), the field of view (704) of first camera (702) may still overlap with the field of view (708) of second camera (706), with optical feature (1560) being located within the overlapping regions of fields of view (704, 708).

While cameras (702, 706) are shown in FIG. 20 as being positioned above process chip (1510), first camera (702) and/or second camera (706) may instead be positioned at any other suitable locations. For instance, in some variations, first camera (702) and/or second camera (706) is/are positioned directly underneath process chip (1510). In some such versions (e.g., where at least a corresponding region of process chip (1510) is optically transmissive), optical feature (1560) may still be within the fields of view (704, 708) of cameras (702, 706). As another example, one or more mirrors may be used to provide a reflection of optical feature (1560), with the reflection being within the fields of view (704, 708) of cameras (702, 706).

Controller (121) receives image signals from cameras (702, 706) and processes those image signals to determine a fluid pressure value as described in greater detail below. Controller (121) may further execute various algorithms using at least such determined fluid pressure values, as will also be described in greater detail below. In the present example, controller (121) of pressure sensing stage (1500) is the same controller (121) that is used to perform other operations in system (100) as described above. In some other versions, a separate controller is used to determine fluid pressure values using at least image signals from cameras (702, 706). In such versions, the separate controller may communicate those determined fluid pressure values to controller (121) for execution of pressure-based algorithms. Alternatively, the determined fluid pressure values may be utilized in any other suitable fashion by any other suitable hardware components.

By using two cameras (702, 706), pressure sensing stage (1500) may be able to provide enhanced image data indicating lateral deformation of elastic layer (1530) as observed through optical feature (1560). The stereoscopic viewing provided via cameras (702, 706) may allow controller (121) to achieve three-dimensional modeling of the deformation of elastic layer (1530), thereby providing greater resolution in lateral deformation sensing. This may in turn provide greater precision in fluid pressure sensing.

I. Example of Reading Pressure Data from Pressure Sensing Stage

Figure 21:
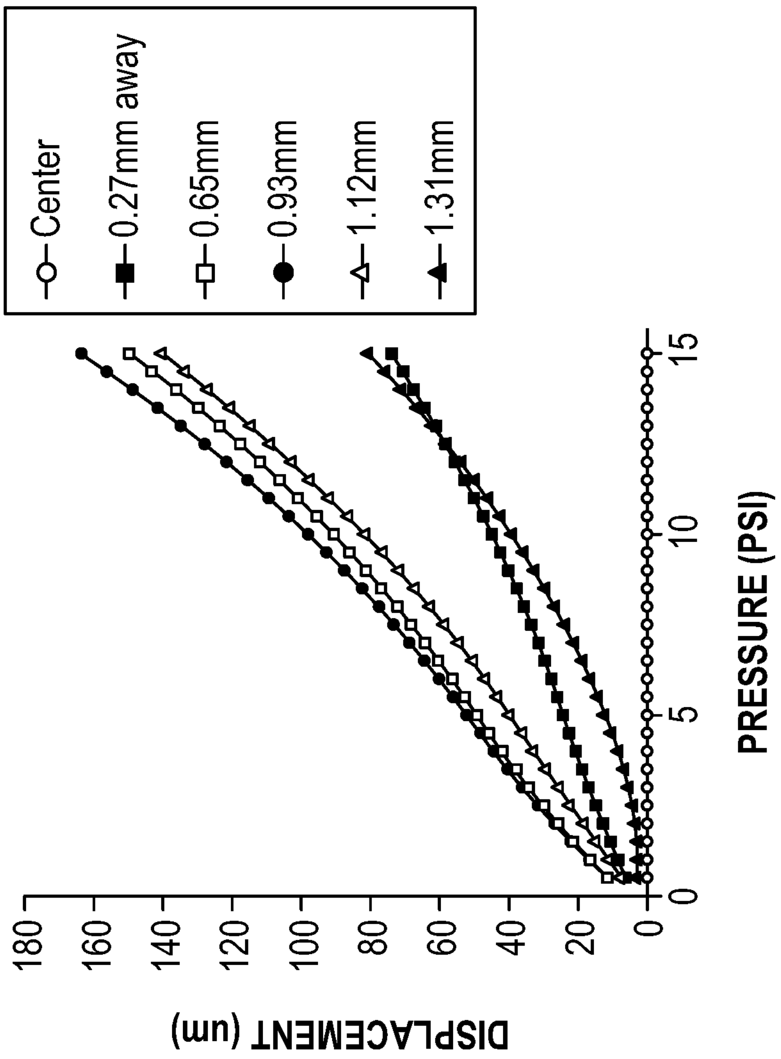
FIG. 21 depicts a graph plotting examples of deflection of an elastic layer of a pressure sensing stage at different lateral regions of the elastic layer.

FIG. 21 shows a graph plotting examples of relationships between lateral displacement of an elastic layer (730, 1130, 1230, 1330, 1430, 1530) or dedicated pressure sensing membrane (870) as a function of the pressure of fluid bearing against elastic layer (730, 1130, 1230, 1330, 1430, 1530) or dedicated pressure sensing membrane (870), based on distance from the central axis (CA). The full radial distance ($D_1$) of opening (722, 822, 922, 1022, 1122, 1222, 1322, 1422, 1522, 1722, 1822, 1922) is approximately 1.5 mm in the example depicted in FIG. 21. In this example, there are separate plots for lateral displacement at the central axis (CA), lateral displacement at a position that is 0.27 mm away from the central axis (CA), lateral displacement at a position that is 0.65 mm away from the central axis (CA), lateral displacement at a position that is 0.93 mm away from the central axis (CA), lateral displacement at a position that is 1.12 mm away from the central axis (CA), and lateral displacement at a position that is 1.31 mm away from the central axis (CA).

As may be seen in the example depicted in FIG. 21, the regions of elastic layer (730, 1130, 1230, 1330, 1430, 1530) or dedicated pressure sensing membrane (870) that are 0.65 mm away from the central axis (CA), 0.93 mm away from the central axis (CA), and 1.12 mm away from the central axis (CA) may provide a relatively large degree of lateral displacement in response to fluid pressure. In the plot representing a position of 0.65 mm away from the central axis (CA), the average slope of the curve may be approximately 10 micrometers of lateral displacement per psi of pressure.

By contrast, the regions of elastic layer (730, 1130, 1230, 1330, 1430, 1530) or dedicated pressure sensing membrane (870) that are 0.27 mm away from the central axis (CA) and 1.31 mm away from the central axis (CA) may provide a lower degree of lateral displacement in response to fluid pressure. The region of elastic layer (730, 1130, 1230, 1330, 1430, 1530) or dedicated pressure sensing membrane (870) that is on the central axis (CA) provides no lateral displacement.

In view of the foregoing, and with reference back to the context of FIG. 9, the certain annular region (762) for the example depicted in FIG. 21 may span through the region between 0.65 mm away from the central axis (CA) (i.e., a first partial radial distance ($D_2$) of 0.65 mm) and 1.12 mm away from the central axis (CA) (i.e., a second partial radial distance ($D_3$) of 1.12 mm). Thus, when processing images from camera (702) or cameras (702, 706), controller (121) may focus specifically on the image data showing lateral deflection in this certain annular region (762) in order to determine fluid pressure.

J. Example of Positioning of Pressure Sensing Stage in Process Chip

The pressure sensing stages (700, 800, 1100, 1200, 1300, 1400, 1500) described herein may be positioned before and/or after one or more working stages in process chip (111, 200, 500, 710, 810, 910, 1010, 1110, 1210, 1310, 1410, 1510, 1710, 1810, 1910). In this context, "before" includes a location upstream of the flow path toward the working stage; and "after" includes a location downstream of working stage. This arrangement allows pressure sensing of fluid before and after the fluid passes through the working stage. Similarly, some versions may provide a first pressure sensing stage (700, 800, 1100, 1200, 1300, 1400, 1500) positioned directly upstream of a set of working stages while a second pressure sensing stage (700, 800, 1100, 1200, 1300, 1400, 1500) is positioned directly downstream of the same set of working stages. This arrangement allows pressure sensing of fluid before and after the fluid passes through the set of working stages. In addition to, or as an alternative to, positioning pressure sensing stages (700, 800, 1100, 1200, 1300, 1400, 1500) in series with one or more working stages; one or more pressure sensing stages (700, 800, 1100, 1200, 1300, 1400, 1500) may be positioned in parallel with one or more working stages.

As used herein, a "working stage" includes a chamber or other structure on process chip (111, 200, 500, 710, 810, 910, 1010, 1110, 1210, 1310, 1410, 1510, 1710, 1810, 1910) that changes one or more biological, chemical, thermal, and/or mechanical properties of fluid flowing through process chip (111, 200, 500, 710, 810, 910, 1010, 1110, 1210, 1310, 1410, 1510, 1710, 1810, 1910); selectively arrests the flow of fluid through process chip (111, 200, 500, 710, 810, 910, 1010, 1110, 1210, 1310, 1410, 1510, 1710, 1810, 1910); selectively permits the flow of fluid through process chip (111, 200, 500, 710, 810, 910, 1010, 1110, 1210, 1310, 1410, 1510, 1710, 1810, 1910); or selectively drives the flow of fluid through process chip (111, 200, 500, 710, 810, 910, 1010, 1110, 1210, 1310, 1410, 1510, 1710, 1810, 1910). A "working stage" may include any of the various kinds of chambers described herein, including but not limited to valve chambers (224, 262, 264, 324, 510, 512, 514), synthesis chambers (230), purification chambers (250), reservoir chambers (260), mixing chambers (270), metering chambers (320), vacuum caps (530, 532, 534, 536), concentration chambers (600), or other kinds of working chambers (526) that are used to perform other functions including but not limited to dialysis, compounding, dilution, filtering, or other processes.

A "working stage" may also include other structural features that provide some kind of working process on a fluid communicated through a process chip (111, 200, 500, 710, 810, 910, 1010, 1110, 1210, 1310, 1410, 1510, 1710, 1810, 1910), including but not limited to a mixing stages (400), sets of vortex mixing chambers (550, 552) in mixing stages, flow restrictors (520, 522, 524), or other structures. Further examples of chambers and other structures of a process chip (111, 200, 500) that may constitute a "working stage" will be apparent to those skilled in the art in view of the teachings herein.

The pressure sensing stages (700, 800, 1100, 1200, 1300, 1400, 1500) described herein may also be positioned adjacent to one or more fluid ports (220) on a process chip (111, 200, 500, 710, 810, 910, 1010, 1110, 1210, 1310, 1410, 1510, 1710, 1810, 1910); and/or adjacent to one or more pressure ports (240) on a process chip (111, 200, 500, 710, 810, 910, 1010, 1110, 1210, 1310, 1410, 1510, 1710, 1810, 1910). In addition, or in the alternative, the pressure sensing stages (700, 800, 1100, 1200, 1300, 1400, 1500) described herein may be positioned at any other suitable location(s) on a process chip (111, 200, 500, 710, 810, 910, 1010, 1110, 1210, 1310, 1410, 1510, 1710, 1810, 1910).

In versions where two or more pressure sensing stages (700, 800, 1100, 1200, 1300, 1400, 1500) are integrated into a single process chip (111, 200, 500, 710, 810, 910, 1010, 1110, 1210, 1310, 1410, 1510), such two or more pressure sensing stages (700, 800, 1100, 1200, 1300, 1400, 1500) may utilize the same single camera (702) or single pair of cameras (702, 706). In other words, it may not be necessary for each pressure sensing stage (700, 800, 1100, 1200, 1300, 1400, 1500) to have its own dedicated camera (702) or dedicated pair of cameras (702, 706). Pressure sensing stages (700, 800, 1100, 1200, 1300, 1400, 1500) may utilize the same single camera (702) or single pair of cameras (702, 706) in versions where optical features (760, 860, 960, 1060, 1260, 1360, 1460, 1470, 1560, 1760, 1860, 1960) of two or more respective pressure sensing stages (700, 800, 1100, 1200, 1300, 1400, 1500) are within the same field of view (704) of the single camera (702); or within the same fields of view (704, 706) of the single pair of cameras (702, 706). In such scenarios, the same single camera (702) or singe pair of cameras (702, 706) may thus view two or more optical features (760, 860, 960, 1060, 1260, 1360, 1460, 1470, 1560, 1760, 1860, 1960) simultaneously.

As a more specific example, a first pressure sensing stage (700, 800, 1100, 1200, 1300, 1400, 1500) may be placed before a first fluid inlet channel (402) of a mixing stage (400), a second pressure sensing stage (700, 800, 1100, 1200, 1300, 1400, 1500) may be placed before a second fluid inlet channel (402) of mixing stage (400), and a third pressure sensing stage (700, 800, 1100, 1200, 1300, 1400, 1500) may be placed after outlet channel (424) of mixing stage (400). This arrangement may thus allow monitoring of the pressure of fluid in inlet channels (402, 404) and outlet channel (424) of mixing stage (400); and may further allow monitoring of flow rate through mixing stage (400). While three pressure sensing stages (700, 800, 1100, 1200, 1300, 1400, 1500) are used in this example, a single camera (702) or set of cameras (702, 706) may be used to provide visualization for all three pressure sensing stages (700, 800, 1100, 1200, 1300, 1400, 1500).

As another specific example, a first pressure sensing stage (700, 800, 1100, 1200, 1300, 1400, 1500) may be placed before inlet (602) of concentration chamber (600), and a second pressure sensing stage (700, 800, 1100, 1200, 1300, 1400, 1500) may be placed after outlet (604) of concentration chamber (600). This arrangement may thus allow monitoring of the pressure of fluid in inlet (602) and outlet (604) of concentration chamber (600); and may further allow monitoring of flow rate through concentration chamber (600). While two pressure sensing stages (700, 800, 1100, 1200, 1300, 1400, 1500) are used in this example, a single camera (702) or set of cameras (702, 706) may be used to provide visualization for both pressure sensing stages (700, 800, 1100, 1200, 1300, 1400, 1500).

While mixing stage (400) and concentration chamber (600) are referenced in the specific examples provided above, the same arrangements may be utilized for any other working stages or groups of working stages.

K. Example of Pressure Sensing During Initialization of System

Some versions of system (100) may implement pressure sensing steps as part of an initialization process, before fluid is flowed through process chip (111, 200, 500, 710, 810, 910, 1010, 1110, 1210, 1310, 1410, 1510, 1710, 1810, 1910) to form the therapeutic composition. In some such scenarios, system (100) may run through a calibration routine as part of this initialization process. This calibration routine may include activating camera (702) or cameras (702, 706) to capture an initial image of optical feature (760, 860, 960, 1060, 1260, 1360, 1460, 1470, 1560, 1760, 1860, 1960) to establish a visual baseline of the appearance of optical feature (760, 860, 960, 1060, 1260, 1360, 1460, 1470, 1560, 1760, 1860, 1960) when process chip (111, 200, 500, 710, 810, 910, 1010, 1110, 1210, 1310, 1410, 1510, 1710, 1810, 1910) lacks pressurized fluid. This may be particularly useful in versions where optical feature (1060) (with stochastically arranged visible elements (1062)) is used, as this may allow controller (121) to identify the pattern of visible elements (1062).

As another part of a calibration routine, system (100) may communicate a fluid through at least a portion of process chip (111, 200, 500, 710, 810, 910, 1010, 1110, 1210, 1310, 1410, 1510, 1710, 1810, 1910), at a known pressure; then activate camera (702) or cameras (702, 706) to visualize optical feature (760, 860, 960, 1060, 1260, 1360, 1460, 1470, 1560, 1760, 1860, 1960) while the fluid is at the known pressure. This may further enhance the machine learning by controller (121), to thereby provide greater accuracy in subsequent determinations by controller (121) of fluid pressures using at least deformations of elastic layer (730, 1130, 1230, 1330, 1430, 1530) or dedicated pressure sensing membrane (870) as visually indicated by optical feature (760, 860, 960, 1060, 1260, 1360, 1460, 1470, 1560, 1760, 1860, 1960).

Figure 22:
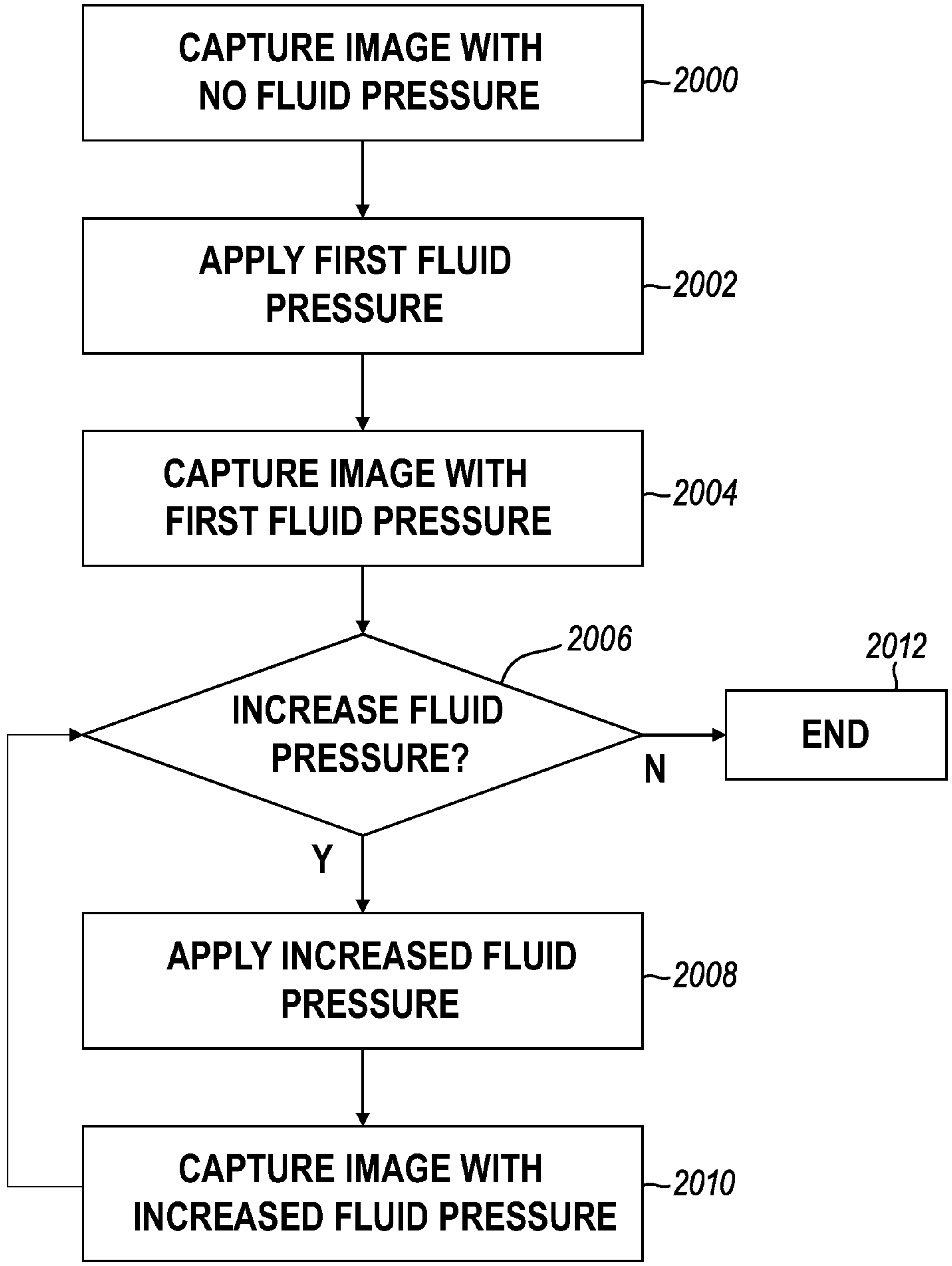
FIG. 22 depicts a flow chart showing an example of a calibration process that may be used with any of the pressure sensing stages described herein.

FIG. 22 shows an example of a set of steps that may be carried out as part of a calibration process as described above. The calibration process shown in FIG. 22 may be carried out using any of the process chips (111, 200, 500, 710, 810, 910, 1010, 1110, 1210, 1310, 1410, 1510, 1710, 1810, 1910) described herein. As shown in block (2000) the process may begin with camera (702) or cameras (702, 706) capturing an initial image of optical feature (760, 860, 960, 1060, 1260, 1360, 1460, 1470, 1560, 1760, 1860, 1960) to establish a visual baseline of the appearance of optical feature (760, 860, 960, 1060, 1260, 1360, 1460, 1470, 1560, 1760, 1860, 1960) when process chip (111, 200, 500, 710, 810, 910, 1010, 1110, 1210, 1310, 1410, 1510, 1710, 1810, 1910) lacks pressurized fluid. For instance, process chip (111, 200, 500, 710, 810, 910, 1010, 1110, 1210, 1310, 1410, 1510, 1710, 1810, 1910) may be empty of fluid. In some such scenarios, process chip (111, 200, 500, 710, 810, 910, 1010, 1110, 1210, 1310, 1410, 1510, 1710, 1810, 1910) contains air at ambient pressure. Alternatively, process chip (111, 200, 500, 710, 810, 910, 1010, 1110, 1210, 1310, 1410, 1510, 1710, 1810, 1910) may contain fluid at ambient pressure. In either scenario, the initial/baseline image may be stored for subsequent comparisons to other images.

Next, as shown in block (2002), fluid is communicated through at least a portion of process chip (111, 200, 500, 710, 810, 910, 1010, 1110, 1210, 1310, 1410, 1510, 1710, 1810, 1910) at a known first pressure. With the fluid at this known first pressure, camera (702) or cameras (702, 706) is/are activated to capture an image of optical feature (760, 860, 960, 1060, 1260, 1360, 1460, 1470, 1560, 1760, 1860, 1960), as shown in block (2004). This captured image may be stored in connection with the known first pressure. In some versions, the captured image is compared to the initial, baseline image, and data representing a difference between these two images is stored in connection with the known first pressure.

In the present example, the fluid pressure is increased in accordance with a predetermined fluid pressure profile, such that the next step of the process is to determine whether the pressure needs to be increased in accordance with that predetermined fluid pressure profile, as shown in block (2006). If the pressure needs to be increased in accordance with that predetermined fluid pressure profile, then the fluid is communicated through at least a portion of process chip (111, 200, 500, 710, 810, 910, 1010, 1110, 1210, 1310, 1410, 1510, 1710, 1810, 1910) at the increased pressure, as shown in block (2008). With the fluid at this increased pressure, camera (702) or cameras (702, 706) is/are activated to capture an image of optical feature (760, 860, 960, 1060, 1260, 1360, 1460, 1470, 1560, 1760, 1860, 1960), as shown in block (2010). This captured image may be stored in connection with the known increased pressure. In some versions, this captured image is compared to the initial/baseline image, and data representing a difference between these two images is stored in connection with the known increased pressure.

The foregoing steps shown in blocks (2006, 2008, 2010) may be reiterated, with the fluid pressure increasing incrementally in accordance with the predetermined fluid pressure profile, until the fluid pressures have progressed through the entire predetermined fluid pressure profile. Once this stage has been reached, the calibration process may end, as shown in block (2012). At the end of the calibration, system (100) may store several images of optical feature (760, 860, 960, 1060, 1260, 1360, 1460, 1470, 1560, 1760, 1860, 1960) in connection with several corresponding fluid pressure levels. In addition, or in the alternative, system (100) may store data indicating differences between the initial/baseline image of optical feature (760, 860, 960, 1060, 1260, 1360, 1460, 1470, 1560, 1760, 1860, 1960) and each image of optical feature (760, 860, 960, 1060, 1260, 1360, 1460, 1470, 1560, 1760, 1860, 1960) at the different fluid pressure levels, with each difference being stored in connection with the corresponding fluid pressure level. Regardless of whether all the images are stored and/or all the image difference data is stored, such information may be stored in controller (121) and/or in any other suitable component(s) of system (100).

It should also be understood that process chips (111, 200, 500, 710, 810, 910, 1010, 1110, 1210, 1310, 1410, 1510, 1710, 1810, 1910) may be sensitive to changes in ambient air pressure. Thus, the calibration process described above with reference to FIG. 22 may further be used to measure the ambient air pressure. For instance, a pressure measurement obtained via pressure sensing stage (700, 800, 1100, 1200, 1300, 1400, 1500) may be compared against the known fluid pressure that is applied to process chip (111, 200, 500, 710, 810, 910, 1010, 1110, 1210, 1310, 1410, 1510, 1710, 1810, 1910), to thereby observe effects of ambient pressure on process chip (111, 200, 500, 710, 810, 910, 1010, 1110, 1210, 1310, 1410, 1510, 1710, 1810, 1910) counteracting the known fluid pressure within process chip (111, 200, 500,

710, 810, 910, 1010, 1110, 1210, 1310, 1410, 1510, 1710, 1810, 1910). Alternatively, any other suitable techniques may be used to sense ambient air pressure via pressure sensing stage (700, 800, 1100, 1200, 1300, 1400, 1500). In any case, the sensed ambient air pressure may be factored into subsequent fluid pressure data processing in any suitable fashion.

Figure 23:
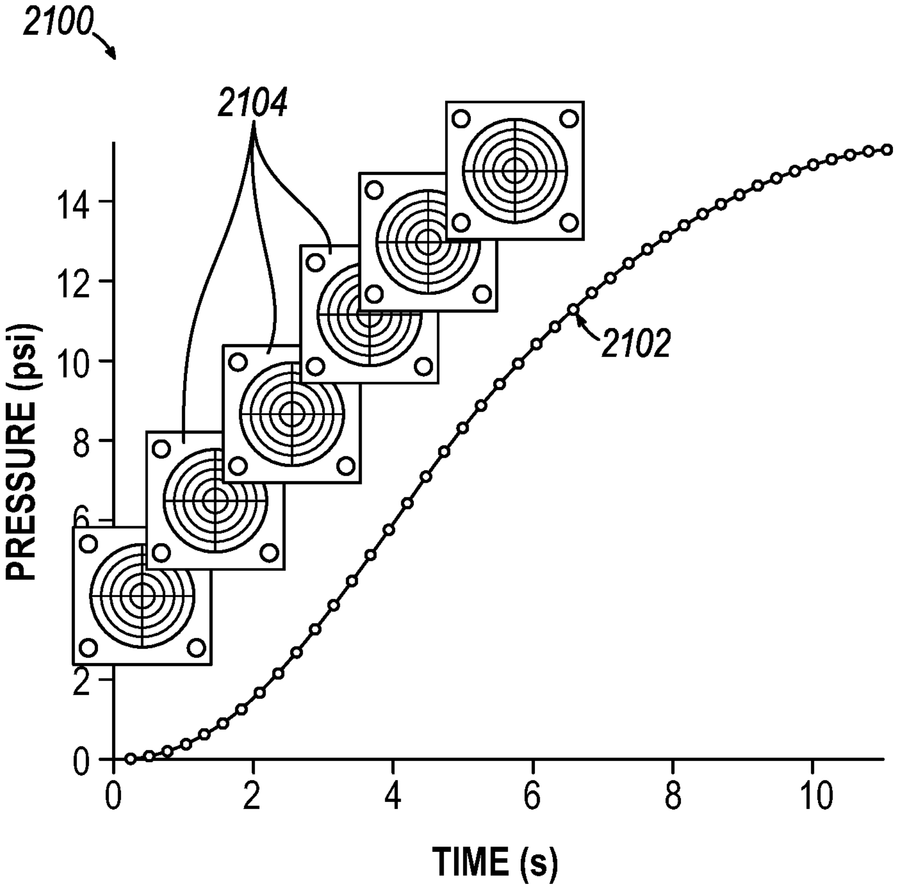
FIG. 23 depicts a graph plotting an example of a fluid pressure profile that may be used during a calibration process such as the calibration process of FIG. 22.

FIG. 23 shows a graph (2100) plotting an example of a fluid pressure profile (2102) that may be used during a calibration process such as the calibration process described above with reference to FIG. 22. As shown, images (2104) of optical feature (760, 860, 960, 1060, 1260, 1360, 1460, 1470, 1560, 1760, 1860, 1960) may be captured at various points along the fluid pressure profile (2102). While only six images (2104) are shown in this example, it should be understood that any suitable number of images (2104) (e.g., dozens, hundreds, thousands, etc.) may be captured during a calibration process. In the example shown in FIG. 23, fluid pressure profile (2102), representing fluid pressure as a function of time, generally defines a sigmoid curve. In some other versions, fluid pressure profile (2102) is linear. Alternatively, fluid pressure profile (2102) may define any other suitable shape.

In addition to the calibration routine described above, another initialization process may include a fault detection routine. In such a routine, system (100) may pressurize fluid channels having pressure sensing stages (700, 800, 1100, 1200, 1300, 1400, 1500) and confirm whether these pressure sensing stages (700, 800, 1100, 1200, 1300, 1400, 1500) are indicating that the corresponding fluid channels are at the expected pressure. For instance, if a pressure sensing stage (700, 800, 1100, 1200, 1300, 1400, 1500) indicates a pressure level that is below an expected pressure level or pressure range, this may indicate that a seal has failed or some other fault condition. If a pressure sensing stage (700, 800, 1100, 1200, 1300, 1400, 1500) indicates a pressure level that is above an expected pressure level or pressure range, this may indicate that a valve chamber is stuck in a closed position or some other obstruction (e.g., material deposition on the sides of channels, etc.) in the fluid path. Controller (121) may trigger an alert to the operator via user interface (123) when a fault is detected using at least pressure sensed by a pressure sensing stage (700, 800, 1100, 1200, 1300, 1400, 1500). The operator may then replace process chip (111, 200, 500, 710, 810, 910, 1010, 1110, 1210, 1310, 1410, 1510, 1710, 1810, 1910) and/or take any other appropriate action.

L. Example of Pressure Sensing During Preparation of Therapeutic Composition

In addition to operating pressure sensing stages (700, 800, 1100, 1200, 1300, 1400, 1500) during an initialization process, system (100) may operate pressure sensing stages (700, 800, 1100, 1200, 1300, 1400, 1500) while system (100) is being used to prepare a therapeutic composition. For instance, while the fault detection routine is described above the context of an initialization process, the same kind of fault detection may be provided while system (100) is being used to prepare a therapeutic composition, after the initialization process is complete. As noted above, controller (121) may trigger an alert to the operator via user interface (123) when a fault is detected using at least pressure sensed by a pressure sensing stage (700, 800, 1100, 1200, 1300, 1400, 1500). The operator may then replace process chip (111, 200, 500, 710, 810, 910, 1010, 1110, 1210, 1310, 1410, 1510, 1710, 1810, 1910) and/or take any other appropriate action.

In some instances, this may be desirable to determine whether the fluid is passing through a working stage at a desired flow rate; or at a flow rate that is within a desired range. To that end, controller (121) may track pressure data from one or more pressure sensing stages (700, 800, 1100, 1200, 1300, 1400, 1500) in real time and use that data to determine whether the fluid is passing through the corresponding working stage(s) at a desired flow rate; or at a flow rate that is within a desired range. In some versions, controller (121) is further configured to adjust operation of system (100) using at least the real-time pressure feedback from one or more pressure sensing stages (700, 800, 1100, 1200, 1300, 1400, 1500). In other words, the pressure data acquired via one or more pressure sensing stages (700, 800, 1100, 1200, 1300, 1400, 1500) may be used in a real-time feedback loop. In some such versions, controller (121) is configured to serve as a proportional-integral-derivative (PID) controller to make ad hoc adjustments to operation of system (100) on the fly using at least the real-time pressure feedback from one or more pressure sensing stages (700, 800, 1100, 1200, 1300, 1400, 1500). This may include modifying operation of valve chambers in process chip (111, 200, 500, 710, 810, 910, 1010, 1110, 1210, 1310, 1410, 1510, 1710, 1810, 1910), modifying the peristaltic pumping profile provided within process chip (111, 200, 500, 710, 810, 910, 1010, 1110, 1210, 1310, 1410, 1510, 1710, 1810, 1910), and/or making other adjustments. Controller (121) may also account for hysteresis in fluid channels when making such adjustments.

In some versions, pressure data from a pressure sensing stage (700, 800, 1100, 1200, 1300, 1400, 1500) that is positioned upstream of a mixing stage (400) may be monitored to evaluate performance of that mixing stage (400). Such monitoring may be carried out while process chip (111, 200, 500, 710, 810, 910, 1010, 1110, 1210, 1310, 1410, 1510, 1710, 1810, 1910) is being used to prepare a therapeutic composition as described above; and/or during any other suitable stage(s) of operation. For instance, in some processes, some mixing stages (400) may tend to eventually accumulate matter on the inner sidewalls of mixing chambers (414, 420) and/or elsewhere within the interior of mixing stage (400). Such accumulation of matter within mixing stage (400) may eventually restrict the flow of fluid through mixing stage (400), which may ultimately have an adverse effect on the performance of mixing stage (400). When the accumulation of matter within mixing stage (400) restricts the flow of fluid through mixing stage (400), such restriction of flow may provide an increase in the fluid pressure upstream of that mixing stage (400). Thus, when a pressure sensing stage (700, 800, 1100, 1200, 1300, 1400, 1500) that is positioned upstream of a mixing stage (400) provides pressure data indicating an increase in fluid pressure, this pressure data may further indicate that matter has accumulated within that mixing stage (400).

In some scenarios, at least some accumulation of matter (and corresponding restriction of fluid flow and increase in fluid pressure) may be acceptable. However, there may be a threshold fluid pressure level such that it is undesirable to continue using a mixing stage (400) where the upstream fluid pressure has exceeded the threshold. When the threshold is exceeded, controller (121) may selectively activate valves or valve chambers within process chip (111, 200, 500, 710, 810, 910, 1010, 1110, 1210, 1310, 1410, 1510, 1710, 1810, 1910) to cease the flow of fluid through the mixing stage (400) that is providing the unacceptably high back-pressure. In some such scenarios, the fluid that would have otherwise been directed to this mixing stage (400) may instead be redirected to another mixing stage (400) on process chip (111, 200, 500, 710, 810, 910, 1010, 1110,

1210, 1310, 1410, 1510, 1710, 1810, 1910). Again, controller (121) may selectively activate valves or valve chambers within process chip (111, 200, 500, 710, 810, 910, 1010, 1110, 1210, 1310, 1410, 1510, 1710, 1810, 1910) to provide this redirection of fluid flow.

In the foregoing example, the pressure data from a pressure sensing stage (700, 800, 1100, 1200, 1300, 1400, 1500) that is positioned upstream of a mixing stage (400) is tracked against a threshold value, with controller (121) providing a response when the fluid pressure exceeds the threshold value. In addition to comparing the real-time fluid pressure value to a threshold value, or as an alternative to comparing the real-time fluid pressure value to a threshold value, controller (121) may compare pressure data from one or more pressure sensing stages (700, 800, 1100, 1200, 1300, 1400, 1500) to pressure data from one or more other pressure sensing stages (700, 800, 1100, 1200, 1300, 1400, 1500). For instance, a process chip (111, 200, 500, 710, 810, 910, 1010, 1110, 1210, 1310, 1410, 1510, 1710, 1810, 1910) may have several mixing stages (400), and each mixing stage (400) may have one or more upstream pressure sensing stages (700, 800, 1100, 1200, 1300, 1400, 1500). The pressure data from a pressure sensing stage (700, 800, 1100, 1200, 1300, 1400, 1500) upstream of one mixing stage (400) may be compared to pressure data from a pressure sensing stage (700, 800, 1100, 1200, 1300, 1400, 1500) upstream of another mixing stage (400). Controller (121) may provide a response (e.g., rerouting fluid flow, etc.) when the difference between the pressure values from these pressure sensing stages (700, 800, 1100, 1200, 1300, 1400, 1500) exceeds a threshold value.

As another example, in addition to comparing the real-time fluid pressure value to a threshold value, or as an alternative to comparing the real-time fluid pressure value to a threshold value, controller (121) may track the rate of change of a pressure value from a pressure sensing stage (700, 800, 1100, 1200, 1300, 1400, 1500). Controller (121) may provide a response (e.g., rerouting fluid flow, etc.) when the rate of change of the pressure value exceeds a threshold value.

During some processes where fluid flows through a process chip (111, 200, 500, 710, 810, 910, 1010, 1110, 1210, 1310, 1410, 1510, 1710, 1810, 1910), the fluid pressure in different regions of process chip (111, 200, 500, 710, 810, 910, 1010, 1110, 1210, 1310, 1410, 1510, 1710, 1810, 1910) may fluctuate in an expected fashion. For instance, the fluid pressure immediately upstream of a mixing stage (400) may expectedly increase when fluid is initially flowed through that mixing stage (400), may expectedly remain steady as fluid continues to flow through that mixing stage (400), and may then expectedly decrease when the fluid flow is reduced or stopped through that mixing stage (400). The fluid pressure may thus be expected to follow a predetermined profile of increasing, remaining steady, then reducing. The fluid pressure data from one or more pressure sensing stages (700, 800, 1100, 1200, 1300, 1400, 1500) upstream of mixing stage (400) may thus be monitored to determine whether the actual fluid pressure profile substantially follows the predetermined profile. In other words, fluid pressure data from one or more pressure sensing stages (700, 800, 1100, 1200, 1300, 1400, 1500) upstream of mixing stage (400) may be evaluated to determine whether the fluid pressure increases to the expected value (or range) within the expected time period, whether the fluid pressure remains steady (or within range) during the expected time period, and whether the fluid pressure decreases to the expected value (or range) within the expected time period. To the extent that there are any intolerable deviations from the predetermined fluid pressure profile, controller (121) may respond accordingly (e.g., by no longer routing fluid to an improperly performing mixing stage (400)).

While the above description provides several examples of how pressure data from pressure sensing stages (700, 800, 1100, 1200, 1300, 1400, 1500) may be used, system (100) may use such pressure data in any other suitable fashion. For instance, while the above description provides examples of how pressure sensing stages (700, 800, 1100, 1200, 1300, 1400, 1500) upstream of mixing stages (400) may be used, similar uses may be provided with pressure sensing stages (700, 800, 1100, 1200, 1300, 1400, 1500) upstream or downstream of any other kinds of working stages, ports (220, 240), or other features of process chip (111, 200, 500, 710, 810, 910, 1010, 1110, 1210, 1310, 1410, 1510, 1710, 1810, 1910) as described herein. As noted above, pressure sensing stages (700, 800, 1100, 1200, 1300, 1400, 1500) may also be used to measure ambient air pressure by referencing a fixed and know fluid pressure within process chip (111, 200, 500, 710, 810, 910, 1010, 1110, 1210, 1310, 1410, 1510, 1710, 1810, 1910). Still other kinds of uses of pressure data from pressure sensing stages (700, 800, 1100, 1200, 1300, 1400, 1500) are contemplated.

Regardless of what the pressure data is used for, pressure sensing stages (700, 800, 1100, 1200, 1300, 1400, 1500) may obtain the pressure data in different ways, as described below with reference to FIGS. 24-25. The pressure sensing processes shown in FIGS. 24-25 may be carried out using any of the process chips (111, 200, 500, 710, 810, 910, 1010, 1110, 1210, 1310, 1410, 1510, 1710, 1810, 1910) described herein. As will be described in greater detail below, the pressure sensing processes shown in FIGS. 24-25 may utilize image recognition and pattern matching techniques to ultimately yield fluid pressure measurements. As will also be described in greater detail below, the pressure sensing processes shown in FIGS. 24-25 may be executed while process chip (111, 200, 500, 710, 810, 910, 1010, 1110, 1210, 1310, 1410, 1510, 1710, 1810, 1910) is being used to prepare a therapeutic composition as described above. In addition, or in the alternative, the pressure sensing processes shown in FIGS. 24-25 may be executed while process chip (111, 200, 500, 710, 810, 910, 1010, 1110, 1210, 1310, 1410, 1510, 1710, 1810, 1910) is being used in any other kind of process, including but not limited to a fault detection routine upon initialization of system (100) and/or any other kind of non-calibration process that follows a calibration process like the process described above with reference to FIGS. 22-23.

Figure 24:
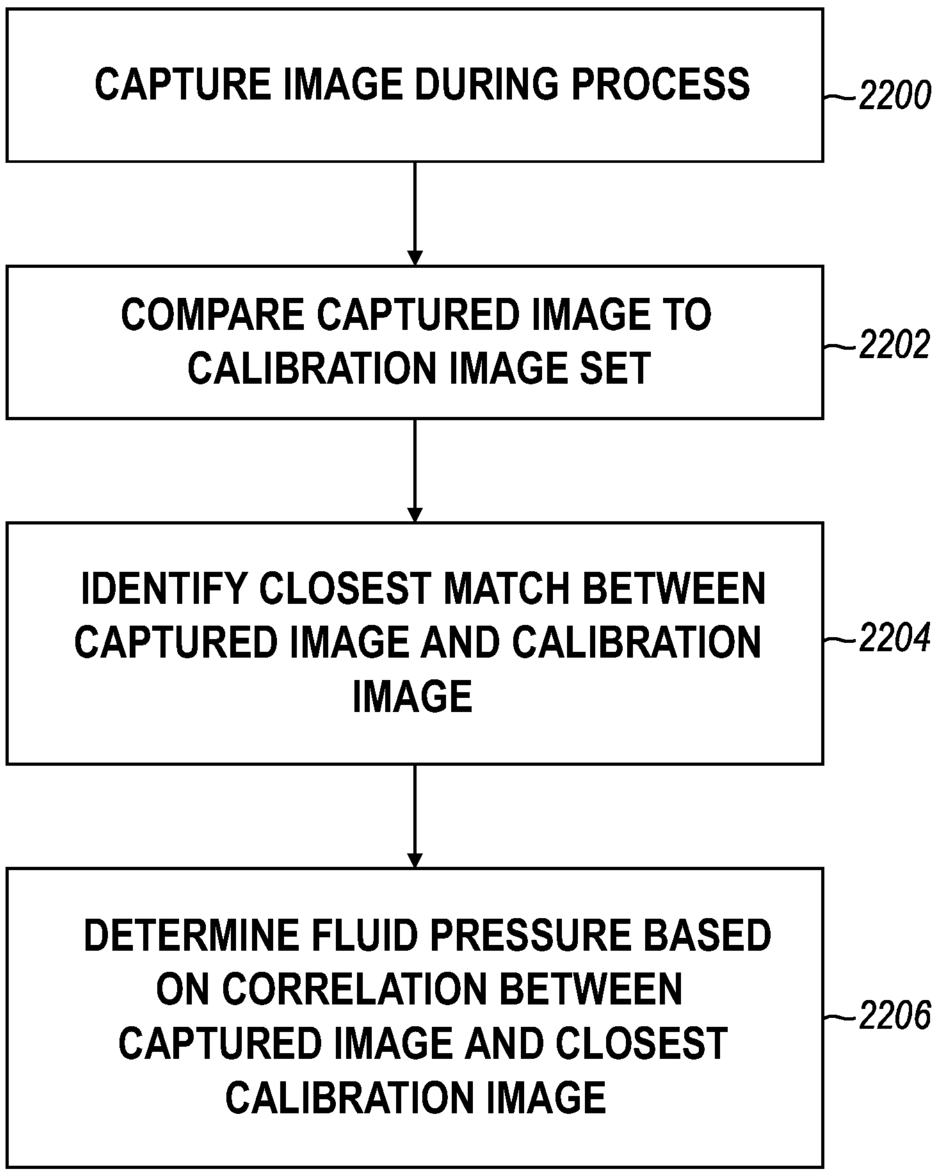
FIG. 24 depicts a flow chart showing an example of a pressure sensing algorithm that may be used with any of the pressure sensing stages described herein.

As shown in block (2200) of FIG. 24, a pressure sensing process may begin with camera (702) or cameras (702, 706) capturing an image of optical feature (760, 860, 960, 1060, 1260, 1360, 1460, 1470, 1560, 1760, 1860, 1960) while process chip (111, 200, 500, 710, 810, 910, 1010, 1110, 1210, 1310, 1410, 1510, 1710, 1810, 1910) is being used to prepare a therapeutic composition (or is otherwise being used in a non-calibration process). Next, as shown in block (2202), this in-process captured image (or "ad hoc image") is compared to images in the image set that was previously collected during the calibration process (or "calibration images") as described above with reference to FIGS. 22-23. In some versions, image subtraction or pixel subtraction is used to compare images. Thus, each comparison of two images may yield a numerical value as an output from an image subtraction or pixel subtraction routine, such that each image comparison has an associated image subtraction or pixel subtraction yield value.

Controller (121) (and/or some other component(s) of system (100)) then identifies the closest match between the ad hoc images and one or more calibration images, as shown in block (2204). For instance, in versions where image subtraction or pixel subtraction is used to compare images, the "closest match" may be identified based on the image comparison that yielded the lowest image subtraction or pixel subtraction yield value. Controller (121) (and/or some other component(s) of system (100)) then determines the fluid pressure value(s) associated with the one or more calibration images that represent(s) the closest match with the ad hoc image; and thereby determines the fluid pressure value associated with the ad hoc image, as shown in block (2206). In other words, an ad hoc image is compared to a previously captured calibration image, with the closest-match calibration image providing a fluid pressure value corresponding to the fluid pressure at hand.

In comparing an ad hoc image with a previously captured calibration image (block (2202)), controller (121) (and/or some other component(s) of system (100)) may perform image processing to evaluate which images show the same level of deformation of optical feature (760, 860, 960, 1060, 1260, 1360, 1460, 1470, 1560, 1760, 1860, 1960). The closest match between images (block (2204)) may thus represent a condition where the level of deformation of optical feature (760, 860, 960, 1060, 1260, 1360, 1460, 1470, 1560, 1760, 1860, 1960) in the calibration image is substantially identical to the level of deformation of optical feature (760, 860, 960, 1060, 1260, 1360, 1460, 1470, 1560, 1760, 1860, 1960) in the ad hoc image.

During the comparison and matching steps represented by blocks (2202, 2204), there may be instances where there is no exact match between the ad hoc image and any of the previously captured calibration images. In such instances, controller (121) (and/or some other component(s) of system (100)) may nevertheless find the closest match between the ad hoc image and two of the previously captured calibration images, and then interpolate the fluid pressure at hand based on the fluid pressures associated with the closest two previously captured calibration images. In other words, if controller (121) (and/or some other component(s) of system (100)) finds that the ad hoc image falls somewhere between a first calibration image associated with a fluid pressure of 0.5 psi and a second calibration image associated with 0.7 psi, controller (121) (and/or some other component(s) of system (100)) may determine that the fluid pressure at hand is 0.6 psi.

The above-described pressure sensing process shown in FIG. 24 may be executed reiteratively, to repeatedly determine fluid pressure throughout the process where process chip (111, 200, 500, 710, 810, 910, 1010, 1110, 1210, 1310, 1410, 1510, 1710, 1810, 1910) is being used to prepare a therapeutic composition (or is otherwise being used in a non-calibration process). In other words, the pressure sensing process shown in FIG. 24 may be executed continuously throughout the process where process chip (111, 200, 500, 710, 810, 910, 1010, 1110, 1210, 1310, 1410, 1510, 1710, 1810, 1910) is being used to prepare a therapeutic composition (or is otherwise being used in a non-calibration process). Controller (121) (and/or some other component(s) of system (100)) may thus compare a series of ad hoc images to calibration images to continuously monitor real-time fluid pressure within process chip (111, 200, 500, 710, 810, 910, 1010, 1110, 1210, 1310, 1410, 1510, 1710, 1810, 1910).

As noted above, some versions of a calibration process may include a comparison between each calibration image and the initial/baseline image, with the differences between each calibration image and the initial/baseline image being stored in connection with the known fluid pressure value associated with each such calibration image. For instance, the differences or deviations between each calibration image and the initial/baseline image may be stored as a numerical value or set of numerical values. Such numerical values may represent a degree to which optical feature (760, 860, 960, 1060, 1260, 1360, 1460, 1470, 1560, 1760, 1860, 1960) is deformed in each calibration image relative to the non-deformed state of optical feature (760, 860, 960, 1060, 1260, 1360, 1460, 1470, 1560, 1760, 1860, 1960) in the initial/baseline image. In some versions, the image differences or deviations represent the deformation of optical feature (760, 860, 960, 1060, 1260, 1360, 1460, 1470, 1560, 1760, 1860, 1960) along a lateral dimension in the calibration image, as compared to the initial/baseline image that may lack any lateral deformation of optical feature (760, 860, 960, 1060, 1260, 1360, 1460, 1470, 1560, 1760, 1860, 1960). In addition, or in the alternative, the image differences or deviations may represent an image subtraction or pixel subtraction yield value resulting from a comparison between the calibration image and the initial/baseline image in an image subtraction or pixel subtraction process. Regardless of the form taken by image differences or deviations, the pressure-sensing process of FIG. 25 may be executed in scenarios where image differences or deviations are stored as part of the calibration process.

Figure 25:
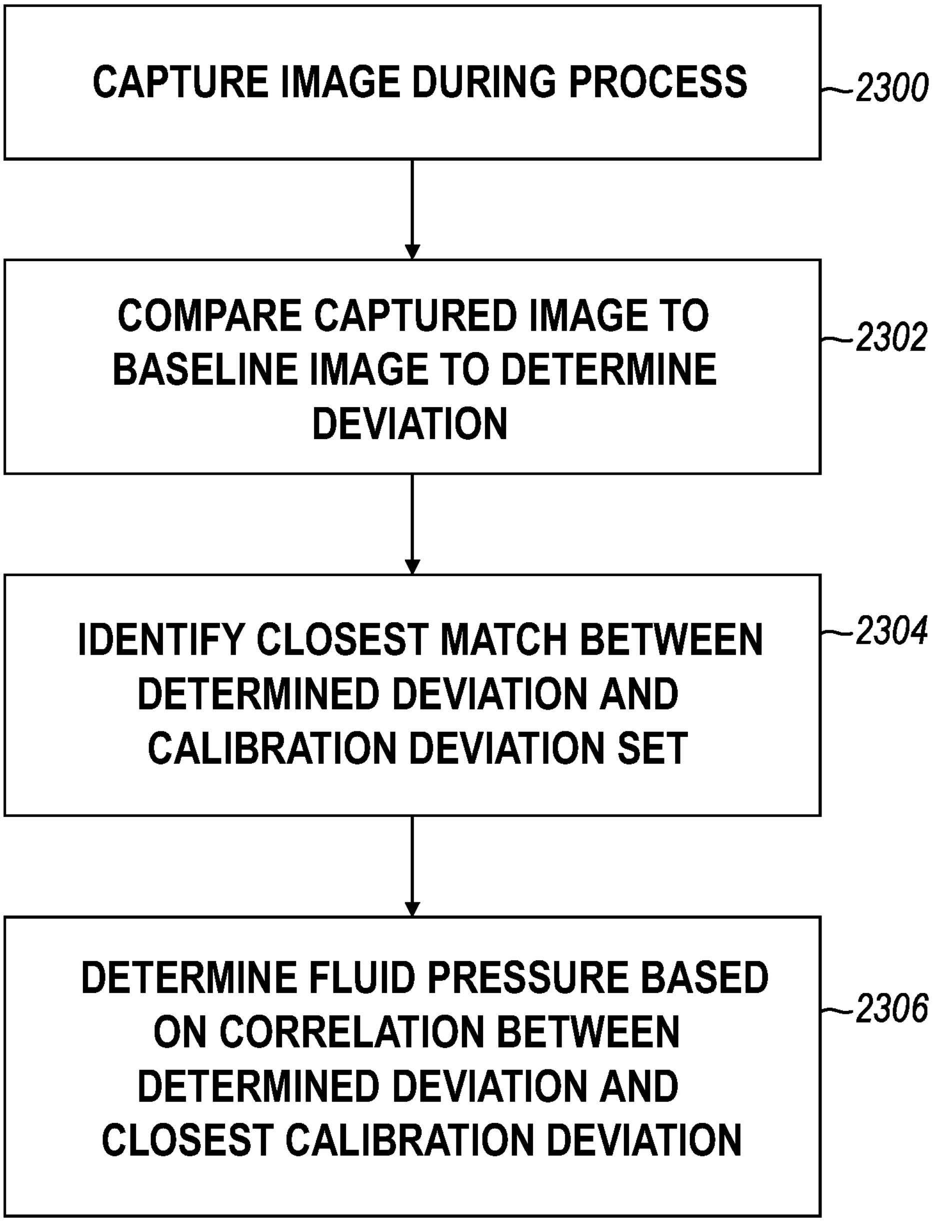
FIG. 25 depicts a flow chart showing an example of another pressure sensing algorithm that may be used with any of the pressure sensing stages described herein.

Similar to the above-described process of FIG. 24, and as shown in block (2300), the process of FIG. 25 begins with camera (702) or cameras (702, 706) capturing an image of optical feature (760, 860, 960, 1060, 1260, 1360, 1460, 1470, 1560, 1760, 1860, 1960) while process chip (111, 200, 500, 710, 810, 910, 1010, 1110, 1210, 1310, 1410, 1510, 1710, 1810, 1910) is being used to prepare a therapeutic composition (or is otherwise being used in a non-calibration process). Next, as shown in block (2302), this in-process captured image (or "ad hoc image") is compared to the initial/baseline image, which was previously collected during the calibration process as described above with reference to FIGS. 22-23, to determine a deviation. To determine this deviation (block (2302)), controller (121) (and/or some other component(s) of system (100)) may perform image processing to determine the degree to which optical feature (760, 860, 960, 1060, 1260, 1360, 1460, 1470, 1560, 1760, 1860, 1960) is deformed in the ad hoc image relative to the non-deformed state of optical feature (760, 860, 960, 1060, 1260, 1360, 1460, 1470, 1560, 1760, 1860, 1960) in the initial/baseline image. As noted above, this deviation between images may represent the deformation of optical feature (760, 860, 960, 1060, 1260, 1360, 1460, 1470, 1560, 1760, 1860, 1960) along a lateral dimension in the ad hoc image, as compared to the initial/baseline image that may lack any lateral deformation of optical feature (760, 860, 960, 1060, 1260, 1360, 1460, 1470, 1560, 1760, 1860, 1960). In addition, or in the alternative, the deviation between images may represent an image subtraction or pixel subtraction yield value resulting from a comparison between the ad hoc image and the initial/baseline image in an image subtraction or pixel subtraction process.

Next, as shown in block (2304) the determined deviation between the ad hoc image and the initial/baseline image may be compared to the deviations that were stored as part of the calibration process (or "calibration deviations") to identify the closest match between the deviation at hand (or "ad hoc deviation") and one or more calibration deviations. In some versions, this means that the deviation comparison (block (2304)) will compare an optical feature (760, 860, 960,

1060, 1260, 1360, 1460, 1470, 1560, 1760, 1860, 1960) lateral deformation value from the ad hoc image with lateral deformation values from the calibration images to find the closest match. In addition, or in the alternative, the closest match between the ad hoc deviation and one or more calibration deviations may be found by finding a calibration image subtraction or pixel subtraction yield value, resulting from a comparison between the calibration image and the initial/baseline image, providing the closest match with the ad hoc image subtraction or pixel subtraction yield value, resulting from a comparison between the ad hoc image and the initial/baseline image.

Once the closest deviation match has been found, controller (121) (and/or some other component(s) of system (100)) then determines the fluid pressure value(s) associated with the one or more calibration deviations that represent(s) the closest match with the ad hoc deviation; and thereby determines the fluid pressure value associated with the ad hoc deviation, as shown in block (2306). In other words, an ad hoc deviation is compared to a previously determined calibration deviation, with the closest-match calibration deviation providing a fluid pressure value corresponding to the fluid pressure at hand.

During the comparison and matching steps represented by blocks (2302, 2304), there may be instances where there is no exact match between the ad hoc deviation and any of the previously determined calibration deviations. In such instances, controller (121) (and/or some other component(s) of system (100)) may nevertheless find the closest match between the ad hoc deviation and two of the previously determined calibration deviations, and then interpolate the fluid pressure at hand based on the fluid pressures associated with the closest two previously determined calibration deviations. In other words, if controller (121) (and/or some other component(s) of system (100)) finds that the ad hoc deviation falls somewhere between a first calibration deviation associated with a fluid pressure of 0.5 psi and a second calibration deviation associated with 0.7 psi, controller (121) (and/or some other component(s) of system (100)) may determine that the fluid pressure at hand is 0.6 psi.

The above-described pressure sensing process shown in FIG. 25 may be executed reiteratively, to repeatedly determine fluid pressure throughout the process where process chip (111, 200, 500, 710, 810, 910, 1010, 1110, 1210, 1310, 1410, 1510, 1710, 1810, 1910) is being used to prepare a therapeutic composition (or is otherwise being used in a non-calibration process). In other words, the pressure sensing process shown in FIG. 25 may be executed continuously throughout the process where process chip (111, 200, 500, 710, 810, 910, 1010, 1110, 1210, 1310, 1410, 1510, 1710, 1810, 1910) is being used to prepare a therapeutic composition (or is otherwise being used in a non-calibration process). Controller (121) (and/or some other component(s) of system (100)) may thus compare a series of ad hoc image deviations to calibration image deviations to continuously monitor real-time fluid pressure within process chip (111, 200, 500, 710, 810, 910, 1010, 1110, 1210, 1310, 1410, 1510, 1710, 1810, 1910).

In some versions, a process chip (111, 200, 500, 710, 810, 910, 1010, 1110, 1210, 1310, 1410, 1510, 1710, 1810, 1910) may be utilized in several processes to prepare a therapeutic composition (or other non-calibration processes). In some such scenarios, the same process chip (111, 200, 500, 710, 810, 910, 1010, 1110, 1210, 1310, 1410, 1510, 1710, 1810, 1910) is utilized in several iterations of the same process to prepare a therapeutic composition (or other non-calibration processes). In some other scenarios, the same process chip (111, 200, 500, 710, 810, 910, 1010, 1110, 1210, 1310, 1410, 1510, 1710, 1810, 1910) is utilized in several different processes to prepare several different therapeutic compositions. In either such scenario, either or both of the pressure sensing processes described above with reference to FIGS. 24-25 while process chip (111, 200, 500, 710, 810, 910, 1010, 1110, 1210, 1310, 1410, 1510, 1710, 1810, 1910) is being utilized in the processes to prepare one or more therapeutic compositions (or other non-calibration processes). Moreover, these processes to prepare one or more therapeutic compositions (or other non-calibration processes) may be carried out after only one single calibration process (e.g., as described above with reference to FIGS. 22-23) has been carried out. Alternatively, a calibration process (e.g., as described above with reference to FIGS. 22-23) may be carried out between each instance/iteration of a process to prepare a therapeutic composition (or other non-calibration process). Such re-calibration between non-calibration processes or reiterations of non-calibration processes is optional; and may be employed to account for changes in ambient lighting conditions and/or other conditions that might have changed since the initial calibration process was carried out.

Regardless of whether the pressure sensing process of FIG. 24 and/or the pressure sensing process of FIG. 25 is used, it should be understood that either or both of such pressure sensing processes may further provide machine learning. For instance, the more times either or both of the pressure sensing process(es) is/are used, controller (121) may update its algorithms to provide enhanced efficiency and accuracy in subsequent executions of the pressure sensing process(es).

IV. Examples of Density Sensing in Process Chip

In addition to monitoring fluid pressure levels within system (100), it may be desirable to monitor the density of one or more fluids within system (100). For instance, this may be desirable to determine whether a fluid has the appropriate composition (e.g., a desired amount of ethanol, etc.), as the density of the fluid may vary based on the composition of the fluid. As another example, it may be desirable to check a fluid density level to confirm whether a dilution process, concentration process, and/or other process was executed successfully through system (100). Fluid density measurements may also be useful in scenarios where mass is used to determine the amounts of reagents or other components that are to be used in forming a composition through system (100). It may therefore be desirable to integrate one or more density sensing stages in process chip (111, 200, 500). It may be further desirable to provide such density sensing without the density sensing contaminating or otherwise affecting the properties of the fluid being communicated through process chip (111, 200, 500), without adversely affecting the flow of fluid through process chip (111, 200, 500), without substantially increasing the spatial footprint within system (100), and/or without altering thermal properties of system (100). Examples of how such density sensing stages may be configured, how such density sensing stages may be integrated into process chip (111, 200, 500), and how density data from such density sensing stages may be used will be described in greater detail below.

FIGS. 19A-20B show an example of a density sensing stage (1600) that may be integrated into any of the various process chips (111, 200, 500, 710, 810, 910, 1010, 1110, 1210, 1310, 1410, 1510, 1710, 1810, 1910) described herein. As shown in FIGS. 26A-26D, density sensing stage (1600) may be positioned in parallel with a flow channel (1602), which as an inlet (1604) and an outlet (1606). To accomplish this arrangement, a first junction (1608) couples flow channel (1602) with an inlet channel (1630) of density sensing stage (1650), while a second junction (1610) couples on outlet channel (1640) of density sensing stage (1650) with flow channel (1602). Flow channel (1602) and density sensing stage (1600) may be positioned at any suitable location along any desired flow path on process chip (111, 200, 500, 710, 810, 910, 1010, 1110, 1210, 1310, 1410, 1510, 1710, 1810, 1910). For instance, flow channel (1602) and density sensing stage (1600) may be positioned after a filtration stage, at a region of a fluid path where a fluid first enters process chip (111, 200, 500, 710, 810, 910, 1010, 1110, 1210, 1310, 1410, 1510, 1710, 1810, 1910), and/or at a region of a fluid path right before the fluid exits process chip (111, 200, 500, 710, 810, 910, 1010, 1110, 1210, 1310, 1410, 1510, 1710, 1810, 1910). Alternatively, flow channel (1602) and density sensing stage (1600) may be positioned at any other suitable location on process chip (111, 200, 500, 710, 810, 910, 1010, 1110, 1210, 1310, 1410, 1510, 1710, 1810, 1910). Some process chips (111, 200, 500, 710, 810, 910, 1010, 1110, 1210, 1310, 1410, 1510, 1710, 1810, 1910) may include two or more density sensing stages (1600).

Density sensing stage (1600) of this example further includes a density sensing chamber (1650). As described in greater detail below, density sensing chamber (1650) may be filled with fluid via inlet channel (1630), such that inlet channel (1630) serves as an input port to density sensing chamber (1650). When density sensing chamber (1650) is filled with fluid, density sensing stage (1600) may be used to sense the density of the fluid in density sensing chamber (1650). Fluid may be evacuated from density sensing chamber (1650) via outlet channel (1640), such that outlet channel (1640) serves as an output port from density sensing chamber (1650).

As shown in FIGS. 26A-26D, a set of valves (1620, 1632, 1642) are used to control the flow of fluid through density sensing stage (1600). Valve (1620) is positioned along flow channel (1602), just downstream of junction (1608). Valve (1632) is positioned at the entrance to inlet channel (1630) at junction (1608). Valve (1642) is positioned at the exit from outlet channel (1642) at junction (1610). Other suitable ways in which valves (1620, 1632, 1642) may be arranged will be apparent to those skilled in the art in view of the teachings herein. Valves (1620, 1632, 1642) of density sensing stage (1600) may be configured and operable like valve chambers (224, 262, 264, 324, 510, 512, 514) described above.

Figure 26A:
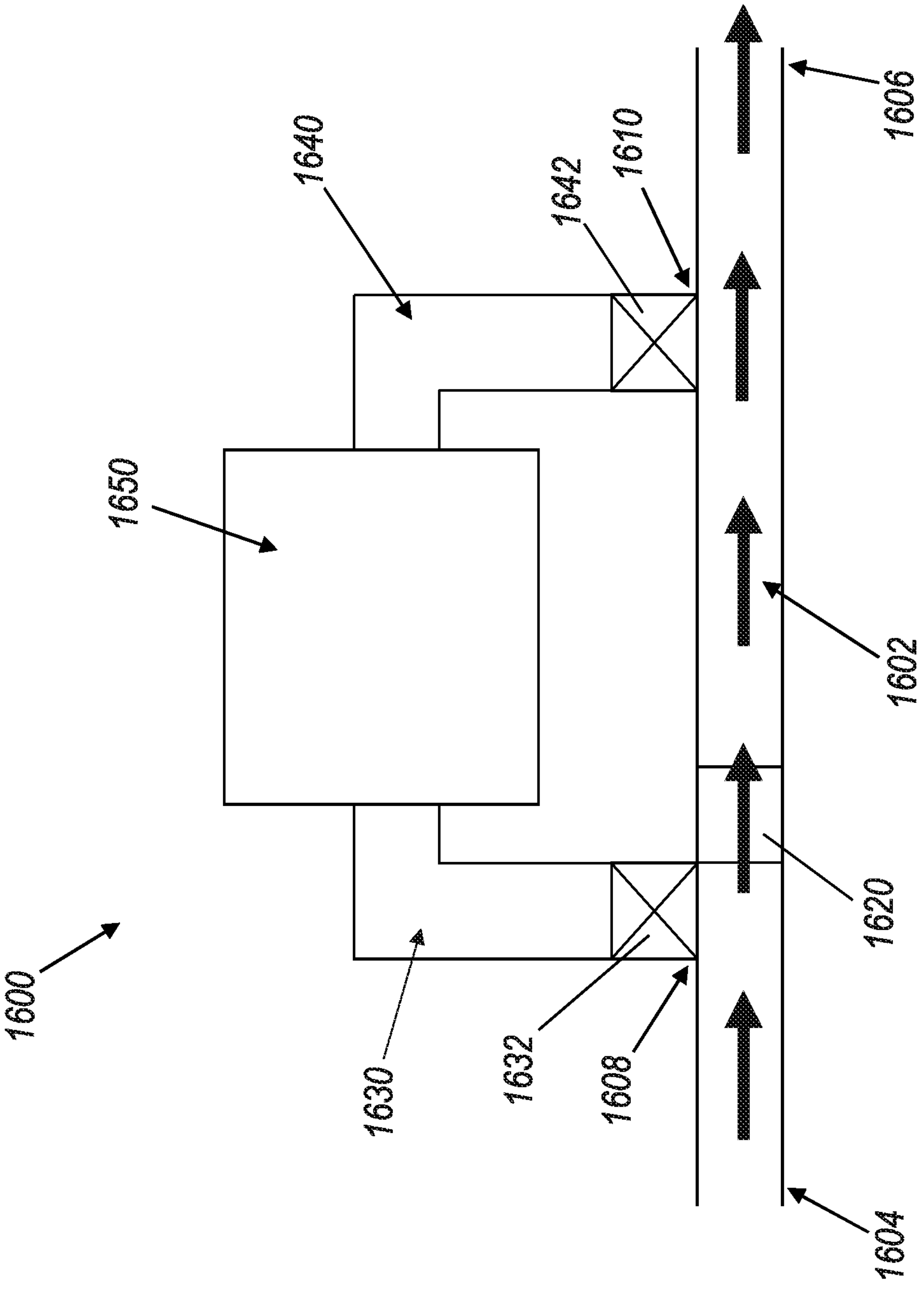
FIG. 26A depicts a schematic top plan view of an example of a density sensing stage that may be incorporated into the process chip of FIG. 3, with fluid flowing past the density sensing stage, and with the density sensing stage in a non-sensing state.

In the operational state shown in FIG. 26A, valve (1620) is in an open state while valves (1632, 1642) are each in a closed state. This arrangement allows fluid to flow freely through flow channel (1602); without any fluid flowing through or otherwise into inlet channel (1630), density sensing chamber (1650), or outlet channel (1640). Thus, in the state shown in FIG. 26A, density sensing stage (1600) may be considered idle. In some such scenarios, density sensing chamber (1650) lacks any fluid at all when density sensing chamber (1650) is idle, particularly if density sensing chamber (1650) has not yet been used to sense fluid density. In some other scenarios where density sensing chamber (1650) is idle before being used a first time to sense fluid density, density sensing chamber (1650) may include at least some fluid. In some such scenarios, density sensing chamber (1650) may initially contain a calibration fluid with a known density. In such scenarios, system (100) may perform a calibration routine by sensing deformation of an elastic layer (1674) by a bead (1652) floating in the calibration fluid in density sensing chamber (1650). As described below, such deformation may be based on the density of the fluid in density sensing chamber (1650). After the calibration is complete, the calibration fluid may be expelled from density sensing chamber (1650) before another fluid is introduced into density sensing chamber (1650) for sensing the density of that introduced fluid.

Figure 26B:
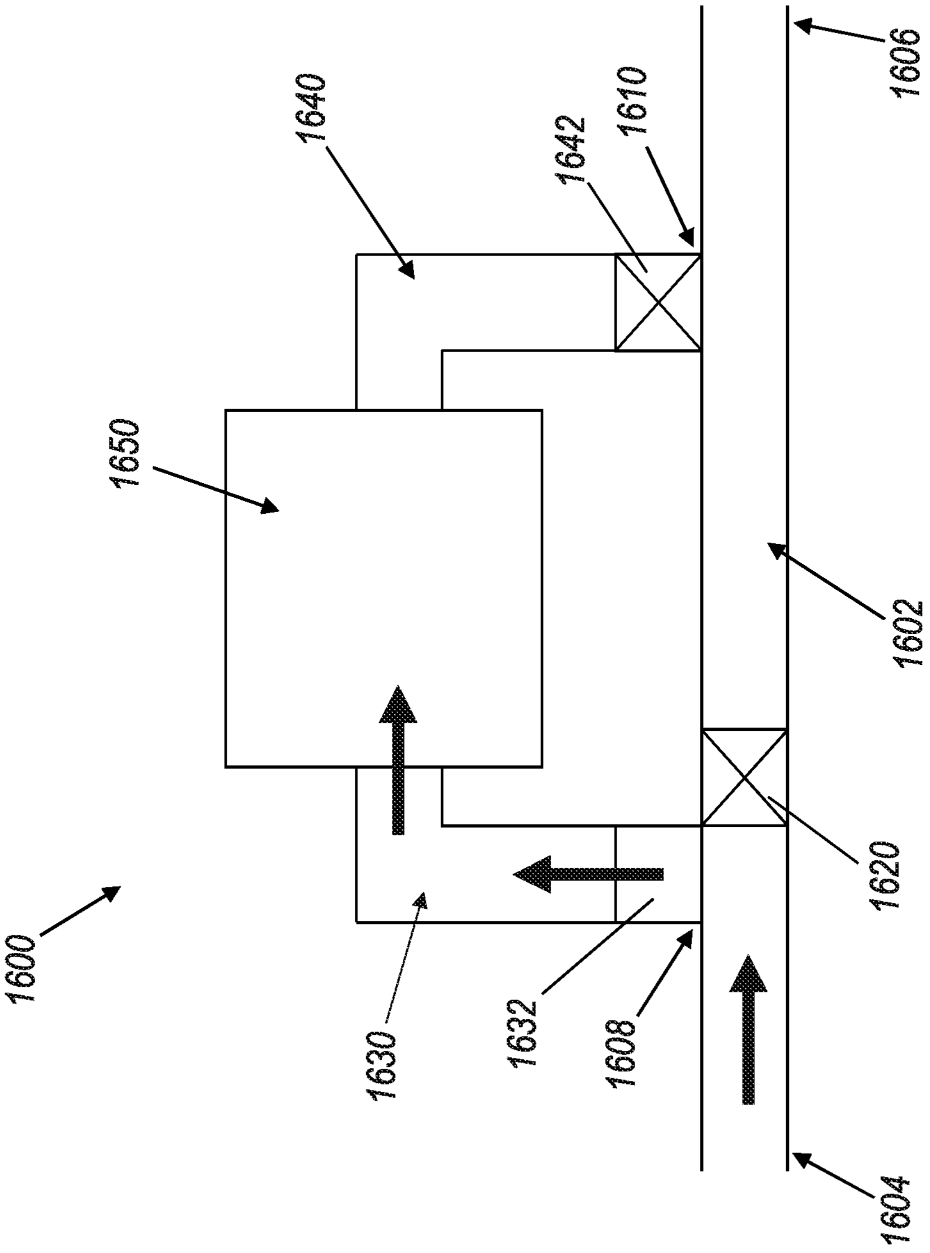
FIG. 26B depicts a schematic top plan view of the density sensing stage of FIG. 26A, with fluid being diverted into the density sensing stage.

In order to initiate a fluid density sensing routine, system (100) may transition to the operational state shown in FIG. 26B. In this operational state, valve (1620) is transitioned to a closed state while valve (1632) is transitioned to an opened state. Valve (1642) remains in a closed state. This arrangement allows fluid to be diverted from flow channel (1602) into density sensing chamber (1650), such that density sensing chamber (1650) fills with the fluid. In some versions where density sensing chamber (1650) was previously occupied by a fluid, valve (1642) may be briefly opened to allow such fluid to exit density sensing chamber (1650); with valve (1642) being subsequently closed to allow the fluid from inlet channel (1630) to accumulate in density sensing chamber (1650). Some versions of density sensing stage (1600) may also include a ventilation or air evacuation feature, similar to vacuum caps (530, 532, 534, 536) described above, to allow any gas to exit density sensing chamber (1650) as fluid from inlet channel (1630) accumulates in density sensing chamber (1650).

Figure 26C:
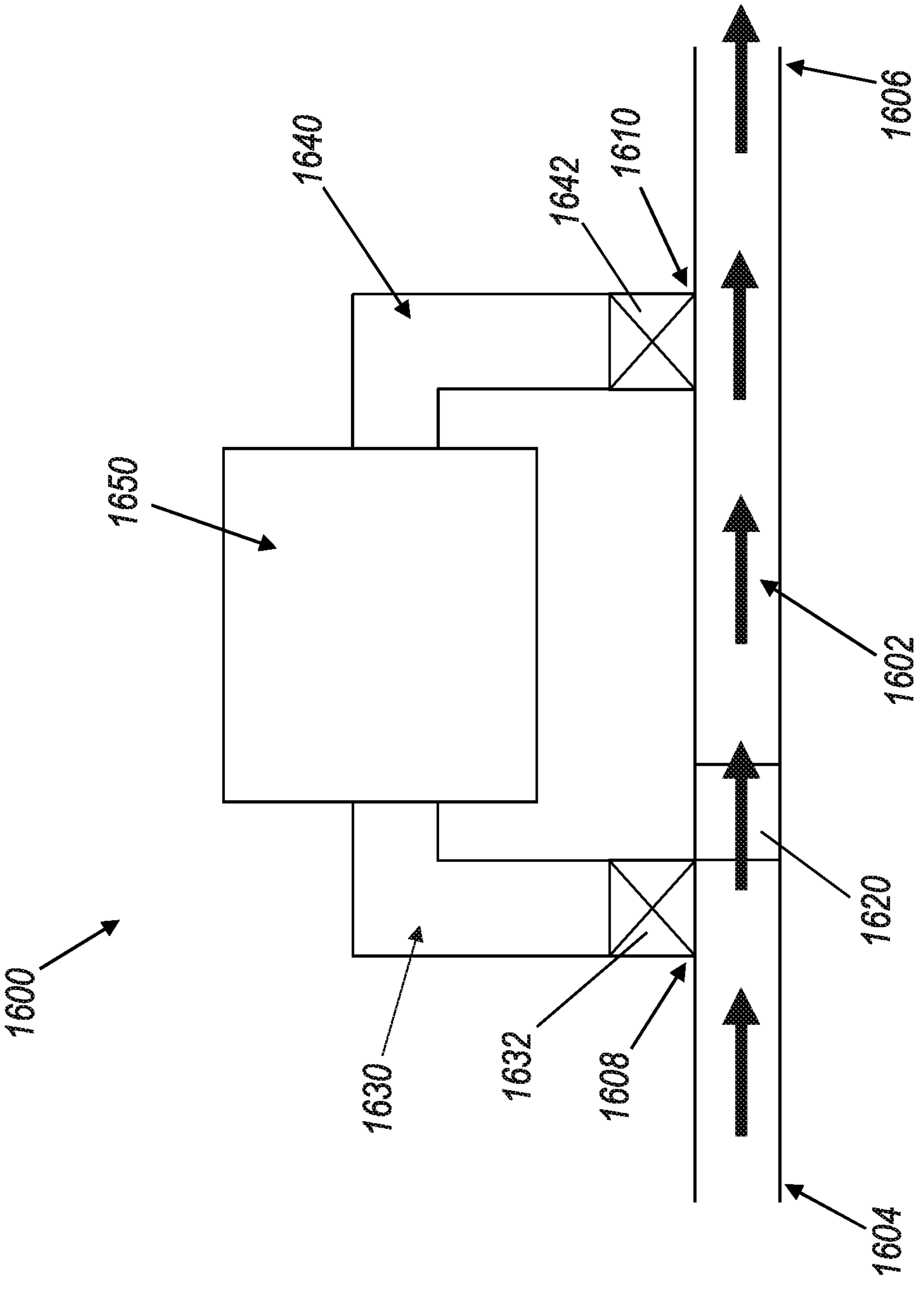
FIG. 26C depicts a schematic top plan view of the density sensing stage of FIG. 26A, with fluid flowing past the density sensing stage, and with the density sensing stage in a sensing state.

Once fluid from inlet channel (1630) has sufficiently accumulated in density sensing chamber (1650), valve (1632) may be transitioned back to the closed state and valve (1620) may be transitioned back to the open state, resulting in the arrangement shown in FIG. 26C. This may allow fluid to remain in density sensing chamber (1650) in a non-flowing state; while allowing fluid to continue flowing through flow channel (1602) if desired. With fluid captured in density sensing chamber (150), density sensing stage (1600) may be used to sense the density of the fluid in density sensing chamber (1650), as described in greater detail below with reference to FIGS. 27A-27B. In some scenarios, fluid continues to flow through flow channel (1602) while density sensing stage (1600) measures the density of the fluid in density sensing chamber (1650) and other processes are simultaneously carried out on the process chip. In some other scenarios, one or more processes are at least temporarily halted on process chip while density sensing stage (1600) measures the density of the fluid in density sensing chamber (1650), with such processes continuing using at least the outcome of the density measurement.

Figure 26D:
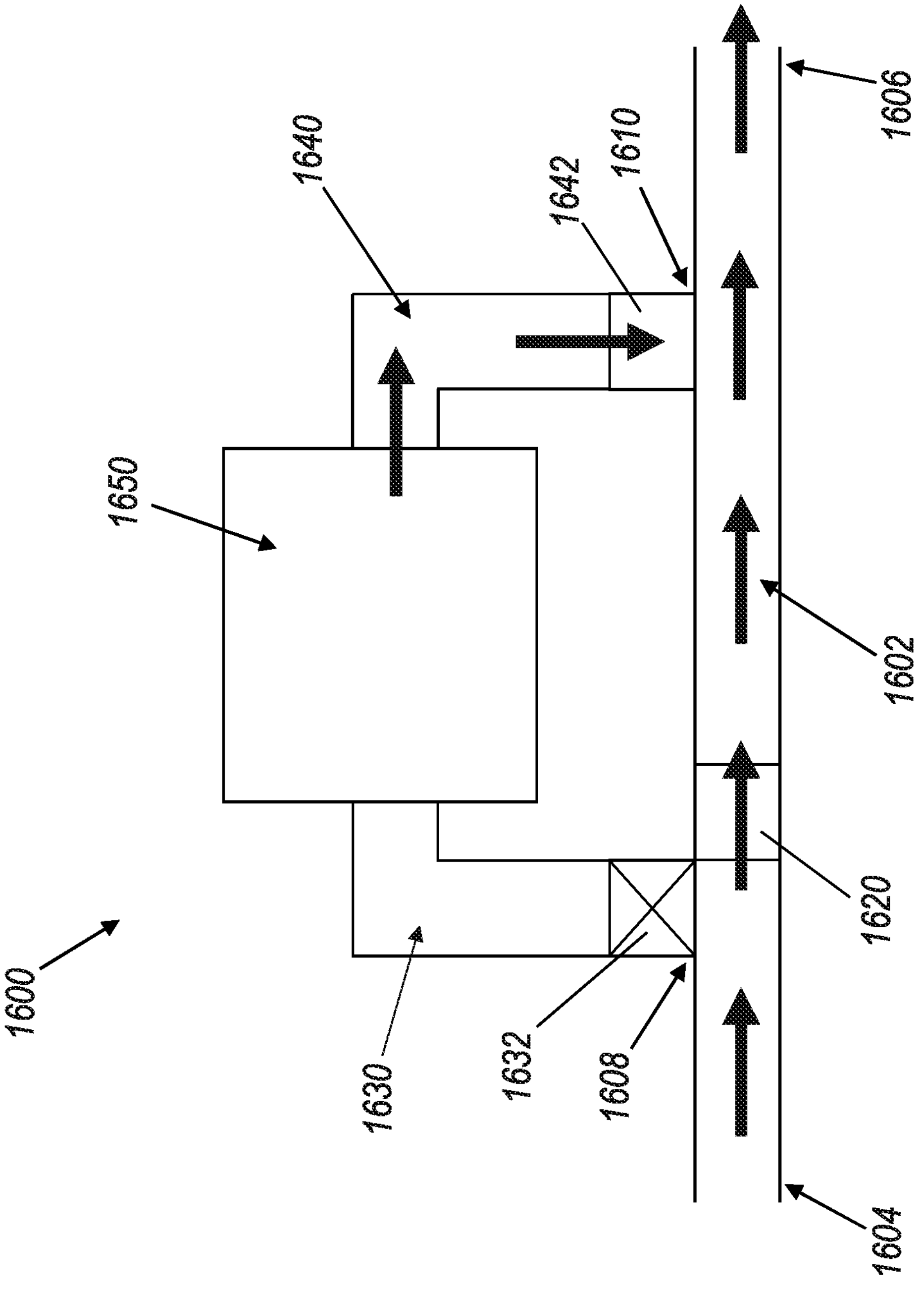
FIG. 26D depicts a schematic top plan view of the density sensing stage of FIG. 26A, with fluid being expelled from the density sensing stage.

Once the density of the fluid captured in density sensing chamber (1650) has been measured, it may be desirable to expel the fluid from density sensing chamber (1650). To that end, valve (1642) may be transitioned to an open state, thereby allowing the fluid to exit into flow channel (1602) via outlet channel (1640) and junction (1610) as shown in FIG. 26D. Once the fluid has been expelled, valve (1642) may be transitioned back to the closed state. While fluid from density sensing chamber (1650) exits back into flow channel (1602) via outlet channel (1640) and junction (1610) in the example shown in FIG. 26D, the fluid from density sensing chamber (1650) may be routed in any other suitable fashion. For instance, some variations may have outlet channel (1640) empty fluid from density sensing chamber (1650) into a dedicated waste path or other fluid path instead of directing the fluid back into flow channel (1602). As another example, some variations of density sensing stage (1600) may provide a dead end at density sensing chamber (1650), such that the fluid is not expelled from density sensing chamber (1650) after the density of the fluid in density sensing chamber (1650) has been measured. As yet another example, fluid may be expelled from density sensing chamber (1650) back through inlet channel (1630). Regardless of how the fluid from density sensing chamber (1650) is handled after the density is measured, the fluid flow depicted in FIGS. 26A-26D may be achieved through the peristaltic action described herein or in any other suitable fashion.

In some scenarios, density sensing stage (1600) is used only once to measure density, such that the process depicted in FIGS. 26A-26D is only carried out once. In some other scenarios, fluid is cycled through density sensing stage (1600) two or more times, such that the process depicted in FIGS. 26A-26D is reiterated. Such reiteration may be desired when density feedback from density sensing stage (1600) is used to make real-time adjustments to the composition of fluid flowing through the process chip, such that density sensing stage (1600) may be used to check the sufficiency of the real-time adjustments. Other scenarios in which fluid may be cycled through density sensing stage (1600) more than once may be where different kinds of fluids are cycled through density sensing stage (1600); or where fluid is cycled through density sensing stage (1600) at different times during a larger process on the process chip. As another example, density sensing stage (1600) may include several separate inlet channels (1630) that are coupled with several corresponding separate working stages on the process chip, such that the same density sensing stage (1600) may be used to measure fluid density downstream of different working stages.

Figure 27A:
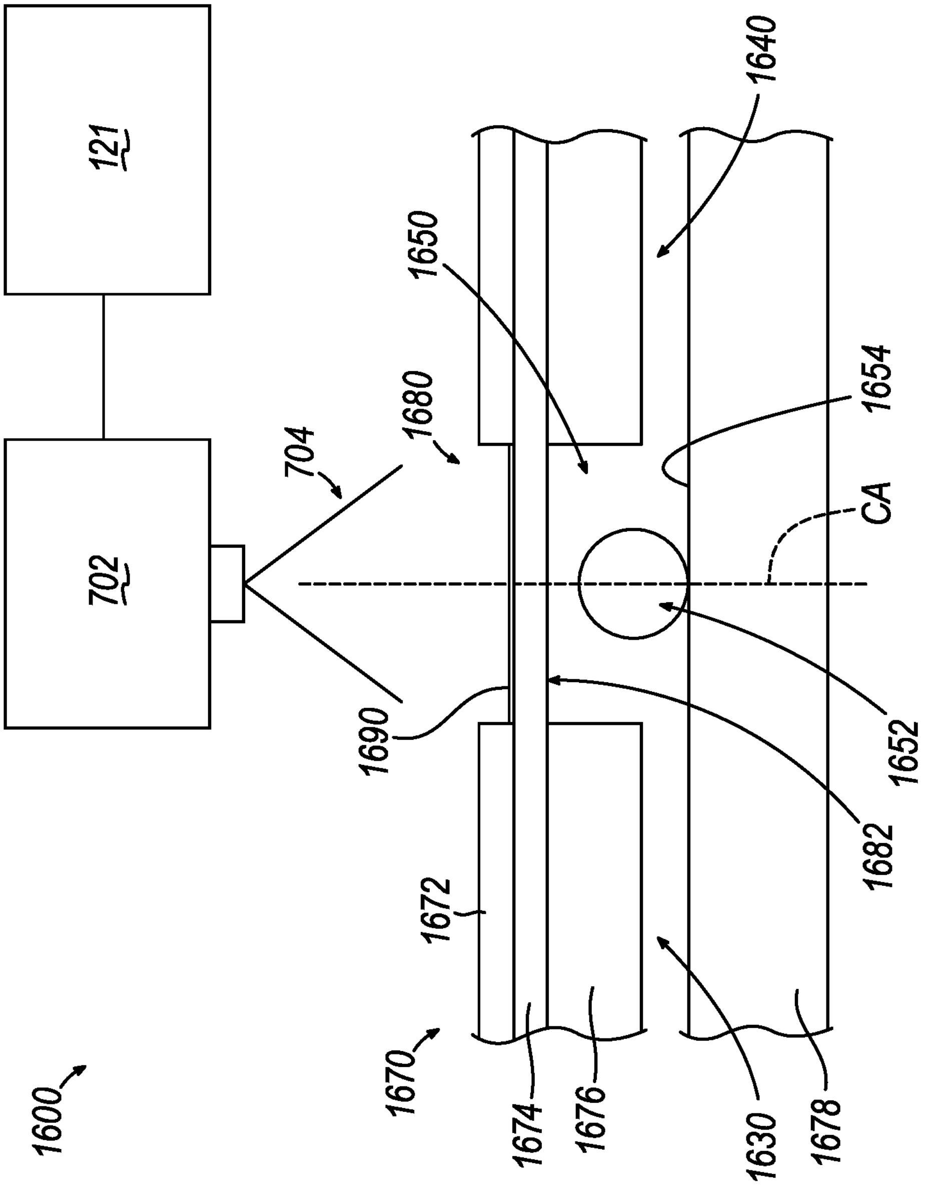
FIG. 27A depicts a schematic cross-sectional view of the density sensing stage of FIG. 26A, with the density sensing stage in a non-sensing state.
Figure 27B:
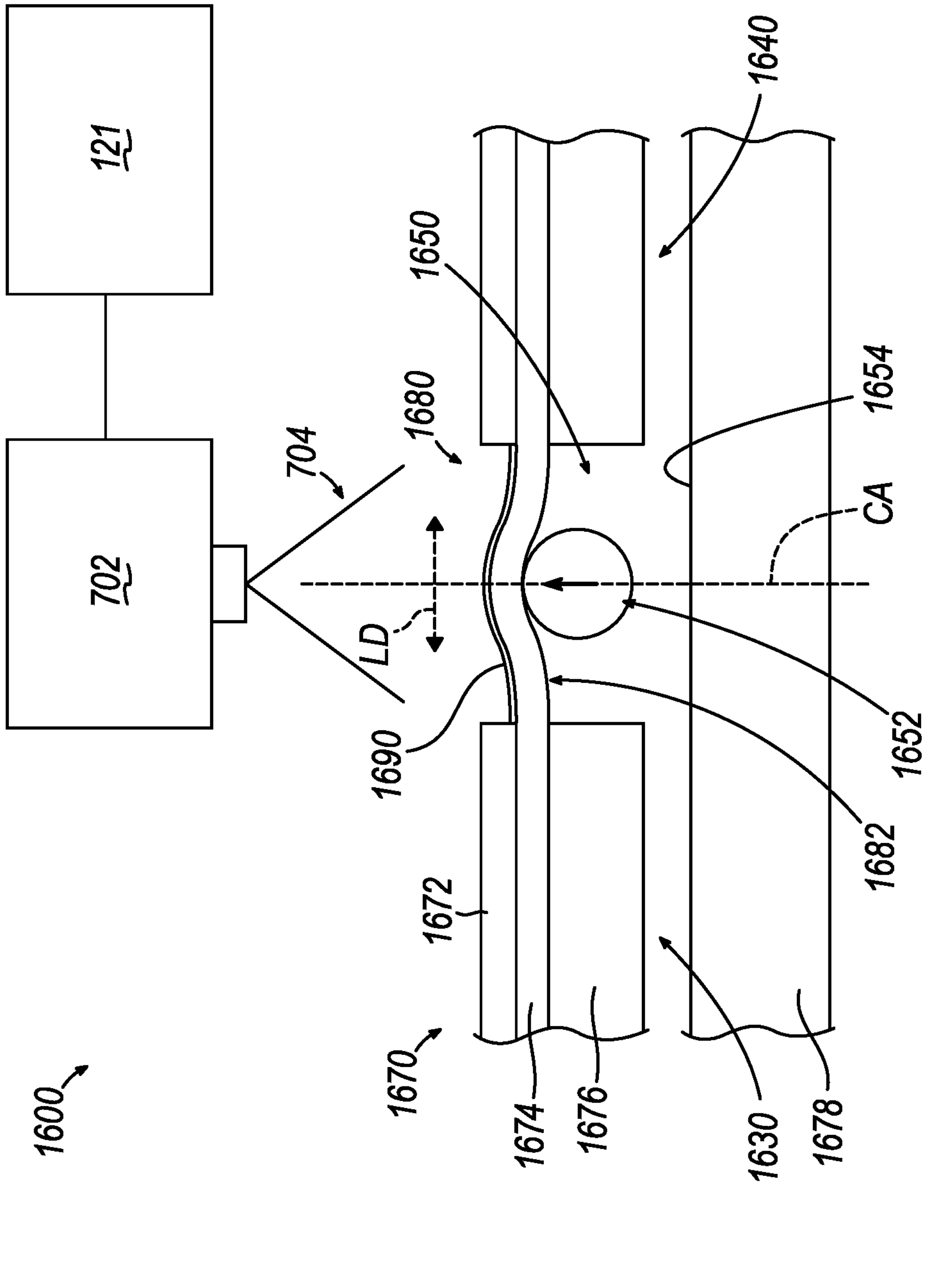
FIG. 27B depicts a schematic cross-sectional view of the density sensing stage of FIG. 26A, with the density sensing stage in a sensing state.

FIGS. 27A-27B show further details of how density sensing stage (1600) may be configured. While FIGS. 26A-26D depict example top plan views of density sensing stage (1600), FIGS. 27A-27B depict a side cross-sectional view of an example density sensing stage (1600). In this example, density sensing stage (1600) includes a portion of a process chip (1670), a camera (702), and a controller (121). In addition to including the features and functionality described below, process chip (1670) may include any of the other features and functionalities described above in the context of process chips (111, 200, 500). In other words, the following teachings relating to density sensing stage (1600) may be readily applied to any of the various process chips (111, 200, 500) described herein.

Camera (702) of the present example is positioned to provide a field of view (704) in which camera (702) may capture images of an optical feature (1690) of process chip (1670). While camera (702) is shown in FIGS. 27A-27B as being positioned directly over optical feature (1690), camera (702) may instead be positioned at any other suitable locations. In versions where optical feature (1690) is not directly within the field of view (704) of camera (702), one or more mirrors may be positioned to provide a reflection of optical feature (1690), with the reflection being within the field of view (704) of camera (702). In some versions, camera (702) may be regarded as one of sensors (105) of system (100) as described above. Similarly, camera (702) may also be used as part of any of the various pressure sensing stages (700, 800, 1100, 1200, 1300, 1400, 1500) described above. Thus, while camera (702) is used in density sensing stage (1600) as described below, camera (702) may also be used to serve other functions, including but not limited to viewing barcodes on vials held within reagent storage frame (107), viewing fluid levels within vials held within reagent storage frame (107), viewing fluidic movement within process chip (1670), viewing pressure-induced deformation via an optical feature (760, 860, 960, 1060, 1260, 1360, 1460, 1470, 1560, 1760, 1860, 1960), and/or viewing other optically detectable conditions.

Controller (121) receives image signals from camera (702) and processes those image signals to determine a fluid density value as described in greater detail below. Controller (121) may further execute various algorithms using at least such determined fluid density values, as will also be described in greater detail below. In the present example, controller (121) of density sensing stage (1600) is the same controller (121) that is used to perform other operations in system (100) as described above. In some other versions, a separate controller is used to determine density pressure values using at least image signals from camera (702). In such versions, the separate controller may communicate those determined fluid density values to controller (121) for execution of pressure-based algorithms. Alternatively, the determined fluid density values may be utilized in any other suitable fashion by any other suitable hardware components.

Process chip (1670) of the present example includes a first plate (1672), an elastic layer (1674), a second plate (1676), and a third plate (1678). Elastic layer (1674) is interposed between plates (1672, 1676). Third plate (1678) cooperates with second plate (1676) to define inlet channel (1630) and outlet channel (1640), which are also shown in FIGS. 26A-26D and described above. Plates (1672, 1676, 1678) of process chip (1670) may be configured and operable like plates (300, 304, 306) of process chip (200). Similarly, elastic layer (1674) of process chip (1670) may be configured and operable like elastic layer (302) of process chip (200). Thus, elastic layer (1674) may extend across a substantial portion of the width of process chip (1670), such that elastic layer (1674) may also perform functions in other chambers of process chip (1670) (e.g., valving, peristaltic pumping, ventilating etc.).

Second plate (1676) defines density sensing chamber (1650), which is fluidically coupled with channels (1630, 1640). A portion (1682) of elastic layer (1674) is exposed in the upper region of density sensing chamber (1650). A bead (1652) is positioned in density sensing chamber (1650), beneath elastic layer (1674). Bead (1652) is configured to float based on the density of fluid in density sensing chamber (1650), as will be described in greater detail below. In the present example, bead (1652) has a spherical shape. In some other versions, bead (1652) has a non-spherical shape. For instance, some versions of bead (1652) may include a pointed tip that bears against elastic layer (1674) as the structure becomes buoyant based on the density of fluid in density sensing chamber (1650). Thus, the use of the term “bead” herein should not be viewed as being limited to objects having a spherical shape.

First plate (1672) defines an opening (1680) that is aligned with density sensing chamber (1650). In the example shown in FIGS. 27A-27B, opening (1680) and density sensing chamber (1650) have the same diameter. In some other versions, opening (1680) has a larger diameter than density sensing chamber (1650). In some other versions, opening (1680) has a smaller diameter than density sensing chamber (1650). In the present example, opening (1680) and density sensing chamber (1650) both have a circular shape. Alternatively, opening (1680) and density sensing chamber (1650) may have any other suitable respective configurations. In the present example, with opening (1680) providing clearance for elastic layer (1674) to deform, portion (1682) of elastic layer (1674) may achieve a deformed state as shown in FIG. 27B when bead (1652)

achieves sufficient buoyancy to bear upwardly against portion (1682) of elastic layer (1674).

While portion (1682) of elastic layer (1674) is exposed to opening (1680) and density sensing chamber (1650) in this example, other variations may instead include a dedicated density sensing membrane like pressure sensing membrane (870) of process chip (810). In such versions, the dedicated density sensing membrane may be positioned within, over, or under a corresponding opening (e.g., like opening (832)) that is formed in elastic layer (1674). In some such versions, such a dedicated density sensing membrane may be more flexible than elastic layer (1674) and/or may otherwise differ from elastic layer (1674).

An optical feature (1690) is positioned atop portion (1682) of elastic layer (1674). In versions where a dedicated density sensing membrane is used instead of portion (1682) of elastic layer (1674), optical feature (1690) may be positioned on, in, or under the dedicated pressure sensing membrane. Optical feature (1690) is configured to deform with elastic layer (1674) in response to bead (1652) bearing upwardly against elastic layer (1674) as shown in FIG. 27B. In this example, optical feature (1690) and elastic layer (1674) deform together upwardly along a central axis (CA) and laterally along a lateral dimension (LD) that is transverse to the central axis (CA). With optical feature (1690) being directly or indirectly within the field of view (704) of camera (702), camera (702) is operable to capture images of the axial and lateral deformation of optical feature (1690) and transmit the image data to controller (121). Controller (121) is operable to convert the image data into a density value indicating the density of fluid in density sensing chamber (1650).

In some instances, camera (702) may also capture image data showing bead (1652) transitioning from a position where bead (1652) is resting on floor (1654) to a position where bead (1652) engages the underside of elastic layer (1674) without yet deforming elastic layer (1674) (e.g., as bead (1652) begins to float). Similarly, camera (702) may capture image data showing bead (1652) transitioning from a position where bead (1652) engages the underside of elastic layer (1674) without deforming elastic layer (1674) to a position where bead (1652) is resting on floor (1654) (e.g., as bead (1652) sinks). During such transitions, the contrast between bead (1652) and elastic layer (1674) may change, such that this contrast may indicate a degree of buoyancy of bead (1652), which may in turn indicate the density of fluid in density sensing chamber (1650).

Optical feature (1690) may be configured similar to any of the various other kinds of optical features (760, 860, 960, 1060, 1160, 1170, 1260, 1360, 1460, 1560, 1760, 1860, 1960) described herein. Optical feature (1690) may thus be configured to enhance visualization of axial and/or lateral deformation of portion (1682) of elastic layer (1674) along the central axis (CA) and/or lateral dimension (LD), respectively. Thus, while pressure sensing stages (700, 800, 1100, 1200, 1300, 1400, 1500) and density sensing stage (1600) are used to measure different properties, pressure sensing stages (700, 800, 1100, 1200, 1300, 1400, 1500) and density sensing stage (1600) may be used to sense such properties in a similar fashion by tracking of axial and/or lateral deformation via an optical feature (760, 860, 960, 1060, 1160, 1170, 1260, 1360, 1460, 1560, 1690, 1760, 1860, 1960).

As indicated above, portion (1682) of elastic layer (1674) deforms in response to bead (1652) bearing upwardly against portion (1682) of elastic layer (1674) as shown in FIG. 27B. Bead (1652) bears upwardly against portion (1682) of elastic layer (1674) based on the buoyancy of bead (1652), which varies based on the density of fluid in density sensing chamber (1650). The fluid is introduced into density sensing chamber (1650) in accordance with the procedure shown in FIGS. 26A-26D as described above. The state shown in FIG. 27A corresponds with the state shown in FIG. 26A, where the fluid has not yet been communicated into density sensing chamber (1650). In this state, bead (1652) may rest upon the floor (1654) of density sensing chamber. The state shown in FIG. 27B corresponds with the state shown in FIG. 26C, where density sensing chamber (1650) has been filled with the fluid and the fluid is not flowing into or out of density sensing chamber (1650), such that the fluid is static within density sensing chamber (1650). In some variations, density sensing chamber (1650) contains one or more additional structural features that are configured to keep bead (1652) substantially centered within density sensing chamber (1650). Such features may prevent bead (1652) from becoming improperly positioned as density sensing chamber (1650) is filled with fluid.

As another variation, fluid may be flowed through density sensing chamber (1650) with a vortex flow. In some such scenarios, a vortex flow may be used to urge an otherwise buoyant bead (1652) downwardly away from elastic layer (1674). The vortex flow rate that is overcomes the buoyancy of bead (1652) may indicate the density of the fluid in which bead (1652) is disposed. The downward movement of bead (1652) may be tracked optically (e.g., via camera (702) or otherwise).

The buoyancy of bead (1652) will depend on the relative density between bead (1652) and the fluid in density sensing chamber (1650), such that bead (1652) will become buoyant in the fluid once the density of the fluid in density sensing chamber (1650) exceeds the density of bead. The greater the density of the fluid in density sensing chamber (1650), the more buoyant bead (1652) becomes in the fluid, the greater the upward force imparted by bead (1652) against portion (1682) of elastic layer (1674), and the greater the axial and lateral deformation in optical feature (1690) that will be observed by camera (704). The selection of material as the bead (1652) material may thus depend on the composition of the fluid that will be introduced into density sensing chamber (1650).

By way of illustration, the fluid that is passed through density sensing stage (1600) may include ethanol, and density sensing stage (1600) may be used to determine the amount of ethanol in the fluid based on the density of the fluid, as the fluid density may vary based on the amount of ethanol in the fluid. In such scenarios, bead (1652) may be formed of a material such as polypropylene, polyethylene, and/or any other suitable material(s). Bead (1652) may comprise a material that is crystalline or amorphous. By way of further example only, the density of bead (1652) may range from approximately 0.7 $g/cm^3$ to approximately 1.2 $g/cm^3$, including from approximately 0.8 $g/cm^3$ to approximately 1.1 $g/cm^3$, or including from approximately 0.9 $g/cm^3$ to approximately 1.0 $g/cm^3$. As another example, a bead (1652) formed of polyethylene with a density of approximately 0.996 $g/cm^3$ may become buoyant in a fluid that contains 2.5% ethanol.

Figure 28:
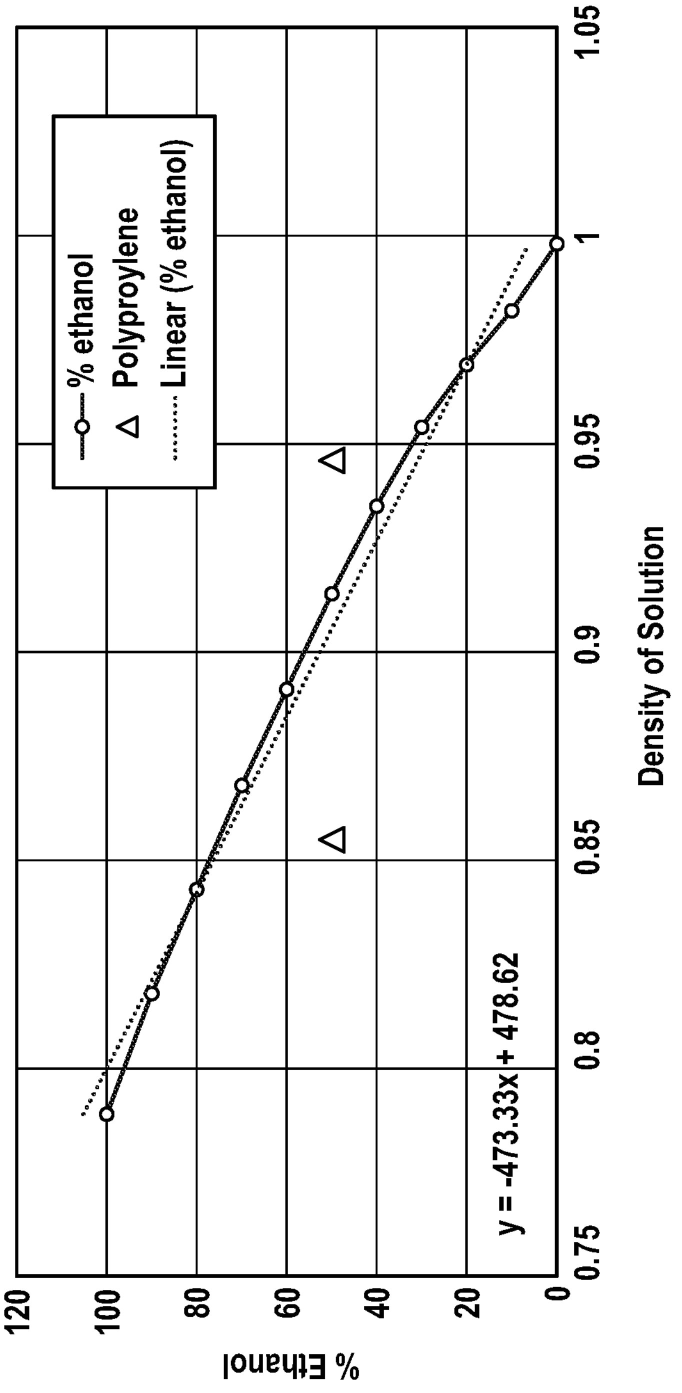
FIG. 28 depicts a graph plotting examples of fluid density values based on a percentage of ethanol in a solution.

The upward force that bead (1652) may buoyantly exert on elastic layer (1674) may be linearly dependent on the density of the fluid in density sensing chamber (1650); and the density of the fluid in density sensing chamber (1650) may be approximately linearly related to the amount of ethanol in the fluid in density sensing chamber (1650). In pure water (i.e., in the absence of ethanol) bead (1652) may buoyantly exert an upward force of approximately 6 μN against elastic layer (1674). In some versions, the force that bead (1652) may exert on elastic layer (1674) may increase by approximately 0.1 μN for each 1% change in ethanol in the fluid. FIG. 28 shows a graph of examples of density fluid density values based on a percentage of ethanol in a solution, in relation to two examples of bead (1652) comprising polyethylene with different respective densities.

As noted above, one or more density sensing stages (1600) may be positioned at any suitable location(s) within a process chip (1670). The fluid density values sensed via density sensing stage (1600) may be used for any suitable purpose(s) and in any suitable fashion(s), including but not limited to the various ways described herein for using pressure data from pressure sensing stages (700, 800, 1100, 1200, 1300, 1400, 1500). Alternatively, fluid density values sensed via density sensing stage (1600) may be used to regulate the introduction of one or more different kinds of fluids (e.g., ethanol) from reagent storage frame (107). Alternatively, fluid density values may be used to determine a temperature of a fluid. Alternatively, fluid density values may be used to perform various other kinds of analyses of fluids flowing through process chips (111, 200, 500, 710, 810, 910, 1010, 1110, 1210, 1310, 1410, 1510, 1670, 1710, 1810, 1910).

V. Miscellaneous

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

When a feature or element is herein referred to as being "on" another feature or element, it may be directly on the other feature or element or intervening features and/or elements may also be present. In contrast, when a feature or element is referred to as being "directly on" another feature or element, there are no intervening features or elements present. When a feature or element is referred to as being "connected," "attached," or "coupled" to another feature or element, it may be directly connected, attached or coupled to the other feature or element or intervening features or elements may be present. In contrast, when a feature or element is referred to as being "directly connected," "directly attached," or "directly coupled" to another feature or element, there are no intervening features or elements present. Although described or shown with respect to one embodiment, the features and elements so described or shown may apply to other embodiments. It will also be appreciated by those skilled in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a," "an," and "the" are intended to include the plural forms as well, unless the context clearly indicates otherwise. As used herein, the term "and/or" includes any and all combinations of one or more of the associated listed items and may be abbreviated as "/".

Spatially relative terms, such as "under," "below," "lower," "over," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the term "under" may encompass both an orientation of over and under. The device may be otherwise oriented (rotated 90 degrees or at other orientations) and the spatially relative descriptors used herein interpreted accordingly. Similarly, the terms "upwardly," "downwardly," "vertical," "horizontal," and the like are used herein for the purpose of explanation only unless specifically indicated otherwise.

The term "perpendicular" as used herein should be understood to include arrangements where two objects, axes, planes, surfaces, or other things are oriented such that the two objects, axes, planes, surfaces, or other things together define an angle of 90 degrees. The term "perpendicular" as used herein should also be understood to include arrangements where two objects, axes, planes, surfaces, or other things are oriented such that the two objects, axes, planes, surfaces, or other things together define an angle that is approximately 90 degrees (e.g., an angle ranging from 85 degrees to 90 degrees). Thus, the term "perpendicular" as used herein should not be read as necessarily requiring two objects, axes, planes, surfaces, or other things to be oriented such that the two objects, axes, planes, surfaces, or other things together define an angle of exactly 90 degrees.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components may be co-jointly employed in the methods and articles (e.g., compositions and apparatuses including device and methods). For example, the term "comprising" will be understood to imply the inclusion of any stated elements or steps but not the exclusion of any other elements or steps. In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value unless the context indicates otherwise. For example, if the value "10" is disclosed, then "about 10" is also disclosed. Any numerical range recited herein is intended to include all sub-ranges subsumed therein.

It is also understood that when a value is disclosed that "less than or equal to" the value, "greater than or equal to the value," and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Some versions of the examples described herein may be implemented using a computer system, which may include at least one processor that communicates with a number of peripheral devices via bus subsystem. These peripheral devices may include a storage subsystem including, for example, memory devices and a file storage subsystem, user interface input devices, user interface output devices, and a network interface subsystem. The input and output devices may allow user interaction with the computer system. The network interface subsystem may provide an interface to outside networks, including an interface to corresponding interface devices in other computer systems. User interface input devices may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system.

User interface output devices may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system to the user or to another machine or computer system.

A storage subsystem may store programming and data constructs that provide the functionality of some or all of the modules and methods described herein. These software modules may be generally executed by the processor of the computer system alone or in combination with other processors. Memory used in the storage subsystem may include a number of memories including a main random access memory (RAM) for storage of instructions and data during program execution and a read only memory (ROM) in which fixed instructions are stored. A file storage subsystem may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem in the storage subsystem, or in other machines accessible by the processor.

The computer system itself may be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the example of the computer system described herein is intended only as a specific example for purposes of illustrating the technology disclosed. Many other configurations of a computer system are possible having more or less components than the computer system described herein.

As an article of manufacture, rather than a method, a non-transitory computer readable medium (CRM) may be loaded with program instructions executable by a processor. The program instructions when executed, implement one or more of the computer-implemented methods described above. Alternatively, the program instructions may be loaded on a non-transitory CRM and, when combined with appropriate hardware, become a component of one or more of the computer-implemented systems that practice the methods disclosed.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. An apparatus comprising:

a fluid input port;

a fluid output port;

a fluid channel, the fluid input port, the fluid output port, and the fluid channel together defining a fluid path, the fluid path configured to allow fluid to flow in from the fluid input port, through the fluid channel, and out through the fluid output port;

a first flexible membrane positioned at a first location on the fluid path, the first flexible membrane defining a plane, a radial center, and a central axis extending perpendicularly relative to the plane at the radial center of the first flexible membrane, the first flexible membrane configured to deform along the central axis using at least the pressure of fluid in the fluid path at the first location, the first flexible membrane further configured to deform along a lateral dimension using at least a pressure of fluid in the fluid path at the first location, the lateral dimension being transverse to the central axis;

a first optical feature laid over the first flexible membrane, wherein a plurality of visible elements are incorporated into the first optical feature, wherein the plurality of visible elements are arranged in a pattern selected from a group consisting of a stochastic pattern lacking spatial order and a concentrically alternating black and white ring pattern that is radially ordered, and wherein the first optical feature is configured to change a visual state in response to deformation of the first flexible membrane along the lateral dimension;

a first plate, the fluid input port passing through the first plate;

a second plate, the fluid output port passing through the first plate, the first plate and the second plate cooperating to define the fluid channel, the first flexible membrane being interposed between the first plate and the second plate;

at least one camera, the at least one camera being positioned to view the first optical feature and thereby capture images of the first optical feature; and a processor, the processor configured to:

process images captured by the at least one camera, and determine a pressure of fluid in the fluid path at the first location using at least deformation of the first flexible membrane along the lateral dimension as indicated in one or more of the images captured by the at least one camera.

2. The apparatus of claim 1, further comprising:

a second flexible membrane positioned at a second location on the fluid path, the second flexible membrane defining a plane, a radial center, and a central axis extending perpendicularly relative to the plane at the radial center of the second flexible membrane, the second flexible membrane configured to deform along the central axis of the second flexible membrane using at least a pressure of fluid in the fluid path at the second location, the second flexible membrane being further configured to deform along a lateral dimension using at least the pressure of fluid in the fluid path at the second location, the lateral dimension being transverse to the central axis of the second flexible membrane; and a second optical feature laid over the second flexible membrane, wherein a plurality of visible elements are incorporated into the second optical feature, wherein the plurality of visible elements are arranged in a pattern selected from a group consisting of a stochastic pattern lacking spatial order and a concentrically alternating black and white ring pattern that is radially ordered, and wherein the second optical feature configured to change a visual state in response to deformation of the second flexible membrane along the lateral dimension.

3. The apparatus of claim 2, the first location on the fluid path being positioned between the fluid input port and the fluid channel.

4. The apparatus of claim 3, the second location on the fluid path being positioned between the fluid channel and the fluid output port.

5. The apparatus of claim 3, the at least one camera being further positioned to view the second optical feature and thereby capture images of the second optical feature.

6. The apparatus of claim 5, the at least one camera comprising a single camera that is positioned to simultaneously view the first and second optical features and thereby simultaneously capture images of the first and second optical features.

7. The apparatus of claim 5, the processor configured to:

determine a flow rate of fluid in the fluid path using at least deformation of the first flexible membrane along at least the lateral region of the first flexible membrane, and using at least deformation of the second flexible membrane along at least the lateral region of the second flexible membrane, as indicated in one or more images captured by the at least one camera.

8. The apparatus of claim 7, the processor being further configured to communicate one or more control signals to change the flow rate of fluid in the fluid path using at least the determined flow rate.

9. The apparatus of claim 2, the processor configured to:

determine a first pressure of fluid in the fluid path using at least deformation of the first flexible membrane along the lateral dimension as indicated in one or more images captured by the at least one camera, and determine a second pressure of fluid in the fluid path using at least deformation of the second flexible membrane along the lateral dimension as indicated in one or more images captured by the at least one camera.

10. The apparatus of claim 9, the processor configured to further determine whether a fault condition exists using at least the first pressure or the second pressure.

11. The apparatus of claim 9, the apparatus further comprising a working stage along the fluid path, the working stage configured to change a property of fluid flowing through the fluid path.

12. The apparatus of claim 11, the first location on the fluid path being positioned upstream of the working stage, the first flexible membrane configured to deform along the lateral dimension using at least the first pressure of fluid in the fluid path upstream of the first working stage.

13. The apparatus of claim 11, the second location on the fluid path being positioned downstream of the working stage, the second flexible membrane configured to deform along the lateral dimension using at least the second pressure of fluid in the fluid path downstream of the working stage.

14. A method, comprising:

observing, via at least one camera, deformation of a flexible membrane, the flexible membrane being positioned along a fluid path, the flexible membrane defining a plane, a radial center, and a central axis extending perpendicularly relative to the plane at the radial center of the flexible membrane, the flexible membrane deforming along the central axis using at least a pressure of fluid in the fluid path, the flexible membrane further deforming along a lateral dimension using at least the pressure of fluid in the fluid path, the lateral dimension being transverse to the central axis, the observing including capturing images of an optical feature that is laid over the flexible membrane via the camera, wherein a plurality of visible elements are incorporated into the optical feature, wherein the plurality of visible elements are arranged in a pattern selected from a group consisting of a stochastic pattern lacking spatial order and a concentrically alternating black and white ring pattern that is radially ordered, and wherein the optical feature changing a visual state as the flexible membrane deforms along the lateral dimension; and determining, via a processor, the pressure of fluid in the fluid path using at least the observed change in visual state of the optical feature as captured in the images from the at least one camera.

15. The method of claim 14, further comprising adjusting, via the processor, a flow of fluid through the fluid path using at least the determined pressure of fluid in the fluid path.

16. The method of claim 14, an opening being positioned over the flexible membrane, the flexible membrane deforming toward the opening, the opening having a radial center and a radial perimeter, the flexible membrane having an annular region, the annular region being spaced radially outwardly relative to the radial center, the annular region being further spaced radially inwardly relative to the radial perimeter, the determining including focusing on image data from the camera indicating lateral deformation of the flexible membrane within the annular region.

17. An apparatus, comprising:

a fluid processing assembly, the fluid processing assembly comprising:

a fluid flow path, a first working stage along the fluid flow path, the first working stage configured to change a property of fluid flowing through the flow path, and a first pressure sensing stage positioned along the flow path, the first pressure sensing stage comprising:

a first flexible membrane defining a first plane, a first radial center, and a first central axis extending perpendicularly relative to the first plane at the first radial center of the first flexible membrane, the first flexible membrane configured to deform along a first lateral dimension using at least a pressure of fluid in the fluid path, the first lateral dimension being transverse to the first central axis, and a first optical feature laid over the first flexible membrane, wherein a plurality of visible elements are incorporated into the first optical feature, wherein the plurality of visible elements are arranged in a pattern selected from a group consisting of a stochastic pattern lacking spatial order and a concentrically alternating black and white ring pattern that is radially ordered, and wherein the first optical feature is configured to change a visual state in response to deformation of the first flexible membrane along the first lateral dimension;

at least one camera positioned to view the first optical feature and thereby capture images of the first optical feature; and a processor configured to determine a first pressure of fluid in the fluid path using at least deformation of the first flexible membrane along the first lateral dimension as indicated in one or more images captured by the at least one camera.

* * * * *